(12) United States Patent
Padmanabhan et al.

(10) Patent No.: US 11,488,176 B2
(45) Date of Patent: Nov. 1, 2022

(54) SYSTEMS, METHODS, AND APPARATUSES FOR IMPLEMENTING CERTIFICATES OF AUTHENTICITY OF DIGITAL TWINS TRANSACTED ONTO A BLOCKCHAIN USING DISTRIBUTED LEDGER TECHNOLOGY (DLT)

(71) Applicant: salesforce.com, inc., San Francisco, CA (US)

(72) Inventors: Prithvi Krishnan Padmanabhan, San Ramon, CA (US); Marc Benioff, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 49 days.

(21) Appl. No.: 16/264,657

(22) Filed: Jan. 31, 2019

(65) Prior Publication Data

US 2020/0250683 A1 Aug. 6, 2020

(51) Int. Cl.
  *G06Q 30/00* (2012.01)
  *G06Q 20/38* (2012.01)
  (Continued)

(52) U.S. Cl.
  CPC ........... *G06Q 30/018* (2013.01); *G06F 9/451* (2018.02); *G06F 16/953* (2019.01);
  (Continued)

(58) Field of Classification Search
  CPC . H04L 2209/38; H04L 9/3236; H04L 9/3247; H04L 63/0428; H04L 63/08;
  (Continued)

(56) References Cited

U.S. PATENT DOCUMENTS 5,634,053 A 5/1997 Noble et al.
6,333,929 B1 12/2001 Drottar et al.
(Continued)

FOREIGN PATENT DOCUMENTS

CN 108021986 A 5/2018
CN 109173261 A 1/2019
(Continued)

OTHER PUBLICATIONS https://medium.com/blockchain-art-collective/how-smart-certificates-of-authenticity-improve-art-asset-management-ef55523fec4b#:~:text=A%20smart%20certificate%20of%20authenticity,digital%20identity%20as%20one%20bundle.&text=So%20once%20the%20certificate%20has,digital%20link%20is%20in%20effect. (Year: 2019).*
(Continued)

*Primary Examiner* — Ariel J Yu
*Assistant Examiner* — Dana Amsdell
(74) *Attorney, Agent, or Firm* — Elliott, Ostrander & Preston, P.C.

(57) ABSTRACT

Systems, methods, and apparatuses for implementing certificates of authenticity of digital twins transacted onto a blockchain using Distributed Ledger Technology (DLT) in conjunction with a cloud based computing environment are described herein. For example, according to one embodiment there is a system which includes means for operating a first blockchain interface to a private blockchain on behalf of a product manufacturer, in which the product manufacturer has access permissions to the private blockchain; means for operating a second blockchain interface to a public blockchain on behalf of a plurality of tenants of the host organization including the product manufacturer; means for providing a plurality of templates for certificates of authenticity to the plurality of tenants; means for generating a digital twin for a finished goods product by the
(Continued)

product manufacturer, the digital twin having embedded therein a new certificate of authenticity generated using one of the plurality of templates, the new certificate of authenticity uniquely identifying the finished goods product by a product identifier specified with the new certificate of authenticity; means for transacting the digital twin onto the private blockchain; means for transferring ownership of the digital twin from the product manufacturer to a purchaser; and means for writing a unique ID identifying the digital twin on the public blockchain into the asset on the private blockchain within which the digital twin is stored. Other related embodiments are disclosed.

30 Claims, 29 Drawing Sheets

(51) Int. Cl.
| | |
|---|---|
| *G06Q 10/08* | (2012.01) |
| *H04L 9/00* | (2022.01) |
| *H04L 9/32* | (2006.01) |
| *H04L 9/06* | (2006.01) |
| *G06F 16/953* | (2019.01) |
| *G06F 9/451* | (2018.01) |
| *G06F 3/0484* | (2022.01) |
| *G06F 40/186* | (2020.01) |

(52) U.S. Cl.
CPC ....... *G06Q 10/0875* (2013.01); *G06Q 20/389* (2013.01); *H04L 9/0637* (2013.01); *H04L 9/3268* (2013.01); *G06F 3/0484* (2013.01); *G06F 40/186* (2020.01); *H04L 9/50* (2022.05)

(58) Field of Classification Search
CPC ......... H04L 9/30; H04L 1/18; H04L 2209/20; H04L 2209/60; H04L 2209/84; H04L 41/08; H04L 63/105; H04L 63/126; H04L 67/10; H04L 67/104; H04L 67/108; H04L 67/125; H04L 67/20; H04L 67/22; H04L 67/2823; H04L 67/306; H04L 67/327; H04L 69/22; H04L 9/0618; H04L 9/08; H04L 9/0819; H04L 9/083; H04L 9/321; H04L 9/3242; H04L 9/3268
See application file for complete search history.

(56) References Cited

U.S. PATENT DOCUMENTS

| | | | |
|---|---|---|---|
| 7,587,348 | B2 | 9/2009 | Liao et al. |
| 8,095,463 | B1 | 1/2012 | Hartmaier |
| 9,027,094 | B1 | 5/2015 | Balazs et al. |
| 9,569,700 | B1 | 2/2017 | Santos et al. |
| 9,690,822 | B2 | 6/2017 | Roy-Faderman |
| 9,978,067 | B1 | 5/2018 | Sadaghiani et al. |
| 10,042,636 | B1 | 8/2018 | Srivastava et al. |
| 10,311,230 | B2 | 6/2019 | Jagadeesan et al. |
| 10,373,129 | B1 | 8/2019 | James et al. |
| 10,425,399 | B2 | 9/2019 | Kravitz et al. |
| 10,482,466 | B1 | 11/2019 | Walters et al. |
| 10,505,726 | B1* | 12/2019 | Andon ................. G06Q 30/016 |
| 10,521,196 | B1 | 12/2019 | Wang et al. |
| 10,521,780 | B1 | 12/2019 | Hopkins, III et al. |
| 10,541,821 | B2 | 1/2020 | Toll et al. |
| 10,701,054 | B2 | 6/2020 | Padmanabhan et al. |
| 10,728,283 | B1 | 7/2020 | Dobrek et al. |
| 10,762,506 | B1 | 9/2020 | Cash et al. |
| 10,885,567 | B2 | 1/2021 | Bhattacherjee et al. |
| 10,929,866 | B1 | 2/2021 | Qi et al. |
| 11,038,771 | B2 | 6/2021 | Padmanabhan |
| 11,184,394 | B1 | 11/2021 | Dobrek et al. |
| 11,244,313 | B2 | 2/2022 | Padmanabhan et al. |
| 2005/0102159 | A1 | 5/2005 | Mondshine |
| 2006/0118611 | A1 | 6/2006 | Michelsen et al. |
| 2006/0259361 | A1 | 11/2006 | Barhydt et al. |
| 2008/0066165 | A1 | 3/2008 | Rosenoer |
| 2009/0037949 | A1 | 2/2009 | Birch |
| 2011/0289140 | A1 | 11/2011 | Pletter et al. |
| 2013/0041934 | A1 | 2/2013 | Annamalaisami et al. |
| 2013/0226682 | A1 | 8/2013 | Grossman |
| 2013/0346173 | A1 | 12/2013 | Chandoor |
| 2014/0039990 | A1 | 2/2014 | Georgi |
| 2014/0278894 | A1 | 9/2014 | Toumayan et al. |
| 2015/0026061 | A1 | 1/2015 | Siegel et al. |
| 2016/0027229 | A1 | 1/2016 | Spanos et al. |
| 2016/0042383 | A1 | 2/2016 | Joshi et al. |
| 2016/0092872 | A1 | 3/2016 | Prakash et al. |
| 2016/0148251 | A1 | 5/2016 | Thomas et al. |
| 2016/0350860 | A1 | 12/2016 | Dintenfass et al. |
| 2016/0358267 | A1 | 12/2016 | Arjomand et al. |
| 2016/0364743 | A1 | 12/2016 | St. Lawrence et al. |
| 2017/0005804 | A1 | 1/2017 | Zinder |
| 2017/0046698 | A1 | 2/2017 | Haldenby et al. |
| 2017/0085545 | A1 | 3/2017 | Lohe et al. |
| 2017/0103167 | A1 | 4/2017 | Shah |
| 2017/0132625 | A1 | 5/2017 | Kennedy |
| 2017/0132630 | A1 | 5/2017 | Castinado et al. |
| 2017/0140145 | A1 | 5/2017 | Shah |
| 2017/0200157 | A1 | 7/2017 | Bergeon et al. |
| 2017/0206603 | A1 | 7/2017 | Al-Masoud |
| 2017/0236215 | A1 | 8/2017 | Eisen et al. |
| 2017/0289111 | A1 | 10/2017 | Voell et al. |
| 2017/0295021 | A1 | 10/2017 | Gutiérrez et al. |
| 2017/0295023 | A1 | 10/2017 | Madhavan et al. |
| 2017/0300627 | A1 | 10/2017 | Giordano et al. |
| 2017/0300872 | A1 | 10/2017 | Brown et al. |
| 2017/0300876 | A1 | 10/2017 | Musiala, Jr. et al. |
| 2017/0337534 | A1 | 11/2017 | Goeringer et al. |
| 2017/0344988 | A1 | 11/2017 | Cusden et al. |
| 2017/0353309 | A1 | 12/2017 | Gray |
| 2017/0364549 | A1 | 12/2017 | Abalos |
| 2017/0372300 | A1 | 12/2017 | Dunlevy et al. |
| 2018/0005186 | A1 | 1/2018 | Hunn |
| 2018/0006831 | A1 | 1/2018 | Toll et al. |
| 2018/0019879 | A1 | 1/2018 | Kravitz et al. |
| 2018/0026505 | A1 | 1/2018 | Galmiche et al. |
| 2018/0041345 | A1 | 2/2018 | Maim |
| 2018/0082256 | A1 | 3/2018 | Tummuru et al. |
| 2018/0088928 | A1 | 3/2018 | Smith et al. |
| 2018/0123779 | A1 | 5/2018 | Zhang |
| 2018/0136633 | A1* | 5/2018 | Small ................. G06Q 20/065 |
| 2018/0139186 | A1 | 5/2018 | Castagna |
| 2018/0144042 | A1 | 5/2018 | Sheng et al. |
| 2018/0158162 | A1 | 6/2018 | Ramasamy |
| 2018/0165416 | A1 | 6/2018 | Saxena et al. |
| 2018/0189100 | A1 | 7/2018 | Nemoto et al. |
| 2018/0191503 | A1 | 7/2018 | Alwar et al. |
| 2018/0204213 | A1 | 7/2018 | Zappier et al. |
| 2018/0218176 | A1 | 8/2018 | Voorhees et al. |
| 2018/0225611 | A1 | 8/2018 | Daniel et al. |
| 2018/0232644 | A1 | 8/2018 | Acharya et al. |
| 2018/0232659 | A1 | 8/2018 | Ranatunga et al. |
| 2018/0239897 | A1 | 8/2018 | Ventura |
| 2018/0247191 | A1 | 8/2018 | Katz et al. |
| 2018/0253661 | A1 | 9/2018 | Strauss |
| 2018/0262505 | A1 | 9/2018 | Ligatti |
| 2018/0268401 | A1 | 9/2018 | Ortiz et al. |
| 2018/0268506 | A1 | 9/2018 | Wodetzki et al. |
| 2018/0276553 | A1 | 9/2018 | Redkar et al. |
| 2018/0276626 | A1 | 9/2018 | Laiben |
| 2018/0307990 | A1 | 10/2018 | Chawla et al. |
| 2018/0365686 | A1 | 12/2018 | Kondo |
| 2018/0367528 | A1 | 12/2018 | Schwarz et al. |
| 2019/0012249 | A1 | 1/2019 | Mercuri et al. |
| 2019/0012595 | A1 | 1/2019 | Beser et al. |
| 2019/0019090 | A1* | 1/2019 | Chacko ................. G06Q 10/06 |
| 2019/0028276 | A1 | 1/2019 | Pierce et al. |
| 2019/0034404 | A1 | 1/2019 | Anderson et al. |
| 2019/0035018 | A1 | 1/2019 | Nolan et al. |
| 2019/0050855 | A1 | 2/2019 | Martino et al. |
| 2019/0052454 | A1 | 2/2019 | Wright et al. |

(56) References Cited

U.S. PATENT DOCUMENTS

| | | |
|---|---|---|
| 2019/0058709 A1 | 2/2019 | Kempf et al. |
| 2019/0081796 A1 | 3/2019 | Chow et al. |
| 2019/0086988 A1 | 3/2019 | He et al. |
| 2019/0087598 A1* | 3/2019 | Adkins ............... H04L 9/0643 |
| 2019/0087892 A1 | 3/2019 | Pinski et al. |
| 2019/0102409 A1 | 4/2019 | Shi et al. |
| 2019/0102423 A1 | 4/2019 | Little et al. |
| 2019/0108543 A1 | 4/2019 | Chan et al. |
| 2019/0109702 A1 | 4/2019 | Maggu et al. |
| 2019/0109713 A1 | 4/2019 | Clark et al. |
| 2019/0122186 A1 | 4/2019 | Kano et al. |
| 2019/0147532 A1 | 5/2019 | Singh et al. |
| 2019/0149325 A1 | 5/2019 | Garagiola et al. |
| 2019/0149334 A1 | 5/2019 | Velden |
| 2019/0158270 A1* | 5/2019 | Berti ....................... G06F 21/30 |
| 2019/0164156 A1 | 5/2019 | Lindemann |
| 2019/0164220 A1 | 5/2019 | Raj et al. |
| 2019/0172282 A1 | 6/2019 | Patel |
| 2019/0182047 A1 | 6/2019 | Andreina et al. |
| 2019/0188706 A1 | 6/2019 | McCurtis |
| 2019/0215149 A1 | 7/2019 | Ramasamy et al. |
| 2019/0228006 A1 | 7/2019 | Tormasov et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0306235 A1 | 10/2019 | Veale et al. |
| 2019/0334716 A1 | 10/2019 | Kocsis et al. |
| 2019/0370634 A1 | 12/2019 | Moreno et al. |
| 2019/0370866 A1 | 12/2019 | Lawbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2019/0392457 A1* | 12/2019 | Kuntagod ............... G06Q 50/28 |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0042939 A1 | 2/2020 | Padmanabhan |
| 2020/0050613 A1 | 2/2020 | Gauvreau, Jr. |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0118011 A1 | 4/2020 | Kaiser et al. |
| 2020/0133955 A1 | 4/2020 | Padmanabhan et al. |
| 2020/0134656 A1 | 4/2020 | Padmanabhan |
| 2020/0143267 A1 | 5/2020 | Gidney |
| 2020/0169546 A1 | 5/2020 | Padmanabhan |
| 2020/0186338 A1* | 6/2020 | Andon ................ G06Q 30/0609 |
| 2020/0200824 A1* | 6/2020 | Narayanaswami ......................... H02J 13/00032 |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0336475 A1 | 10/2020 | Padmanabhan et al. |
| 2020/0344132 A1 | 10/2020 | Padmanabhan |
| 2020/0357084 A1 | 11/2020 | Hunn et al. |
| 2021/0152535 A1 | 5/2021 | Padmanabhan et al. |
| 2021/0152536 A1 | 5/2021 | Padmanabhan et al. |
| 2021/0182423 A1 | 6/2021 | Padmanabhan |
| 2021/0226774 A1 | 7/2021 | Padmanabhan |
| 2021/0243193 A1 | 8/2021 | Padmanabhan |
| 2022/0006705 A1 | 1/2022 | Padmanabhan |

FOREIGN PATENT DOCUMENTS

| | | |
|---|---|---|
| CN | 2019800219289 | 9/2020 |
| EP | 197071681 | 8/2020 |
| JP | 2020541893 | 7/2020 |
| WO | 2016161073 A1 | 10/2016 |
| WO | 2018007827 A1 | 1/2018 |
| WO | 2018007828 A2 | 1/2018 |
| WO | 2018194707 A1 | 10/2018 |
| WO | 2018230581 A1 | 12/2018 |
| WO | 2019152750 A1 | 8/2019 |

OTHER PUBLICATIONS https://www.nasdaq.com/articles/using-blockchain-track-assets-proof-ownership-2016-11-30 (Year: 2016).* https://medium.com/luxtag-live-tokenized-assets-on-blockchain/how-creating-digital-twins-on-blockchain-will-protect-brands-3ada31b5fb2f (Year: 2018).* https://static1.squarespace.com/static/58f7bc39bebafb94498d25bf/t/5af42d3b0e2e728fc7dc086e/1528125064397/RIDDLE%26CODE_Deloitte_Report_IoT_powered_by_Blockchain (Year: 2017).*

"BigchainDB 2.0 The Blockchain Database," Berlin Germany dated May 2018, 14 pages.

Azaria, A., et al "MedRec: Using Blockchain for Medical Data Access and Permission Management," 2016 2nd Int'l Conference on Open and Big Data, IEEE, (Aug. 22, 2016), pp. 25-30.

Genestier, P., et al, "Blockchain for Consent Management in the eHealth Environment: A Nugget for Privacy and Security Challenges," Journal of the Int'l Society for Telemedicine and eHealth, (Jan. 1, 2017), 4 pages.

International Search Report and Written Opinion for Application No. PCT/US2019/036103, dated Aug. 1, 2019, 12 pages.

International Search Report and Written Opinion for International Patent Application No. PCT/US2019/016199, dated Apr. 2, 2019,12 pages.

McConaghy et al., "BigchainDB: A Scalable Blockchain Database (DRAFT)" dated Jun. 8, 2016.

Notice of Allowance for U.S. Appl. No. 15/940,646, dated Oct. 31, 2019, 8 pages.

Office Action for U.S. Appl. No. 15/885,803 dated Jan. 8, 2020, 47 pages.

Office Action for U.S. Appl. No. 15/885,811 dated Jan. 17, 2020, 40 pages.

Office Action for U.S. Appl. No. 15/932,092 dated Jan. 22, 2020, 36 pages.

Office Action for U.S. Appl. No. 15/932,100, dated Nov. 8, 2019, 9 pages.

Office Action for U.S. Appl. No. 15/940,646, dated Apr. 29, 2019, 7 pages.

Ojha, "Chaincode for Go Developers, Part 1: Writing Blockchain Chaincode in Go for Hyperledger Fabric v0.6," 2017, 15 pages.

Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.

Salesforce, "Force.com Apex Code Developer's Guide," version 34.0, 2015, 1000 pages.

Sandgaard, J., et al, "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.

Using Sawtooth with Docker: Configuring the List of Transaction Families, Apr. 6, 2018, 13 pages.

(56) References Cited

OTHER PUBLICATIONS

Wikipedia, "Federate database system," Jun. 8, 2016, https://en.wikipedia.org/w/index.php/?title=Federated%20database%20system&oldid=808166410, 6 pages.

Wikipedia, "Solidity," Feb. 2, 2017, https://web.archive.org/web/2017020202304/https://en.wikipeida.org/wiki/Solidity (Year: 2017), 3 pages.

Zyskind, G., et al., "Decentralizing Privacy: Using Blockchain to Protect Personal Data," 2015 IEEE Security and Privacy Workshops (May 1, 2015), 5 pages.

Final Office Action for U.S. Appl. No. 15/885,803, dated Jul. 20, 2020, 29 pages.

Final Office Action for U.S. Appl. No. 15/885,811, dated Aug. 5, 2020, 45 pages.

Final Office Action for U.S. Appl. No. 15/932,092 dated Jun. 22, 2020, 42 pages.

Final Office Action for U.S. Appl. No. 15/932,099 dated Jun. 1, 2020, 26 pages.

International Search Report and Written Opinion for Application No. PCT/US2020/01561B dated May 11, 2020, 13 pages.

Notice of allowance for U.S. Appl. No. 16/264,653 dated Nov. 23, 2020, 16 pages.

Notice of Allowance for U.S. Appl. No. 15/932,100, dated Feb. 20, 2020, 5 pages.

Office Action for U.S. Appl. No. 16/177,305 dated Jul. 23, 2020, 41 pages.

Office Action for U.S. Appl. No. 16/683,945 dated Sep. 14, 2020, 26 Pages.

Office Action for U.S. Appl. No. 15/932,099 dated Oct. 3, 2019, 26 pages.

Office Action for EP Application No. 19707168.1 dated Sep. 24, 2020, 3 pages.

Final Office Action for U.S. Appl. No. 15/885,803 dated Nov. 17, 2021, 28 pages.

Final Office Action for U.S. Appl. No. 15/885,811, dated Feb. 3, 2022, 38 pages.

Final Office Action for U.S. Appl. No. 15/932,092 dated Sep. 27, 2021, 25 pages.

Final Office Action for U.S. Appl. No. 15/932,099 dated Nov. 1, 2021, 35 pages.

Mandal, S., "A Framework for Modular Norm Extraction, Modeling, and Reasoning," [Doctoral dissertation, University of Nebraska], 2017, 151 pages, ProQuest Dissertations Publishing.

Non-final Office Action for U.S. Appl. No. 16/399,920, dated Feb. 17, 2022, 66 pages.

Non-final Office Action for U.S. Appl. No. 16/777,409 dated Oct. 4, 2021, 42 pages.

Non-final Office Action for U.S. Appl. No. 16/917,506, dated Oct. 4, 2021, 44 pages.

Norta, A. et al., "Self-Aware Agent Supported Contract Management on Blockchains for Legal Accountability," 2017, 37 pages.

Notice of Allowance for U.S. Appl. No. 16/177,300, dated Oct. 6, 2021, 14 pages.

Notice of Allowance for U.S. Appl. No. 16/264,653 dated Sep. 29, 2021, 17 pages.

Notice of Allowance for U.S. Appl. No. 16/683,932 dated Dec. 3, 2021, 9 pages.

Office Action for U.S. Appl. No. 15/885,811 dated Aug. 4, 2021, 26 pages.

Office Action for U.S. Appl. No. 16/177,305 dated Sep. 16, 2021, 42 pages.

Office Action for U.S. Appl. No. 16/264,645 dated Oct. 27, 2021, 46 pages.

Office Action for U.S. Appl. No. 16/399,913, dated Dec. 24, 2021, 51 pages.

U.S. Appl. No. 17/153,872, filed Jan. 20, 2021, Prithvi Krishnan Padmanabhan, Entire Document.

U.S. Appl. No. 17/163,547, filed Jan. 31, 2021, Prithvi Krishnan Padmanabhan, Entire Document.

U.S. Appl. No. 17/348,286, filed Jun. 15, 2021, Prithvi Krishnan Padmanabhan, Entire Document.

Bendor-Samuel, P. (2017) Blockchain-enabled "smart-contracts" solve problems in administering IT ecosystem services, CIO, 3 pages.

Final Office Action for U.S. Appl. No. 15/932,099 dated Jun. 1, 2020, 27 pages.

Final Office Action for U.S. Appl. No. 16/177,305 dated Feb. 2, 2021, 47 pages.

Non-final Office Action for U.S. Appl. No. 16/177,305 dated Jul. 23, 2020, 52 pages.

Normans Media Ltd., Smart Contracts: Blockchain-based contracts that don't require lawyers. 2016, 4 pages.

Notice of Allowance for U.S. Appl. No. 16/264,653 dated Jun. 7, 2021, 21 pages.

Notice of Allowance for U.S. Appl. No. 16/683,945, dated Feb. 10, 2021, 14 pages.

Office Action for U.S. Appl. No. 15/885,803, dated Apr. 14, 2021, 31 pages.

Office Action for U.S. Appl. No. 15/932,092 Mar. 17, 2021, 23 pages.

Office Action for U.S. Appl. No. 16/177,300 dated Jun. 16, 2021, 80 pages.

Office Action for U.S. Appl. No. 16/683,945, dated Sep. 14, 2020, 18 pages.

Shukla, A., et al., "Smart Contracts for Multiagent Plan Execution in Untrusted Cyber-physical Systems," 2018 IEEE 25th International Conference on High Performance Computing Workshops (HiPCW), 10 pages.

* cited by examiner

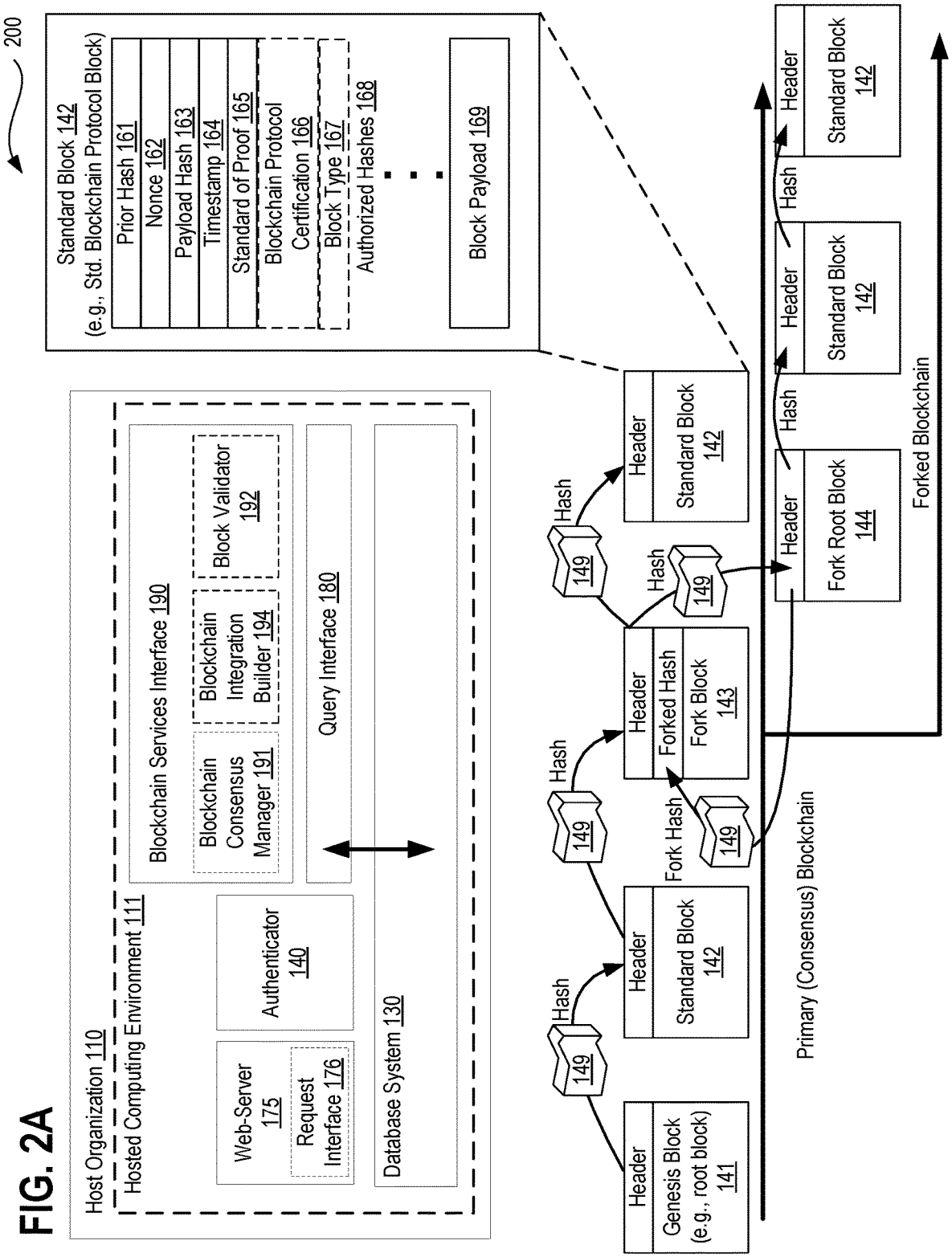

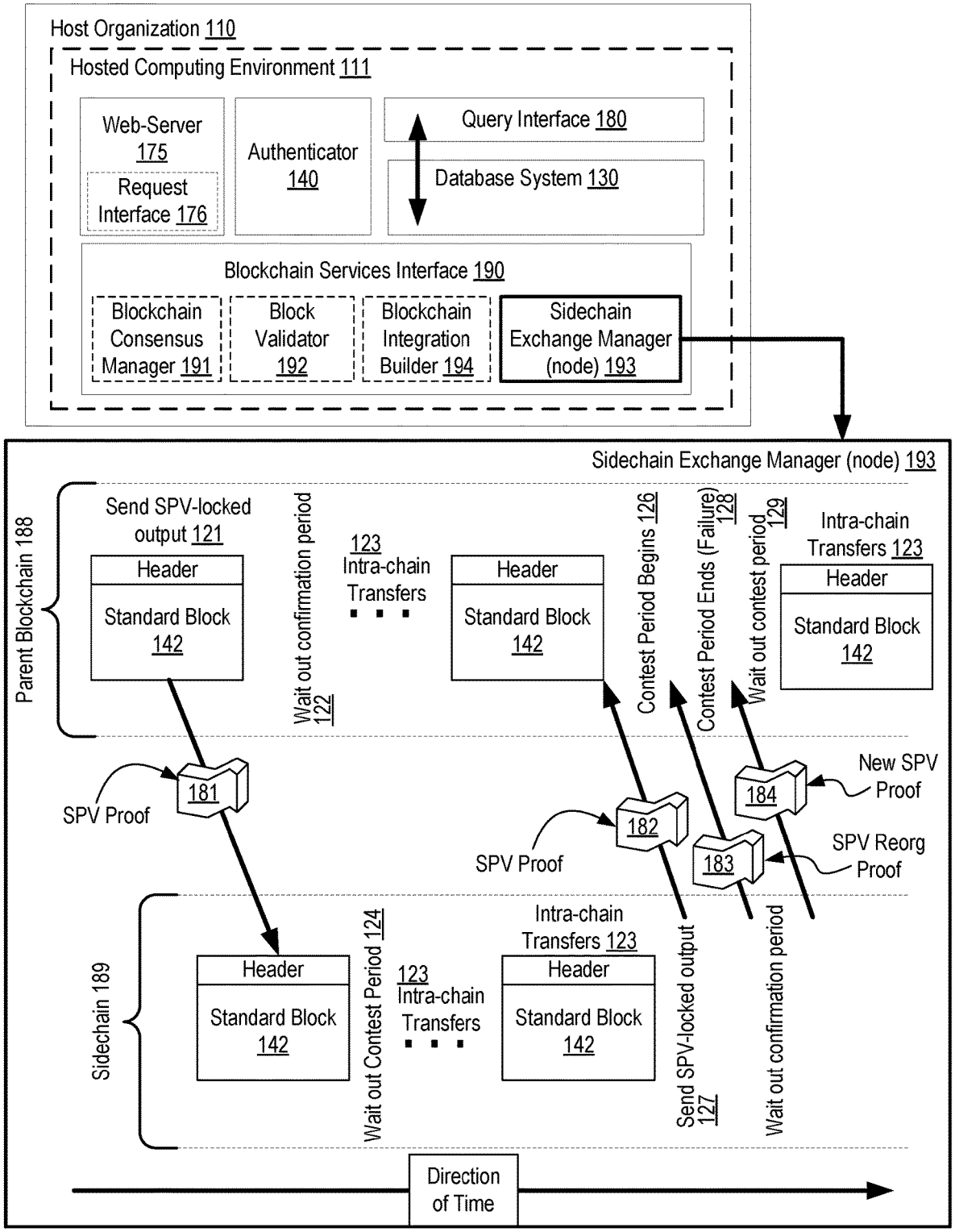

300

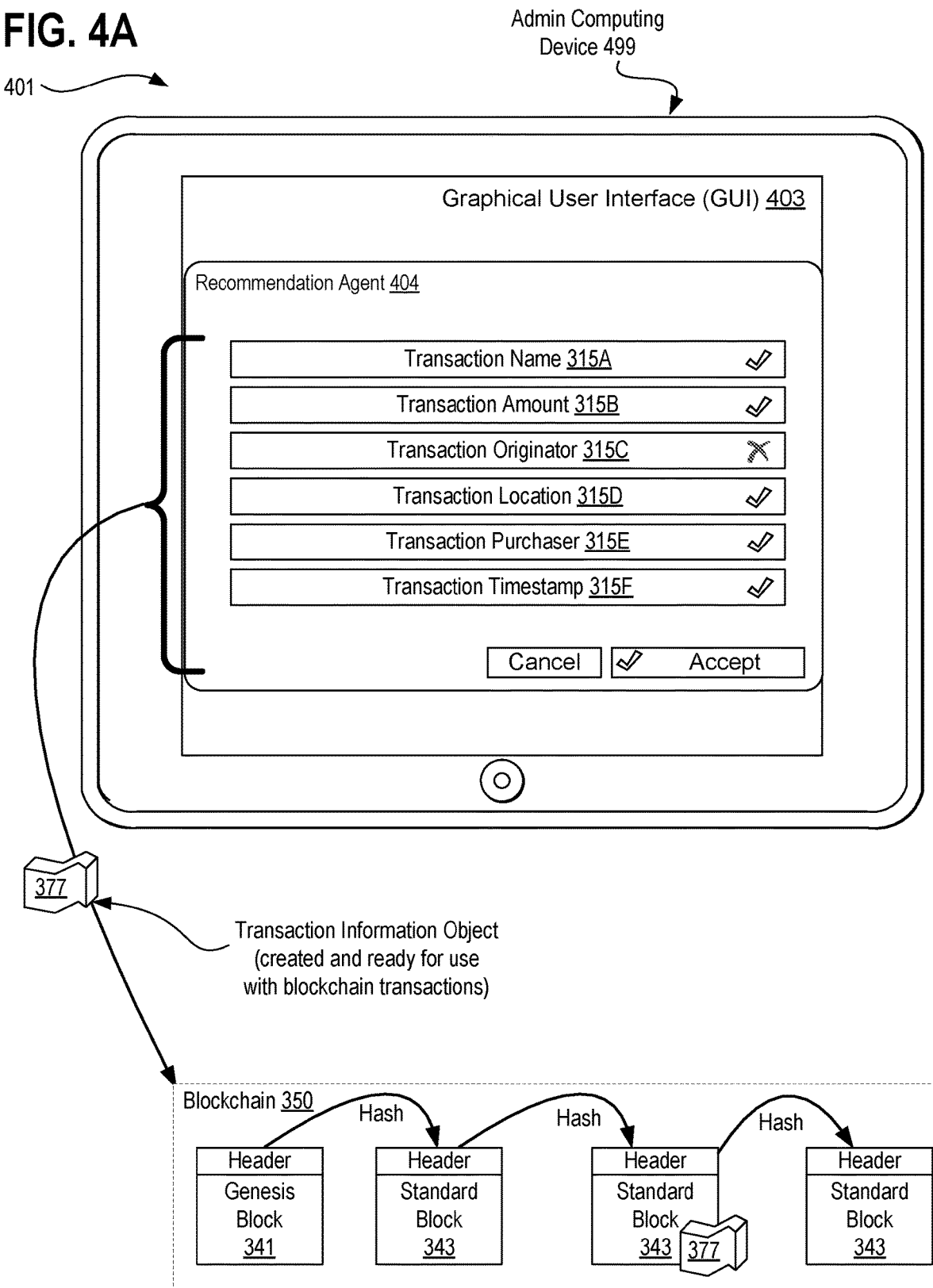

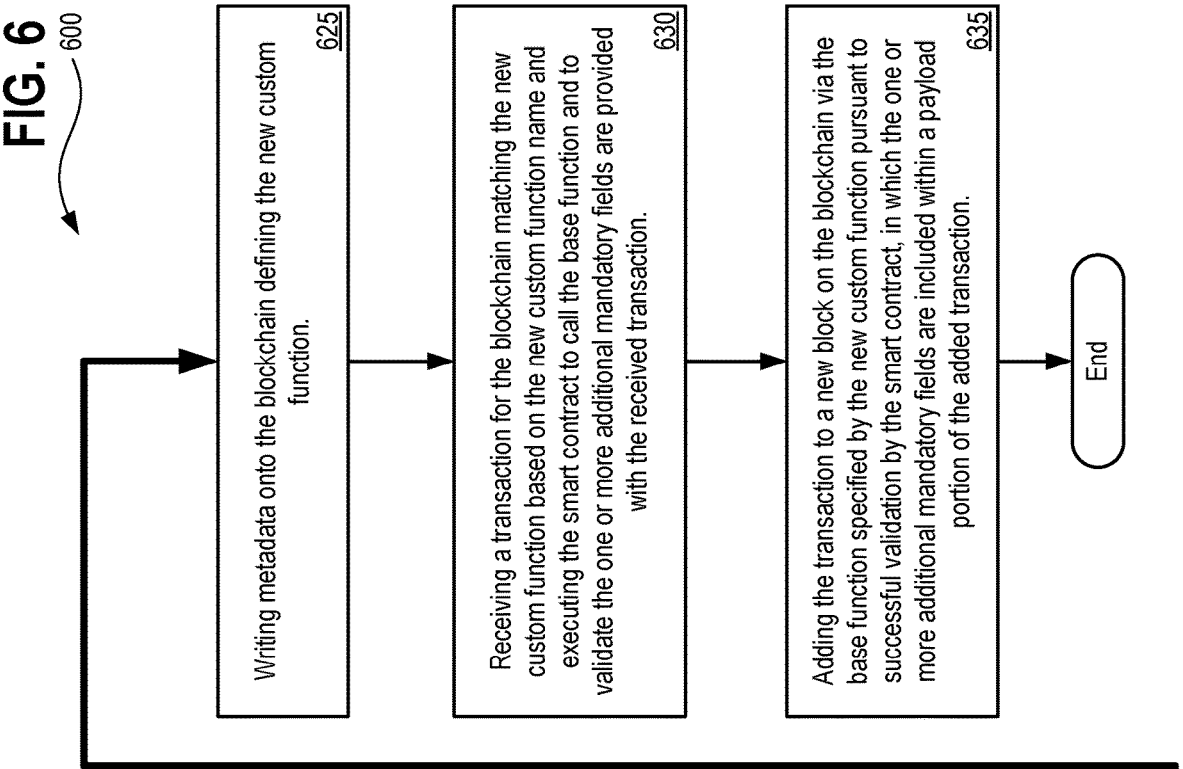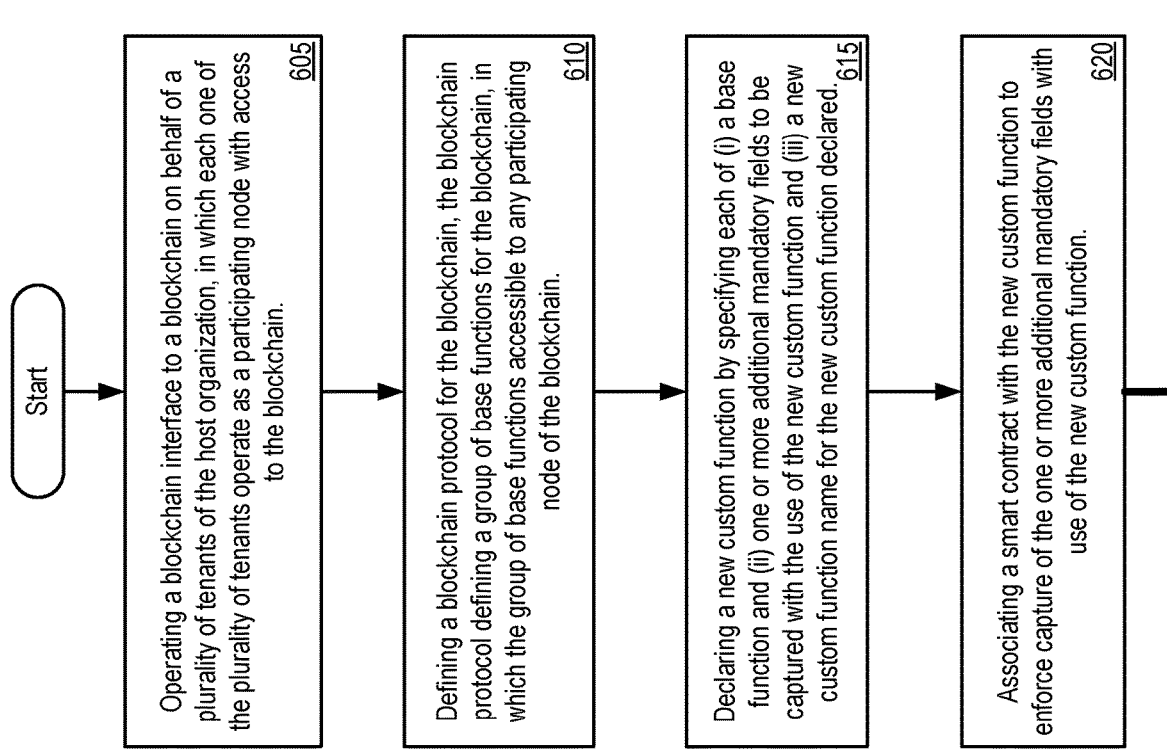
FIG. 6

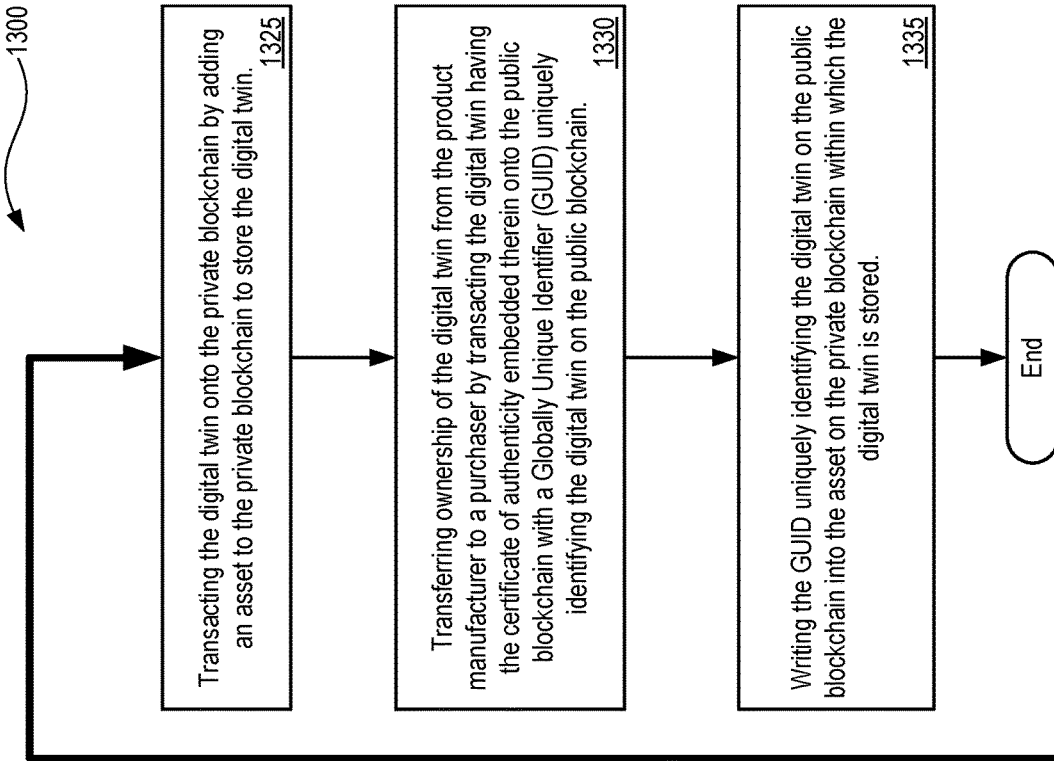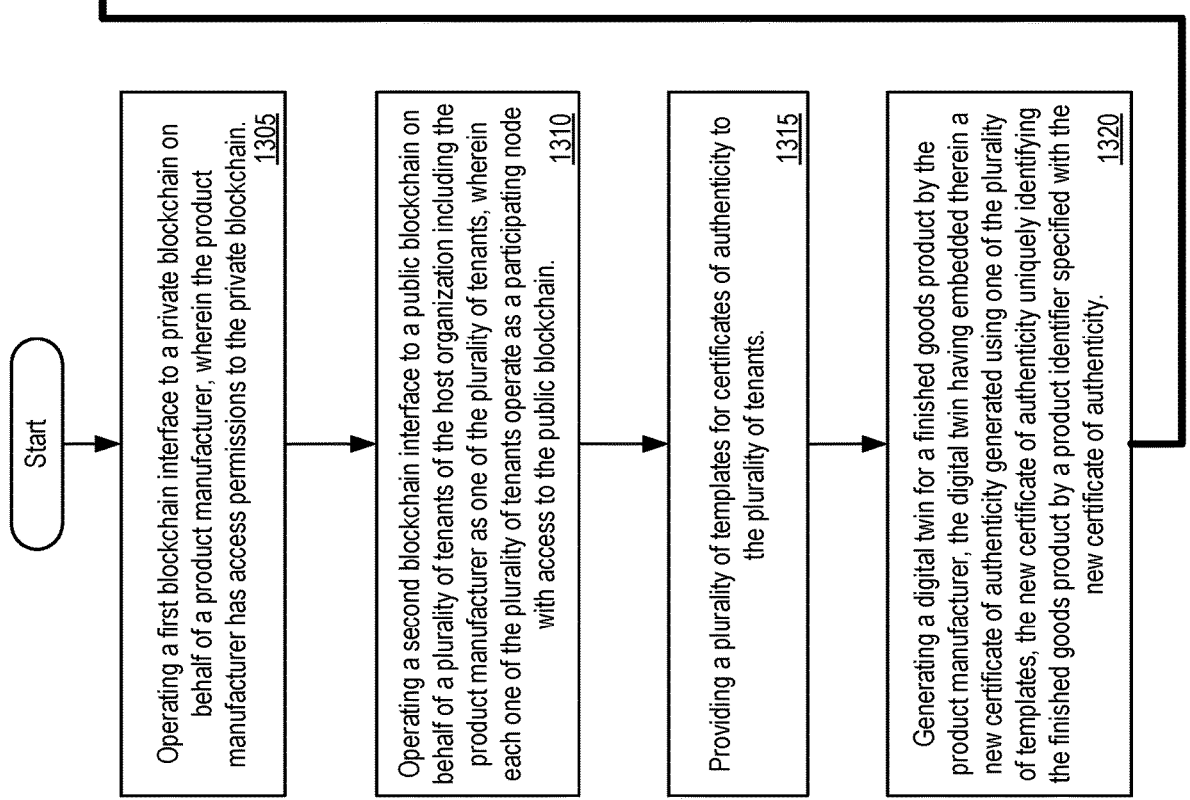

SYSTEMS, METHODS, AND APPARATUSES FOR IMPLEMENTING CERTIFICATES OF AUTHENTICITY OF DIGITAL TWINS TRANSACTED ONTO A BLOCKCHAIN USING DISTRIBUTED LEDGER TECHNOLOGY (DLT)

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and blockchain platforms. More particularly, disclosed embodiments relate to systems, methods, and apparatuses for implementing declarative smart actions for coins and assets transacted onto a blockchain using Distributed Ledger Technology (DLT) in conjunction with a cloud based computing environment. Additional embodiments relate to systems, methods, and apparatuses for implementing certificates of authenticity of digital twins transacted onto a blockchain using distributed ledger technology in conjunction with a cloud based computing environment.

BACKGROUND

The subject matter discussed in the background section is not to be considered prior art merely because of its mention in the background section. Similarly, a problem mentioned in the background section or associated with the subject matter of the background section shall not be considered to have been previously recognized in the prior art. The subject matter in the background section merely represents different approaches, which in and of themselves, may also correspond to claimed embodiments.

In modern financial systems, assets such as currencies or securities are typically held and traded electronically. Transferring assets often requires point-to-point interaction between multiple intermediaries, and reconciliation of duplicated ledgers. This system has some disadvantages, such as the time required for settlement of asset transfers or payments, which often takes days. Moreover, transfers often involve fee payments to multiple intermediaries, and reconciliation involves expensive overhead. Further still, it may be difficult to determine the status of a pending transfer or the current owner of an asset. Other potential problems include transfers that fail to complete, leading to uncertainty within such a system. Still further, such systems are very often restricted insomuch that it is difficult or infeasible to make one transfer conditional on another. Lastly, the complexity of such systems makes it difficult to prevent fraud or theft, and, whether transactions are reversible depends on the transfer mechanism, rather than the business requirements of the transacting party.

Many of these problems may be fixed if asset ownership were recorded on a single shared ledger. However, a combination of practical and technological constraints have made such ledgers difficult to adopt. Such a shared ledger tends to require trust in a single party. That party needs to have the computational capacity and bandwidth to process every transaction in real time. Additionally, to address the disadvantages discussed above, the ledger needs to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and the platform provides only limited support for custom programs that determine asset movement, sometimes called smart contracts, without any mechanism by which to customize the underlying functions or the associated smart contracts.

Distributed Ledger Technology (DLT) helps to address and overcome many of these types of shortcomings of conventional financial systems, however, the technology may nevertheless be expanded to introduce even further benefits to those utilizing such DLT and related blockchain platforms.

Ethereum, introduced in 2015, generalizes the concept of a blockchain to a fully programmable state replication mechanism. While it includes a much more powerful programming language, the Ethereum platform nevertheless presents its own unique challenges for scalability and efficiency, such as a lack of declarative transactions, much less declarative smart actions for coins and assets with auditable transaction information capable of use within a blockchain platform.

Further problems with conventionally known systems and methodologies include the lack of a publicly accessible system via which to check and confirm the authenticity of various goods sold into an open market place so as to combat the sale of counterfeit goods or the means by which such goods may be traced back to a source of origin, such as a manufacturer.

The present state of the art may therefore benefit from the systems, methods, and apparatuses for improving upon, modifying, and expanding upon blockchain and related distributed ledger technologies by providing means for implementing declarative smart actions for coins and assets transacted onto a blockchain using Distributed Ledger Technology (DLT) in conjunction and means for implementing certificates of authenticity of digital twins transacted onto a blockchain using distributed ledger technology with a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A depicts another exemplary architecture, with additional detail of a blockchain and a forked blockchain, in accordance with described embodiments;

FIG. 2B depicts another exemplary architecture with additional detail for sidechains, in accordance with described embodiments;

FIG. 4A depicts an exemplary architecture in accordance with described embodiments;

FIGS. 6 and 7 depict flow diagrams illustrating methods for implementing declarative smart actions for coins and assets transacted onto a blockchain using Distributed Ledger Technology (DLT) in conjunction with a cloud based computing environment such as a database system implementation supported by a processor and a memory to execute such functionality to provide cloud based on-demand functionality to users, customers, and subscribers in accordance with the described embodiments;

FIG. 13 depicts a flow diagram illustrating a method for implementing certificates of authenticity of digital twins transacted onto a blockchain using Distributed Ledger Technology (DLT) in conjunction with a cloud based computing environment, in accordance with described embodiments;

DETAILED DESCRIPTION

Figure 1A:
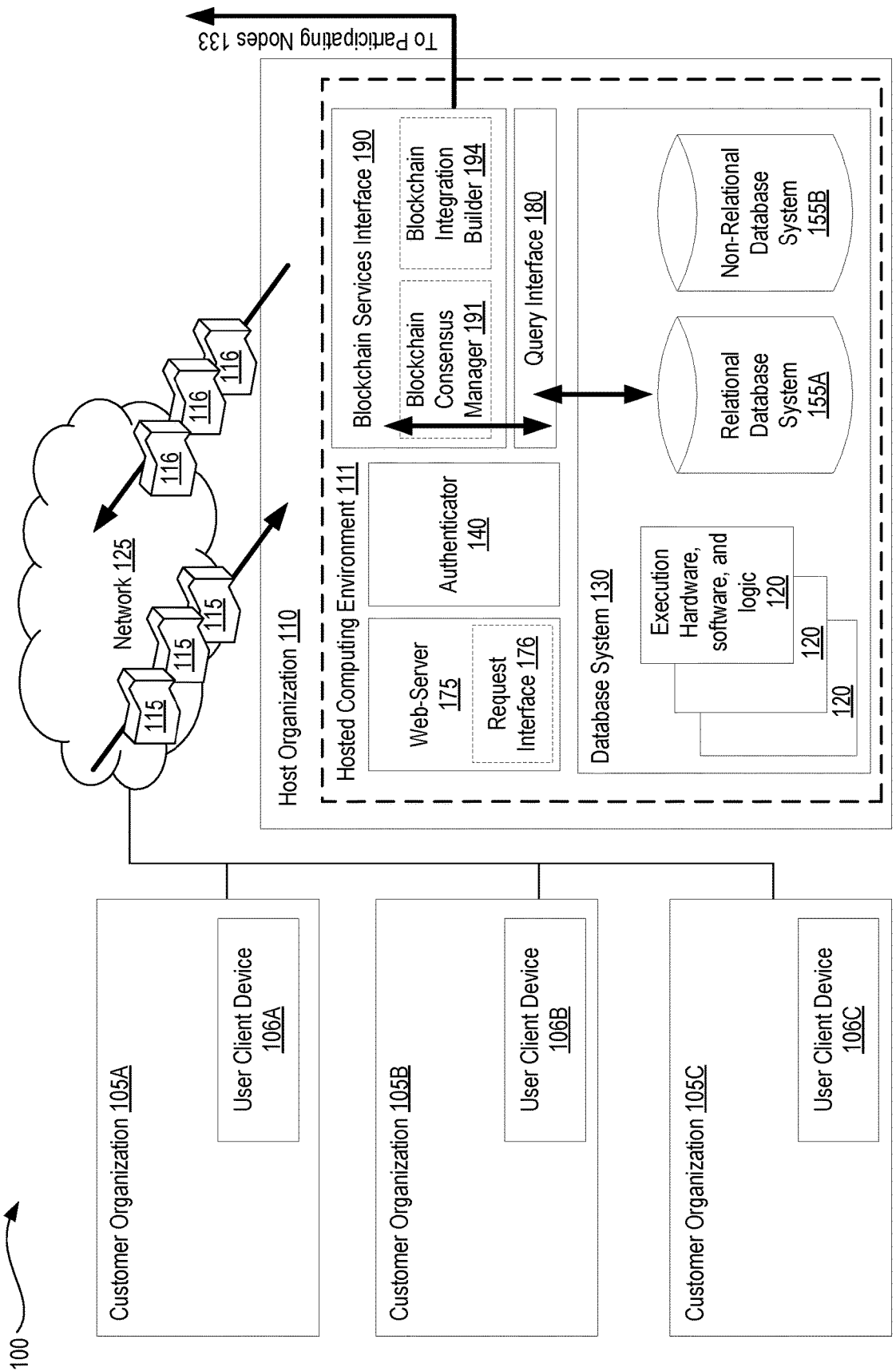
FIG. 1A depicts an exemplary architecture in accordance with described embodiments.

Described herein are systems, methods, and apparatuses for implementing declarative smart actions for coins and assets transacted onto a blockchain using Distributed Ledger Technology (DLT) in conjunction with a cloud based computing environment and means for implementing certificates of authenticity of digital twins transacted onto a blockchain using distributed ledger technology in conjunction with a cloud based computing environment.

For instance, according to a particular embodiment, there is a system having at least a processor and a memory therein, wherein the system includes means for executing a blockchain services interface on behalf of a plurality of tenants of the host organization, wherein each one of the plurality of tenants operate as a participating node with access to the blockchain; in which a blockchain protocol for the blockchain defines a group of base functions for the blockchain, the group of base functions accessible to any participating node of the blockchain. Such a system further includes a receive interface to receive a declaration of a new custom function, the declaration specifying each of (i) a base function and (ii) one or more additional mandatory fields to be captured with the use of the new custom function and (iii) a new custom function name for the new custom function declared and means for associating a smart contract with the new custom function to enforce capture of the one or more additional mandatory fields with use of the new custom function; means for writing metadata onto the blockchain defining the new custom function; means for receiving a transaction for the blockchain matching the new custom function based on the new custom function name and executing the smart contract to call the base function and to validate the one or more additional mandatory fields are provided with the received transaction; and means for adding the transaction to a new block on the blockchain via the base function specified by the new custom function pursuant to successful validation by the smart contract, wherein the one or more additional mandatory fields are included within a payload portion of the added transaction.

According to other embodiments, there is disclosed, by way of example, a system having at least a processor and a memory therein, wherein the system includes means for operating a first blockchain interface to a private blockchain on behalf of a product manufacturer, in which the product manufacturer has access permissions to the private blockchain; operating a second blockchain interface to a public blockchain on behalf of a plurality of tenants of the host organization including the product manufacturer as one of the plurality of tenants, in which each one of the plurality of tenants operate as a participating node with access to the public blockchain; providing a plurality of templates for certificates of authenticity to the plurality of tenants; generating a digital twin for a finished goods product by the product manufacturer, the digital twin having embedded therein a new certificate of authenticity generated using one of the plurality of templates, the new certificate of authenticity uniquely identifying the finished goods product by a product identifier specified with the new certificate of authenticity; transacting the digital twin onto the private blockchain by adding an asset to the private blockchain to store the digital twin; transferring ownership of the digital twin from the product manufacturer to a purchaser by transacting the digital twin having the certificate of authenticity embedded therein onto the public blockchain with a Globally Unique Identifier (GUID) uniquely identifying the digital twin on the public blockchain; and writing the GUID uniquely identifying the digital twin on the public blockchain into the asset on the private blockchain within which the digital twin is stored.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smartphones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 150 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 150 of the database system 130 are separate and distinct from the customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 which facilitates consensus management for private and public blockchains upon which tenants, customer organizations, or the host organization 110 operates as a participating node on a supported blockchain. Additionally depicted is the blockchain integration builder 194 which permits a blockchain administrator or a host organization administrator or a customer organization administrator to declare and set up or configure smart actions for coins and assets transacted onto a blockchain along with any extra information that must be captured for the new asset or coin created utilizing the smart action as well as where to map such information that is captured via a transaction utilizing such a smart action or custom function for coins and assets transacted onto the blockchain utilizing the cloud computing platform provided by the host organization.

As shown here, the blockchain services interface 190 communicatively interfaces the host organization 110 with other participating nodes 133 (e.g., via the network 125) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 provides the blockchain protocol upon which the host organization and then also operates on as a participating node. In other embodiments, the host organization merely operates as a participating node so as to enable the host organization 110 to interact with the blockchain protocol(s) provided by others.

The smart actions (e.g., custom functions) for coins and assets establish a blockchain compatible mechanism by which the coins or assets themselves contain information associated with a purchaser of that coin, which such information then being stored within and accessible from the blockchain upon which such a coin is transacted using the declared smart action. As noted previously, an administrator may define precisely what information is mandated and thus must be captured as well as any information that may optionally be captured and then associated with the new coin or asset created using a declared smart action, as well as what data is to be embedded within a data structure of the new asset or coin when transacted onto the blockchain.

Consider for example a casino coin (e.g., casino token, casino chip, casino coin, etc.). In the case of such a casino coin, apart from and in addition to the coin itself, there will further be contained within the exemplary coin data structure that is configurable and may therefore be specified by an administrator to include, for example, the coin plus a ticket, with the ticket specifying data fields such as, by way of example, ticket name, ticket event, ticket purchase price, a ticket purchaser's likes or special requests, etc. In such an example, the ticket itself is merely a type of information and is therefore customizable and defined by the enterprise customer configuring such a coin. Moreover, the information within the coin may be defined as part of the network information and in case of a cloud computing platform, such as that provided by the host organization, the information for such a coin may be mapped onto the cloud platform entity. For instance, the information may be mapped onto the Cloud Platform Entity within an Account or within a Contact, within which the information of the coin is then made accessible as a data element of the account or contact respectively, within the Cloud Platform Entity upon which it has been mapped.

As depicted here, the blockchain integration builder 194 further enables an administrator for the enterprise customer utilizing such a declarative smart actions (e.g., custom functions) to set up the coin or asset and to specify via an administrator's user interface the extra information that needs to be captured pursuant to the administrator's requirements as well as specifically where such information, once captured, is to be mapped within the cloud platform entity of the host organization 110.

Once configured by declaratively setting up such a smart action (e.g., custom function) a transaction utilizing the smart action to create coins and assets may be added onto a blockchain provided by or supported by the host organization 110 along with the mandatory additional fields required by the declaration of the smart action.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example, proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
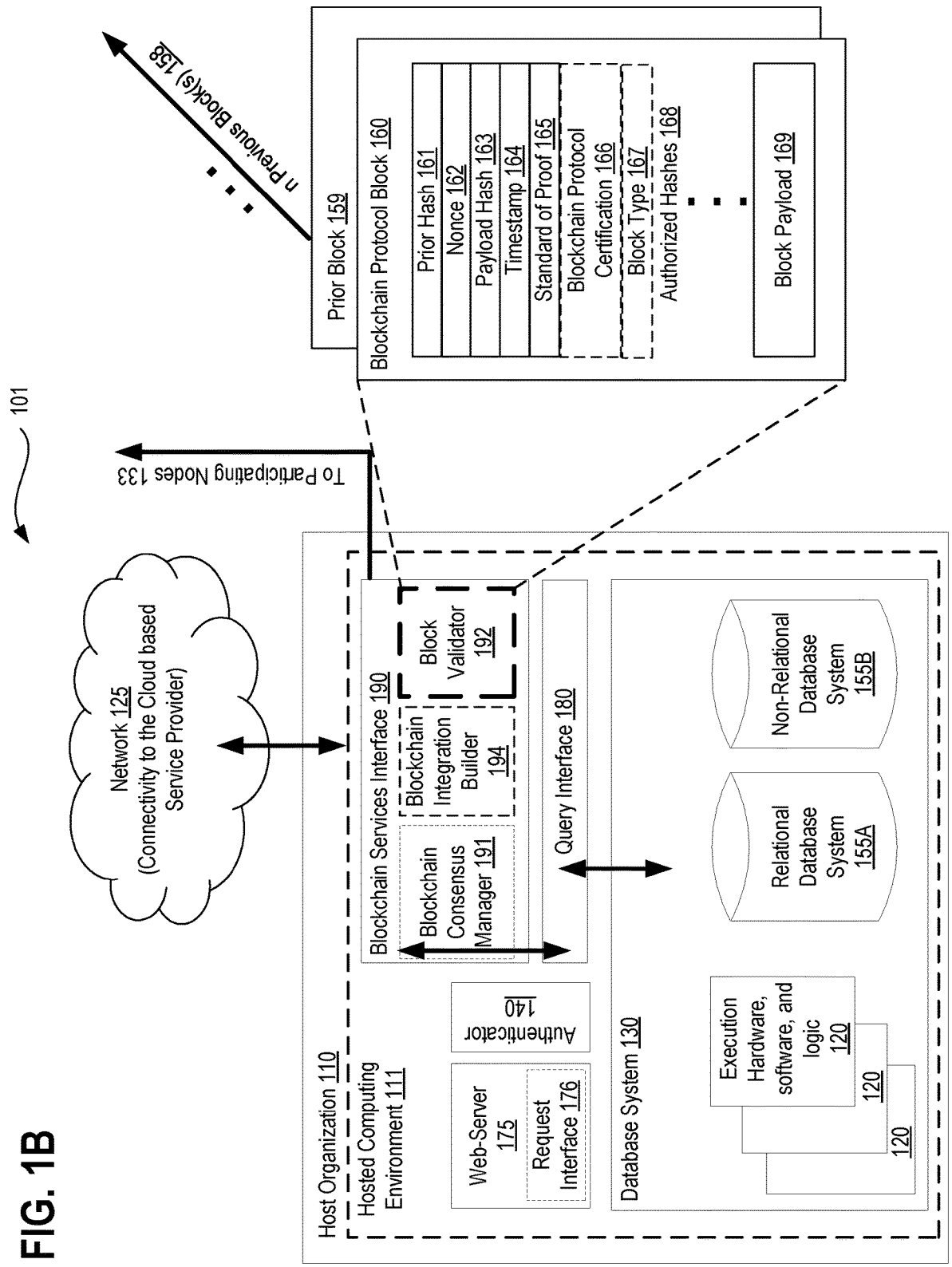
FIG. 1B depicts another exemplary architecture, with additional detail of a blockchain protocol block operating in conjunction with a block validator, in accordance with described embodiments.

FIG. 1B depicts another exemplary architecture 101, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 are organized.

According to certain embodiments, the blockchain integration builder 194 as shown here may utilize a specific blockchain implementation for use with declared smart actions (e.g., custom functions) for coins and assets, with such smart actions being configured by tenants and customer organizations of the host organization. In other embodiments, the host organization 110 may operate as a participating node within a public or a private or a permissioned blockchain which is then made accessible to the tenants of the host organization via the cloud computing platform including for use with the declared smart actions configured by such tenants.

It may be necessary in accordance with certain embodiments that a customized blockchain protocol implementation be provided by the host organization to support such declarative smart actions, so as to enable the host organization to provide a greater suite of functionality to tenants of the host organization 110 and to the customers of those tenants.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 163 provides a hash of the data stored within the block payload 169 portion of the blockchain protocol block 160 and need not meet any specific standard of proof 165. However, the payload hash is included as part of the input when the hash is calculated for the purpose of storing it as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a timestamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized to store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

FIG. 2A depicts another exemplary architecture 200, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary blockchain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain integration builder 194. It may be advantageous to utilize an existing blockchain, but then creating a specialized sidechain or a forked blockchain specifically for the services provided by the blockchain integration builder 194 yet remain in compliance with the blockchain protocol certification 166 required by the primary (consensus) blockchain.

For example, it may be desirable to permit the transfer of coins and assets added to the blockchain pursuant to use of a declared smart action between compatible blockchain networks. Typically, any coin or asset created via a declared smart action along with its captured information and associated mappings may be transferred as an asset between two blockchain platforms, each of which recognize and support such coins and assets created via a declared smart action.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C #, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

FIG. 2B depicts another exemplary architecture 201 with additional detail for sidechains, in accordance with described embodiments.

More particularly, there is depicted here a mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain.

For instance, it may be advantageous at times to exchange the value of an asset or coin created via declared smart actions or exchange the information associated with the coin or asset. Additionally, tenant organizations may desire to push associated data mappings defined by the declared smart action, such as embedded information within coin or an asset, back to the cloud platform entity provided by the host organization, so as to support the transfer of the declared smart action's features and functionality as managed by the blockchain integration builder 194 when operating in conjunction with other compatible blockchain platforms. Such an exchange may be facilitated via a sidechain exchange manager (node) 193, thus negating the need to declare identical smart actions on multiple blockchains.

Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange assets, coins, tokens, value, or other payload information between them which have been created by a transaction utilizing a declared smart action.

As shown here, the sidechain exchange manager 193 of the host organization may send a parent chain asset as an output of the parent blockchain 188 at operation 121.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a wait out confirmation period 122. The confirmation period of a transfer between chains may be a duration for which a coin, token, or other exchanged value is locked on the parent blockchain 188 before it may be successfully transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 124 during which time the transfer will be invalidated if a reorganization proof 183 associated with the parent blockchain 188 asset is detected in the parent blockchain.

The wait out contest period at operation 124 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 153 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 192 of the host organization 110, may validate the SPV proof 182 associated with the sidechain asset. The validated SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 126, during which a release of the parent chain asset is denied at operation 128, showing where the contest period ends (failure), if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 129. The parent blockchain 188 asset may be released if no reorganization proof associated with the sidechain asset is detected during the third predetermined contest period, after which the parent chain asset is free to be transferred within the parent chain via the depicted intra-chain transfers 123 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the parent blockchain 188 or into a sidechain 189 with which the parent blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided by the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions are necessarily placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

According to described embodiments, the blockchain validator 192 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS.

For instance, when a block or transaction within a block having a particular transaction type corresponding to transactions utilizing a declared smart action is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including, for example, a party's participation in another blockchain or sidechain. The total weight, W, of the nodes in the consortium is equal to the sum of the individual node weights, $w_1+w_2+ \ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3A:
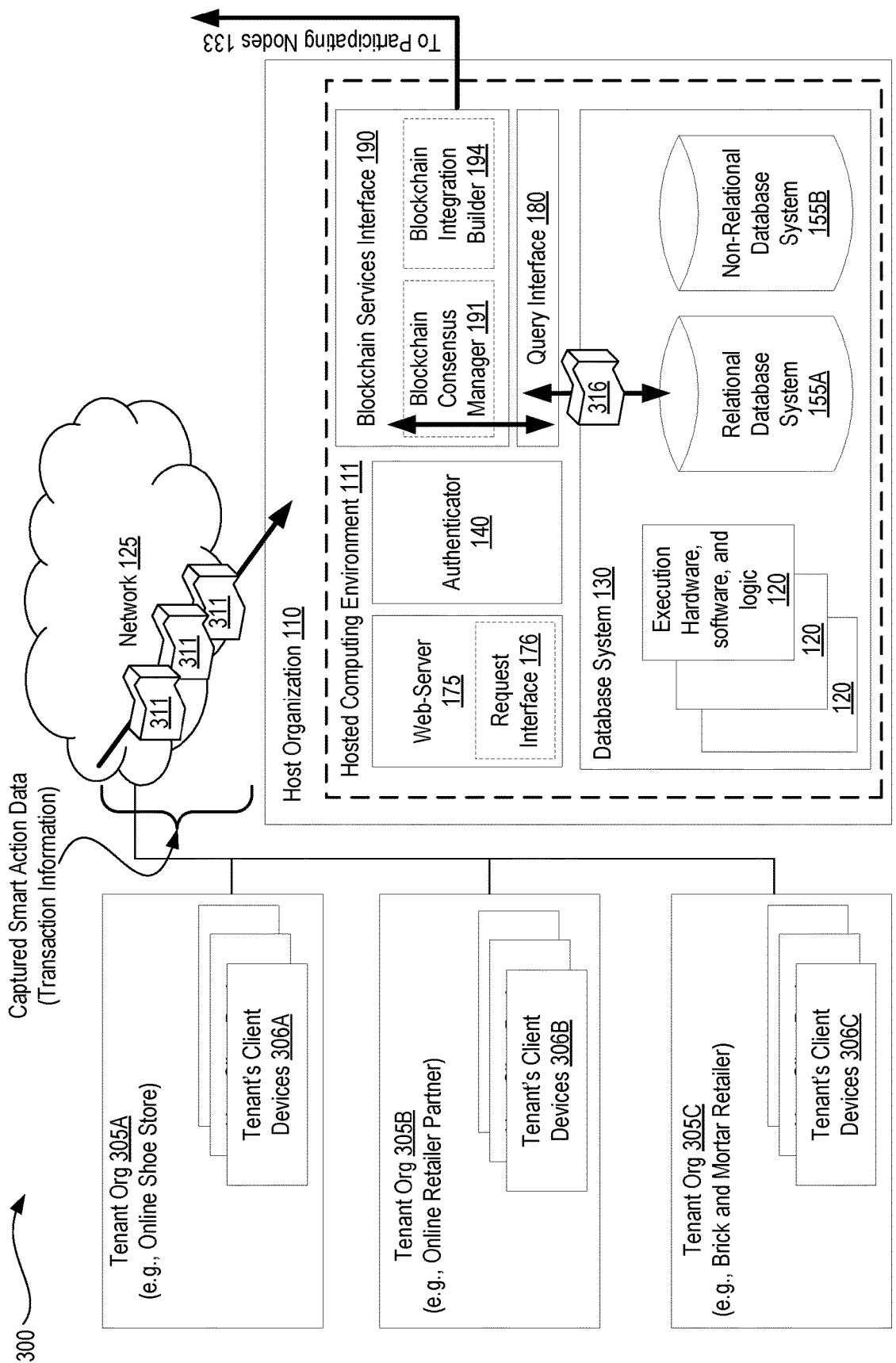
FIG. 3A depicts an exemplary architecture in accordance with described embodiments.

FIG. 3A depicts an exemplary architecture 300 in accordance with described embodiments.

As depicted here, there is again the host organization 110 which includes the hosted computing environment 111 having a processor and memory (e.g., within the execution hardware, software, and logic 120 of the database system 130) which serve to operate the blockchain services interface 190 including the blockchain consensus manager and the blockchain integration builder 194.

Further depicted, there is now captured smart action data 311 arriving at the host organization 110. For instance, a smart action transaction may occur within one of the tenant organizations, such as the tenant org 305A (e.g., the online shoe store) or the tenant org 305B (e.g., the online retailer partner) or the tenant org 305C (e.g., the brick and mortar retailer). Each of the respective tenant orgs 305A-C include tenant client devices 306A-C via which to conduct financial transactions. For instance, tenant client devices 306A-C may include a Point Of Sale (POS) system at a brick and mortar retailer such as that depicted by tenant org 305C or an ecommerce web-server, for instance, utilized by each of tenant orgs 305A and 305B or the web-server 175 of the host organization 110 which is referenced by and utilized by any or all of tenant orgs 305A-C for use in conducting financial transactions.

The blockchain services interface 190 of the host organization 110 facilitates the blockchain transaction utilizing the smart action, and thus, the captured smart action data 311 and indeed the asset or coin which embodies the smart action transaction data 311 is transmitted from the respective tenant org 305A-C from which the transaction originates to the host organization 110 to be transacted onto the blockchain.

According to certain embodiments, declarative transaction coins are provided by the host organization 110 so as to enable tenants of the host organization to define a coin and to further associate transaction information (e.g., transaction metadata) along with the defined transaction coin.

One existing problem with conventional blockchain platforms is the loss of information when a coin transaction occurs, such as when a coin, token, or other asset or value is transferred between parties. One the one hand, a very strong argument may be made that such loss of information is intentional and desirable in accordance with the wishes of certain blockchain platform developers who wish to maintain complete anonymity for all transactions occurring on the blockchain platform.

However, many businesses and governments, such as those which create or must adhere to regulatory provisions and/or auditability requirements may greatly benefit from the transparency and traceability of such financial transactions utilizing the declarative smart action capabilities, regardless of where such transactions may occur. Such businesses and government organizations simply cannot operate with the required transparency and auditability if they utilize a platform which incurs a loss of information upon the transfer of coins, tokens, or other value between parties.

Consider for example the Ethereum blockchain platform which has a concept of asset tokenization. In order to be compliant with the Ethereum blockchain platform, it is necessary for developers to define and use token mechanisms to achieve the so called tokenization of assets which reside on the Ethereum blockchain platform, and thus, such a platform is not feasible for use in satisfying the above noted transparency and auditability concerns.

Moreover, conventional blockchain platforms simply lack connectivity to any centralized data repository and therefore, access to such data must be provided via API and then execute smart contracts to enforce the rules of the tokenized assets.

An improvement to the conventionally available blockchain platform protocols is therefore warranted.

For instance, in accordance with the embodiments described herein, declarative transaction coins expressly prescribe coin transaction metadata which must be added or optional transaction metadata which may be added to any coin transaction, thus providing significantly more context to the transaction involving such a coin, such as the transfer of a coin from one party to another party and registering that transfer on the supporting blockchain.

By providing this additional context for the transactions involving such smart actions, it is thus possible to overcome the lack of auditability, the lack of transparency, the lack of traceability, and the general loss of information which previously may occur with such coin transfer transactions on a conventional blockchain platform. While it may be true that certain blockchain platforms advocate for and promote anonymity, the reality is that many business, governments, and consumers require or prefer to engage in transactions where the transaction metadata and context is not lost, and may therefore prefer to use the declarative smart action mechanisms as described herein.

Figure 3B:
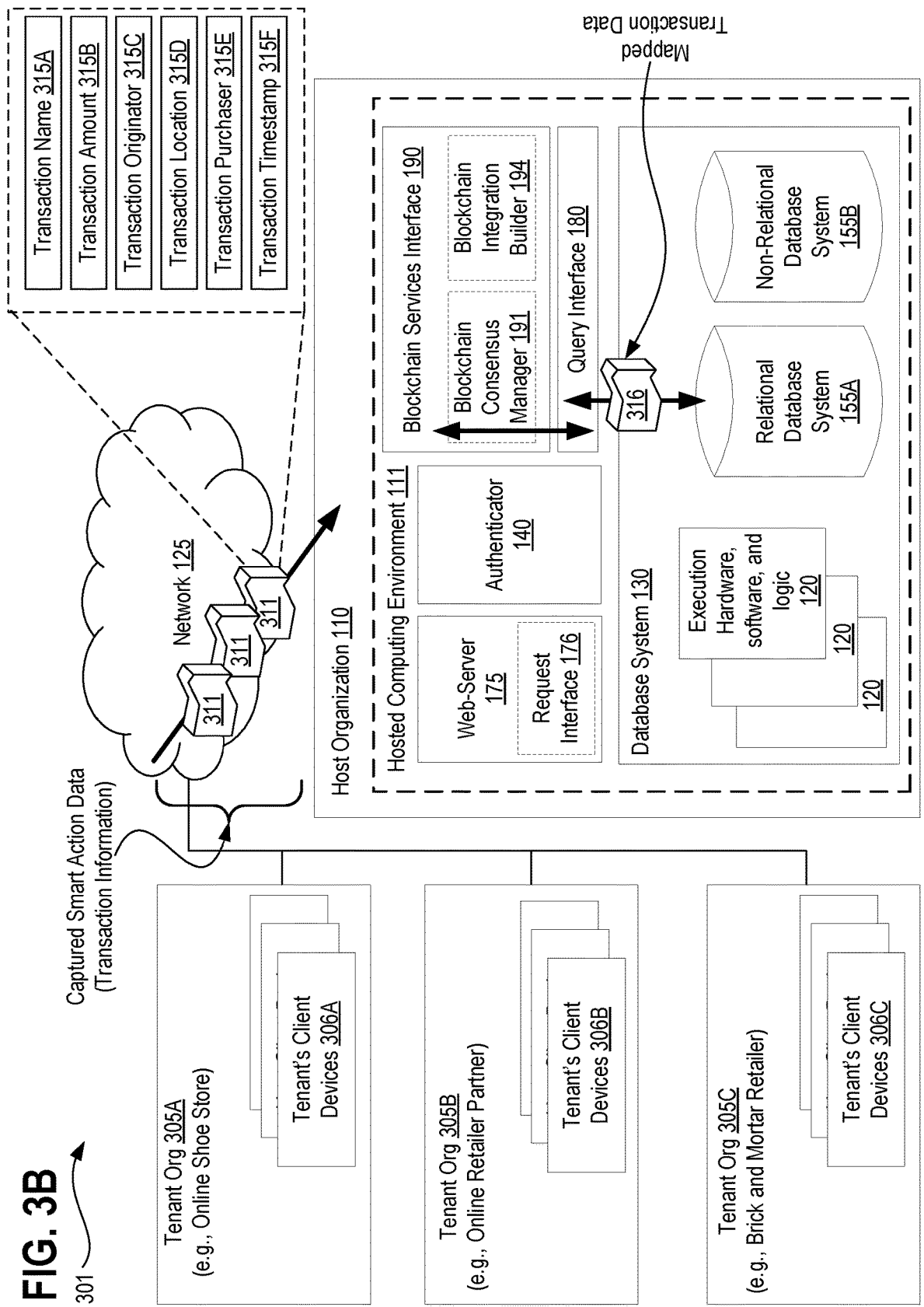
FIG. 3B depicts another exemplary architecture in accordance with described embodiments.

FIG. 3B depicts another exemplary architecture 301 in accordance with described embodiments.

Again there is depicted the host organization 110 which includes the hosted computing environment 111 having a processor and memory (e.g., within the execution hardware, software, and logic 120 of the database system 130) which serve to operate the blockchain services interface 190 including the blockchain consensus manager the blockchain integration builder 194.

Further included, however, is additional detail of the captured smart action data, including the transaction name 315A, the transaction amount 315B, the transaction originator 315C (e.g., such as a retailer, merchant, etc.), the transaction purchaser 315E, and the transaction timestamp 315F.

Additionally depicted within the host organization is the mapped transaction data 316 which has been mapped into the cloud computing platform (e.g., and stored within the database system 130 provided by the host organization) pursuant to the defined mapping of the declarative smart action, as configured by the administrator creating such a smart action for use with financial transactions.

Consider by way of analogy, a non-blockchain transaction using credit cards. For instance, the Adidas company may have an ecommerce site operating online as well as conventional brick and mortar retailers operating as partners to sell a variety of products available from the company. Adidas may desire to increase customer satisfaction amongst its customers, not just online, but also with regard to any purchases conducted at the various retail stores.

Continuing with such an example, consider an Adidas customer named "Joe," who is, unfortunately, very unhappy with the shoes that the purchased from the online ecommerce site for Adidas, or purchased from any other online retail shopping site which sells Adidas shoes. In this example, customer Joe is unhappy because the shoes were delivered, but they were the wrong size.

Had the consumer transaction occurred utilizing conventional blockchain platforms, the entirety of the transaction data associated with Joe's online shoe purchase transaction may be lost. Again, as noted above, conventional blockchain platforms sometimes promote anonymity and thus permit two parties to exchange value via the blockchain without necessarily identifying the parties.

However, not all businesses wish to operate in anonymity. Thus, utilizing the embodiments as described herein, a smart action is declared and configured to capture various contextual information associated with the shoe purchase transaction, and when customer Joe completes his online shoe purchase transaction, his customer information is captured by the transaction utilizing the smart action which is then transacted onto the blockchain having the capture data embedded within a newly created coin or asset transacted onto the blockchain. Moreover, because the smart action is declared with further defined mappings for the information captured, the customer information for the Adidas customer Joe is further written into the cloud platform provided by the host organization. For example, Joe's customer information may be written into an Account table or a Contact table, or into some other transaction table, thus permitting the captured customer information for Joe to be available not only within the blockchain into which the coin or asset created via the smart action is transacted. Additionally Joe's customer information will be available within the host organization's cloud platform. For instance, according to certain embodiments, customer information may be captured and mapped into the "service cloud" from which tenants and customer organizations may track the various transactions and associated customer data for the purposes of conducting improved and streamlined customer service operations.

With this example, because Joe's customer information is stored within the service cloud offered by the host organization (e.g., due to the declaration of the smart action and the mapping of the customer data captured pursuant to use of the smart action onto the cloud), the company's customer service representatives for Adidas now have ready access to Joe's transaction data for the shoe purchase and will immediately realize the problem and be able to better accommodate the customer's needs and frustration, thus making for an overall better customer service experience for the customer.

According to a particular embodiment, and continuing with the above example, when company Adidas declares a smart action and then creates and transacts a new asset or coin onto the blockchain representing the shoe sale transaction to customer Joe, the captured transaction data is captured as additional context for that particular customer transaction (e.g., the sale of shoes to customer Joe) and it is this captured transaction data which is then shared with the host organization 110, such that the host organization also has permissible access to the customer transaction data for customer Joe.

According to such an embodiment, sharing of the captured transaction data (e.g., data representing the shoe sale transaction with customer Joe or other transaction data as defined by the administrator creating the declarative smart action) provides auditability of the transaction via the shared data stored with the host organization 110. For instance, the transaction data may be stored in compliance with legal, statutory, or accounting requirements or the data may be stored merely for the purposes of business record keeping and auditability. Regardless, such data may, at the option of the respective tenant org 305A-C which owns the data, be shared with the host organization 110 and then preserved by the host organization for later reference, especially for the purposes of auditing such data and transactions. To be clear, it is extremely unlikely that the host organization 110 will have any need to audit such data. Rather, the host organization 110 merely preserves the shared transaction data captured with the coins or assets transacted utilizing the declared smart action onto the blockchain on behalf of the customer organization or tenant to which such shared data belongs. In such a way, the host organization 110 acts as a facilitator for such audits at the election of the tenant or customer organization and upon the affirmative action of the tenant or customer organization actually sharing such data with the host organization for the purposes of data preservation.

As noted above, the captured smart action transaction data may be mapped to network locations, such as being mapped to records or locations within the cloud platform provided by the host organization, as depicted by mapped transaction data 316. Thus, regardless of whether such data is shared with the host organization, the data may be made to be accessible to the customer organization's tools and utilities on the cloud platform. For instance, the data may be mapped into the service cloud provided by the host organization, via which the customer organization's customer service representatives may then readily access the data in fulfillment of their customer service role. Continuing with the example above, a customer service representative for the company Adidas may observe via the captured smart action data that Joe received the wrong size shoes, responsive to which the customer service representative may offer discounts for other products, offer ecommerce rewards points, offer a refund, or offer credit to the customer, based on the captured transaction data stored within the coin or asset transacted onto the blockchain utilizing the smart action and mapped into the service cloud from which the customer service representative accesses the data pertaining to customer Joe's shoe sale transaction.

Even if the customer Joe made the shoe purchase from Adidas anonymously, such discounts and credits may nevertheless be offered to the anonymous customer because the transaction information remains associated with an on-line ecommerce wallet or an on-line ecommerce payment method (e.g., such as a credit card, EFT draft, third party payment provider such as PayPal, Google Wallet, or Amazon Pay, etc.), and thus, the refund, discount, points, or promotions may be applied to that original payment source, even without directly identifying the purchaser.

According to certain embodiments, the smart action transaction data 311 (e.g., transaction information) is captured as part of a smart action transaction from a brick and mortar retailer location such as tenant org 305C. For instance, if a customer swipes their credit card in at a physical POS terminal at the mall or any other retailer, that transaction will initiate the creation of a new asset or coin for the transaction based on a previously declared smart action, thus collecting the various required fields as defined by the administrator.

For instance, such transaction brick and mortar retailer location may require the transaction amount 315B, the authorized signatory, and perhaps the transaction location 315D, all of which composes the captured smart action data 311 for that particular transaction which is then transmitted back to the host organization 110, as shown at FIG. 3B.

According to one embodiment, the captured smart action data 311 is retrieved by a chipped or a magnetic stripe credit card at a POS terminal utilized for the transaction and then embedded in the new asset or coin which is then transmitted back to the host organization 110 as part of a smart action transaction.

Figure 3C:
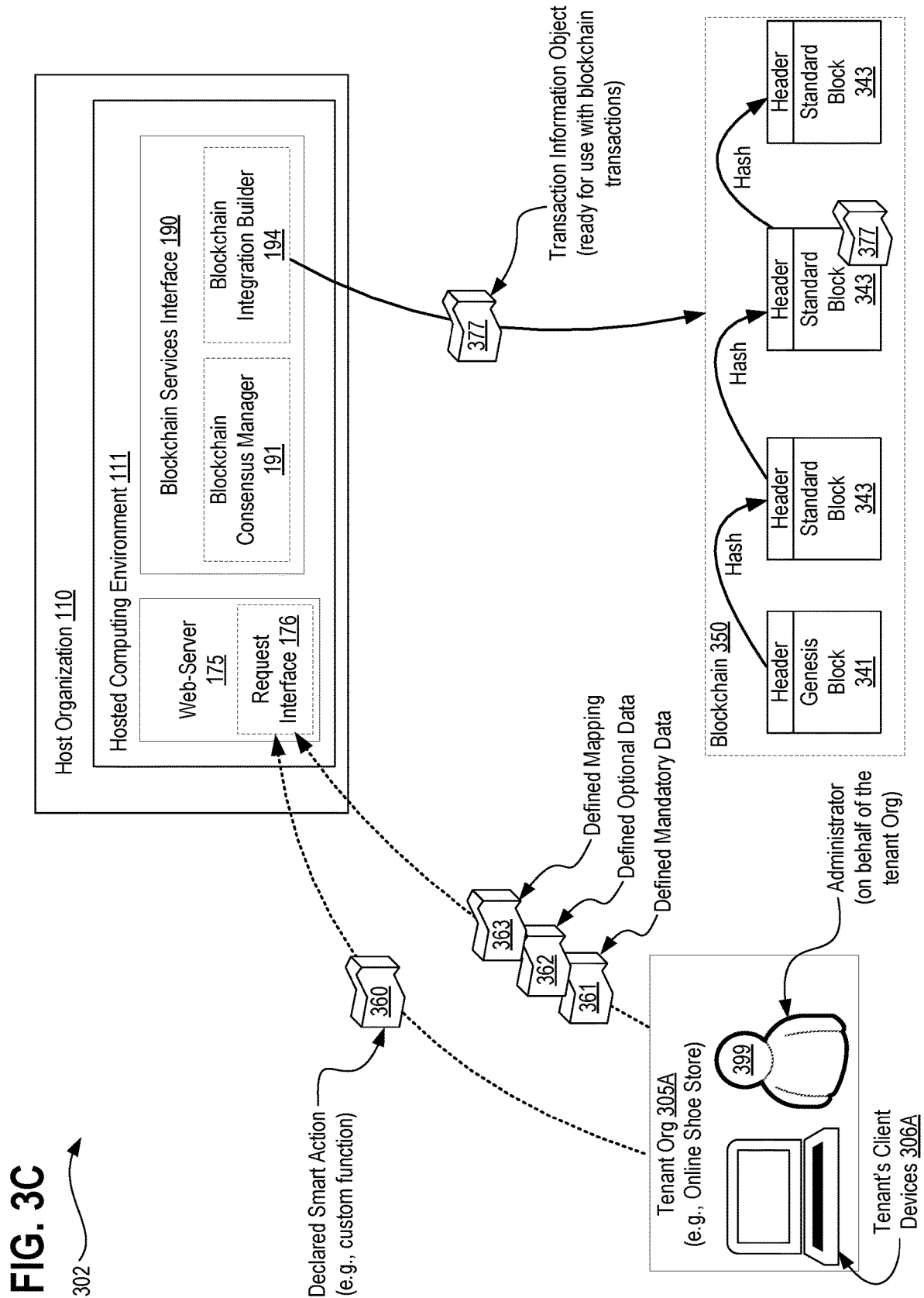
FIG. 3C depicts another exemplary architecture in accordance with described embodiments.

FIG. 3C depicts another exemplary architecture 302 in accordance with described embodiments.

Utilizing the salesforce.com blockchain architecture, and specifically, the blockchain integration builder 194 of the blockchain services interface 190 within the host organization, an administrator 399 defines the coin in the blockchain integration builder 194.

For instance, utilizing a tenant client device 306A, the administrator acting on behalf of the tenant org 305A declares a smart action 360 (e.g., custom function) for use on the blockchain for financial transactions. The administrator 399 has a choice to define what mandatory data 361 and what optional transaction data 362 is to be captured along with the declared smart action 360 when the new smart action is utilized for financial transactions, as well as a mapping for where the transaction information captured with the asset or coin created pursuant to use of the declared smart action 360 shall be stored within the cloud platform provided by the host organization. Thus, there is depicted here, the administrator 399 providing defined mandatory data 361, defined optional data 362, and a defined mapping 363.

Through such a process, the administrator 399 successfully defines a transaction information object 377 for the newly declared smart action 360, with the defined transaction information object 377 being capable to map to any field to an actual object in the tenant organization 305A using field mapping. Any fields not mapped will be available to be typed when the service cloud user conducts a transaction using the newly declared smart action 360, such as transferring coins to a customer. For instance, assets, tokens, or coins may be transferred to the customer Joe, consistent with the preceding example, so as to incentivize the customer or provide a discount or refund to the customer, etc.

Ultimately the configured transaction information object 377 is transacted onto the blockchain 350 and ready for use with incoming blockchain transactions, such as transfers from the company to the customer via a transfer of coins via a smart action transaction.

FIG. 4A depicts an exemplary architecture 401 in accordance with described embodiments.

For instance, there is depicted here an admin computing device 499 communicably interfaced with the commerce cloud platform 195 of the host organization 110 (not shown here).

According to a particular embodiment, the blockchain integration builder 194 of the host organization provides a recommendation agent which is displayed to the graphical user interface (GUI) 403 of the admin computing device 499, thus enabling an administrator for a customer organization to declare a smart action and configure the smart action for use on the blockchain 350.

As depicted here, the admin computing device 499 is utilized by an administrator to configure the defined mandatory data 361 which are then captured by an asset or coin when created pursuant to use of the declared smart action to transact the asset or coin onto the blockchain. As shown here, the recommendation agent 404 has provided multiple suggested mandatory data capture elements which the administrator may then selectively select or unselect. As shown here, the administrator has selected at the GUI 403 all of the proposed data capture elements suggested by the recommendation agent 404 except for the transaction originator 315C data element. The administrator then may click accept on the GUI 403 to capture these defined mandatory data 361 elements into the newly created transaction information object 377 which is then ready for use with blockchain transactions.

Consider for example, the following transaction, following the preceding hypothetical situation with Joe the customer purchasing the shoes from an Adidas retailer. The initial transaction in which Joe purchases the shoes either online or from a brick and mortar retailer is not conducted on the blockchain 350. Rather, it is a normal retail or ecommerce transaction.

If the process ended there, then when Joe the customer telephoned customer support, the customer support representatives may not have sufficient information to assist the customer Joe, thus resulting in a less than optimal customer service experience.

However, with the disclosed embodiments, despite the transaction having occurred off the Blockchain, the transaction triggers or initiates the creation of an asset or coin as part of the transaction with Joe the customer, with the creation of the asset or coin being wholly transparent to the customer. As part of the transaction utilizing the declared smart action, the defined mandatory data elements are therefore captured and embedded into the asset or coin which is then transmitted to the host organization.

Consequently, when Joe the customer telephones customer service, and says "hey, you sent the wrong size shoes," the customer service representatives may quickly locate the details of Joe's transaction (e.g., based on his name, user ID, the transaction date, the transaction amount, a transaction ID indicated on a receipt, etc.) and the agents may then correct the situation with respect to the erroneous shoe size by facilitating a return and a correct shipment.

Moreover, the customer service agents may additionally incentivize the customer so as to improve goodwill and customer retention. For instance, the customer service agents may tell the customer that they are going to transfer to him some coins that have Blockchain value.

Because the prior transaction has been represented on the blockchain 350 by transacting the asset or coin corresponding to Joe's transaction onto the blockchain, it is now possible to transfer some value to Joe the customer via an additional blockchain transaction and rather than such a transaction being wholly anonymous, the context, reason, and origination of that blockchain value is represented as part of the transfer of the blockchain value to the customer. Specifically, the blockchain coins having value are explicitly linked or associated with the prior coin transacted onto the blockchain so as to provide context, traceability, and auditability into the future, as enabled via use of the declared smart action. For instance, next time this retailer or tenant organization interacts with Joe the customer, they will see the history of their interactions with that customer and potentially provide a more satisfactory customer service experience to that customer, as well as possibly re-validate any shipment or order sent to that customer to ensure that past errors are not repeated.

Further still, because the transfer of value corresponds to a transaction on the blockchain 350, other merchants may retrieve the asset or coin from the blockchain and review the embedded transaction information within the asset or coin to understand how and why this particular customer is now in possession of that blockchain value, assuming the asset or coin was created and transferred utilizing the declared smart action.

With conventionally known blockchain platforms, any transfer of value from the tenant org (e.g., Adidas or some other retailer) to Joe the customer may result in Joe the customer having the value, but with no record or auditability trail of where the bitcoin value (now in the possession of Joe the customer) originated, where it came from, or why Joe the customer has such blockchain value as represented by that coin. Moreover, there is no longer any tie or link with the context or situation which resulted in the tenant organization transferring such a coin to Joe the customer.

The embodiments as described herein solve the above problem as there is now contextual information captured via the asset or coin created via the declared smart action with every transaction, and thus, the situation underlying such a blockchain value transfer from the tenant organization to Joe the customer may be ascertained at a later time.

Figure 4B:
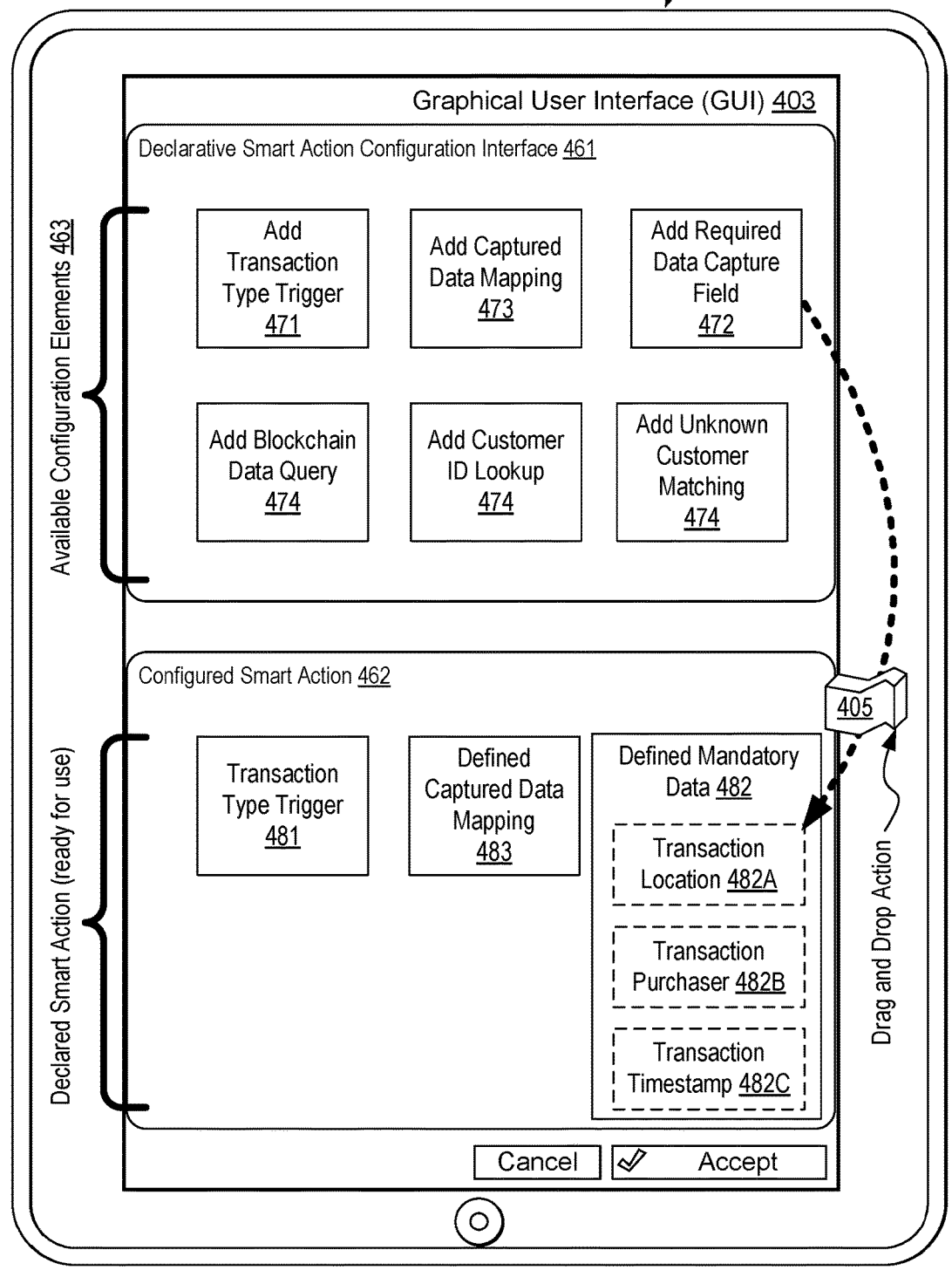
FIG. 4B depicts another exemplary architecture in accordance with described embodiments.

FIG. 4B depicts another exemplary architecture 402 in accordance with described embodiments.

There is again depicted a GUI 403 on the admin computing device 499 by which an administrator for the tenant organization may create and configure a newly declared smart action along with the variously required fields and other configuration options available to the administrator.

Because metadata may permissibly be written for Blockchain, it is possible to create predefined transactions for the blockchain to facilitate sales transactions and other retailer and merchant interactions with a customer, be it a shoe sale transaction, or some other service or merchandise transaction between the merchant/retailer and a customer.

Depicted here is a declarative smart action configuration interface 461 which facilitates the creation of a new smart action via the configured smart action 462 interface at the bottom pane. As shown, an administrator for the tenant organization may utilize the GUI 403 interface to perform drag and drop actions 405 to introduce metadata and configuration elements to the configured smart action 462.

As shown here, there are multiple available configuration elements 463 including "add transaction type trigger" 471 to create a new trigger for a particular type of transaction conducted by the merchant or retailer, such as merchandise sale, merchandise return, merchandise exchange, hold, transfer, wholesale, etc. Similarly, transaction type triggers may be created for services, costs, Purchase Order sales, etc. Further provided via the available configuration elements 463 is the add captured data mapping 473 element which may be dragged and dropped (e.g., action 405) into the configured smart action 462 to create a mapping of captured transaction information of an asset or coin created via the smart action into the commerce cloud platform provided by the host organization. Still further provided is the add required data capture field 472 element which may be dragged and dropped (e.g., action 405) into the configured smart action 462 to define specifically enumerated data fields which must be captured into an asset or coin created via the smart action every time a matching blockchain transaction triggers the instantiation of the smart action based on the configured smart action 462 being created and configured. For example, as depicted below at the configured smart action 462 pane, there has been created a transaction type trigger 481 and a defined captured data mapping 483 within the configured smart action 462 as well as certain required data fields within the defined mandatory data block 482, including the transaction location 482A, transaction purchaser 482B and the transaction timestamp 482C.

Still further depicted is the add blockchain data query 474 element which may be dragged and dropped (e.g., action 405) into the configured smart action 462 to create a blockchain data query for use with a smart action upon its instantiation. Such a query may seek to retrieve data from the blockchain during a transaction for assets and coins created via the declared smart action. Still further shown here is the add customer ID lookup 474 which may be utilized to perform a lookup from the host organization or the commerce cloud platform or the blockchain utilizing a user's customer ID when known. Alternatively, the add unknown customer matching 474 function may be dragged and dropped (e.g., action 405) into the configured smart action 462 so as to enable alternative customer matching when a customer ID is unknown. For instance, matching may be based on data elements such as the customer's name, phone number, rewards card ID, credit card number, receipt number, transaction ID, etc. It is not mandatory that an administrator utilize all of the available configuration elements 463 shown here and there may be additional available configuration elements provided which are not depicted in this particular example.

Once the administrator has finished arranging the configured smart action 462 via the drag and drop 405 actions or adding supplementary code to the various configured blocks as necessary (e.g., to define a blockchain query or a matching function, etc.) then the administrator may click the accept button to save and release the configured smart action 462 for use with the specifically defined transactions based on the transaction type trigger 481.

Pursuant to the creation of the configured smart action 462 which results in the declared smart action ready for use, there are various predefined transactions embedded into the declared smart action which correspond to the dragged and dropped available configuration elements 463.

Therefore, when a customer conducts a transaction, such as the show purchase transaction described above, the declared smart action which is ready for use defines what actions and functions are to occur as part of that exemplary shoe transaction, such as the capture and association of the mandatory data fields with assets and coins created utilizing the smart action and the mapping of such captured transaction data pursuant to the mandatory data fields into the commerce cloud platform of the host organization. These predefined transactions, functions, and actions embedded into the configured smart action 462 become part of the metadata of that smart action and remains with the smart action when assets and coins are transacted onto the blockchain utilizing the smart action. Alternatively, metadata may be registered with the blockchain and stored within configuration settings for the blockchain.

For example, the shoe purchase transaction may correspond to an "issue an asset" instruction for the blockchain in which the smart action is initiated, data is captured pursuant to the mandatory data fields such as the transaction amount, transaction originator, transaction purchaser, and perhaps a purchaser's email address, and then the new asset or coin is transacted onto the blockchain by issuing an asset within the blockchain utilizing the smart action, in which the blockchain which then stores the new asset or coin. Similarly, the predefined transactions for the declared smart action may correspond to an "issue coins" transaction in which blockchain value is transferred from the tenant organization to a customer or to some defined target destination based on the captured mandatory data fields, with the "issue coins" transaction then being transacted onto the blockchain resulting in the transfer of coins, tokens, or blockchain value from the tenant organization to the target. For instance, such an "issue coins" transaction may be performed pursuant to a refund, exchange, or incentive provided by a customer service representative for the tenant organization.

According to another embodiment, there may be two or more pre-defined transactions. For instance, the configured transaction type trigger 481 may instantiate both an "issue an asset" event as well as an "issue coins" event or a "transfer value asset" event. For instance, if a customer purchases a ticket to an event, then it may be that a new asset is issued (e.g., the ticket to the event) which is then transacted onto the blockchain as well as triggering the issue coins or transfer of value event which handles the payment from the customer organization to the tenant organization or to the issuer of the tickets. Such payment may be via coins, blockchain value, tokens, or a conventional credit card transaction.

According to one embodiment, when the transaction type trigger 481 is triggered for a configured smart action 462 that is declared and ready for use, the triggering automatically invokes a "smart contract" or a "smart flow" which has a defined process flow by which to handle the matched transaction. According to certain embodiments, the configuration of the smart contract generates the smart contract as metadata which is either embedded within the new assets or coins created via the smart action or transacted onto the blockchain as stored metadata. In other embodiments, a smart contract is already pre-defined to handle the corresponding transaction type and the dragging and dropping of the add transaction type trigger 471 into the configured smart action 462 provides an element by which to specify and link the pre-defined smart contract. Consequently, when the declared smart action ready for use is triggered, the smart contract is then invoked to handle processing of the matching transaction type.

According to the described embodiments, any matching transaction which is instantiated based on the transaction type trigger 481 will be rejected in the event that the defined mandatory data 482 fields are not provided. Therefore, such a transaction, even if created, will fail to be transacted onto the blockchain due to the missing fields.

In such a way, the creation of the configured smart action 462 via the administrator GUI 403 or via some alternative means results in a declarative smart action or custom function which is ready for use, meaning that the declarative smart action includes at least one or more pre-defined actions which are associated with a transaction information object (e.g., element 377 of FIG. 3C) within which there are pre-defined multiple mandatory data fields which must be captured by the new asset or coin created via the instantiated smart action at the time of use pursuant to a matching transaction. With such embodiments, the add require data capture field 472 is utilized (via a drag and drop action) to define associated mandatory data fields with the transaction information object (e.g., element 377 of FIG. 3C) and the remaining available configuration elements 463 are utilized to define one or more pre-defined actions associated with the transaction information object (e.g., element 377 of FIG. 3C).

Therefore, as part of a transaction which is to be conducted on the Blockchain, there are declared fields and declared actions defined as mandatory and predefined actions to be performed as part of transacting the blockchain transaction onto the blockchain, such as create, update, transfer, etc. Using the metadata written into the asset or coin created using the declared smart action or written into the blockchain's configuration settings, it is permissible to create multiple such fields, such as fifteen different fields of data that must be captured and associated with any transaction followed by a particular declared transaction, such as a transfer transaction. Thus, when the transaction is triggered and those exemplary fifteen different fields are captured, the pre-defined transfer transaction will be initiated, thus performing a transfer transaction via the blockchain. A smart contract associated with the declared smart action will process or execute and reference or utilize at least one defined action.

Any participating nodes with the blockchain may utilize the defined actions, according to certain embodiments, however, only those tenant organizations of the host organization may utilize the declarative smart action capability. Therefore, participating nodes on the blockchain may also utilize create, update, and transfer functions of the blockchain, whereas tenant organizations may instantiate such functions pursuant to the instantiation of a declared smart action.

According to such embodiments, the pre-defined actions which are configured within the declared smart action correspond to base functions available via the blockchain. That is to say that the declarative smart action does not create such blockchain functionality, but rather, the declarative smart action specifies and references those functions which are already available from within the blockchain. According to certain embodiments, the host organization 110 may implement and provide the blockchain and its available functions, but even in that case, the declarative smart action remains a transaction information object (e.g., element 377 of FIG. 3C) within which there are pre-defined multiple mandatory data fields which must be captured by the new asset or coin created via the instantiated smart action at the time of use pursuant to a matching transaction and one or more pre-defined actions.

According to one embodiment, any smart action instantiated pursuant to a matching transaction type trigger will execute in a domain-specific manner. Therefore, if tenant organization Adidas initiates a transfer of blockchain value, then the transfer will be contextually restricted to the domain of that particular tenant organization, Adidas. In such a way, the transfer must be between that tenant organization, Adidas, and a customer or some entity previously associated with the domain within which Adidas operates, such as customer Joe, who has previously conducted a transaction with Adidas or with new customer Jane, initiating a transaction at a brick an mortar retailer with Adidas or a retailer associated with Adidas and thus part of the same domain as tenant organization Adidas.

Figure 4C:
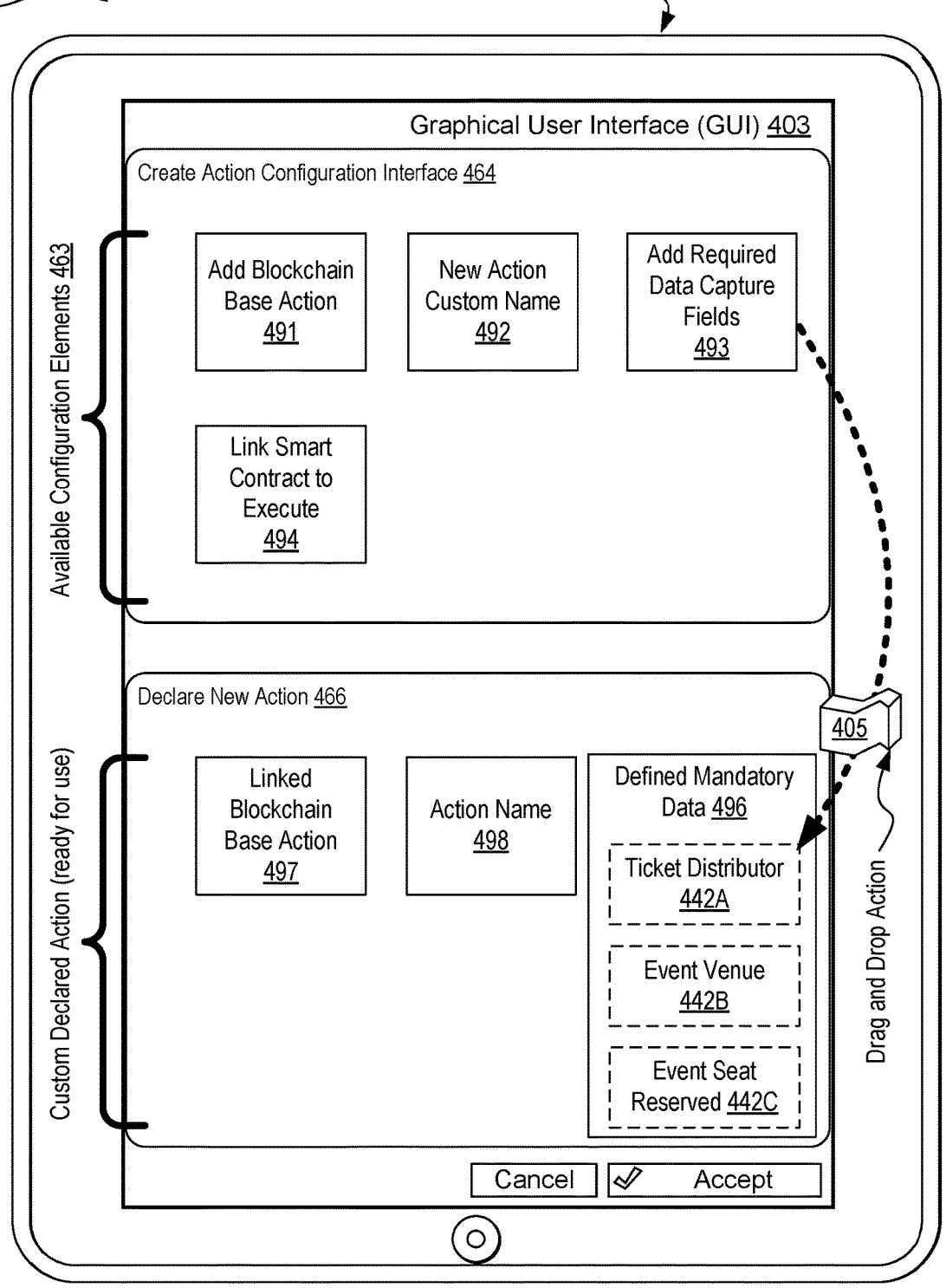
FIG. 4C depicts another exemplary architecture in accordance with described embodiments.

FIG. 4C depicts another exemplary architecture 403 in accordance with described embodiments.

According to certain embodiments, declared actions included with any declared smart action include a modified base action. Therefore, the administrator may create an action called "buy ticket action" which does not exist as a base action for the blockchain, but which may nevertheless be created via the configured smart action 462. When the administrator creates this new "buy ticket action" action, the administer may link it with a base blockchain action and define additional fields, actions, or configuration parameters to be included pursuant to the creation of a new custom "buy ticket" action.

As shown here, there is now depicted a "create action" configuration interface 464 within the GUI 403 as well as a "declare new action" 466 interface.

As before, the administrator may create a new custom declared action ready for use via the declare new action 466 interface at the bottom pane. Further depicted are the available configuration elements 463 now including the add blockchain base action 491 element, a new action custom name 492 element, an add required data capture fields 493 element, and a link smart contract to execute 494 element.

Via the drag and drop actions 405 into the declare new action 466 interface, the administrator creates the new custom declared action. For instance, shown here are the linked blockchain base action and the action name 498 in which the administrator may declare a new "buy ticket" action based on the linked blockchain base action "create" action and then provide the custom action name 498 of "buy ticket." Further defined within the declare new action 466 interface are the defined mandatory data block 496 elements "ticket distributor" 442A and "event venue" 442B and "event seat reserved" 442C. There may be other custom defined mandatory data fields such as associated reserved event seats, purchaser's name, purchase amount, etc.

According to a particular embodiment, use of the declare new action 466 interface at FIG. 4C or the use of the configured smart action 462 interface at FIG. 4B results in the creation of an Application Programming Interface (API) via which the tenant organization may interact to transact with the blockchain, thus, permitting the tenant organization to create custom APIs to interact with the blockchain accessible via the host organizations blockchain services interface 190. Moreover, use of the declare new action 466 interface at FIG. 4C or the use of the configured smart action 462 interface at FIG. 4B results in the creation of a smart contract having metadata embodying the specified actions, required fields to be captured, and other associated parameters where there is not a pre-existing smart contract to be linked with the new declared smart action or the newly declared custom function.

Using such functionality, an administrator for a tenant organization no longer needs to write their own smart contracts as one will be generated for them via the GUI 403.

Further still, upon the creation of domain specific custom actions such as the "buy ticket" action example described here, the tenant may transact with the blockchain utilizing domain-specific actions, such as "buy ticket" within their APIs and calling blockchain transactions and that "buy ticket" action or other custom declared action will then be resolved to the base blockchain action specified via the declare new action 466 interface and executed utilizing the associated configuration options, such as the defined mandatory data 496 elements, any linked smart contract or the automatically generated smart contract, etc.

According to one embodiment, when an administrator creates a new custom declared action via the declare new action 466 interface, the declare new action interface 466 generates both an API via which to call the newly declared action for use with the blockchain and additionally generates and links a new smart contract to the newly declared action via which to enforce any defined mandatory data 496 fields as well as any embedded actions when transacting with the blockchain utilizing the newly declared custom action.

According to another embodiment, newly created custom actions and newly declared smart actions are made available by the host organization 110 for use by tenant organizations other than the tenant organization which created the newly created custom actions and newly declared smart actions. Similarly, tenant organizations utilizing the blockchain services interface 190 and the blockchain integration builder 194 as provided by the host organization 110 may search for, select, and utilize newly created custom actions and newly declared smart actions created by other tenant organizations. When a tenant organization selects a newly created custom action or a newly declared smart action which they did not create, it is made available to that tenant organization for modification, but such modifications are restricted to the domain within which the tenant organization operates and thus, such changes to the newly created custom action or the newly declared smart action will not be imposed upon other tenant organizations, unless those tenant organizations subsequently select the modified version for use. In such a way, a library of newly created custom actions and newly declared smart actions will build over time to enhance usability of the declarative smart action capabilities. According to certain embodiments, the creator of newly created custom functions via the declared smart action functionality may elect whether or not to release their own declared smart action for use by other tenant organizations as well as restrict whether they may be modified by others.

In a related embodiment, the tenant organization that created a custom action utilizing a blockchain base action, such as update, create, transfer, etc., may subsequently create another custom action based on a custom action rather than a blockchain base action. Take for instance the example of a custom action "buy ticket" which requires fields A, B, and C. That tenant organization may subsequently create a new custom action called, for example, "validate ticket" which calls the "buy ticket" action rather than a "create" blockchain base action and which utilizes mandatory data capture fields A and B, but disregards field C, thus no longer requiring field C to be captured. The tenant organization may then specify additional mandatory data capture fields D and E, for example. When a matching transaction for the blockchain triggers is identified, the corresponding declared smart action triggers execution of a smart contract which will again enforce the mandatory fields to be captured with any new coin or asset created utilizing the matching declared smart action or cause the blockchain transaction to fail if the mandatory fields are not captured.

Figure 5:
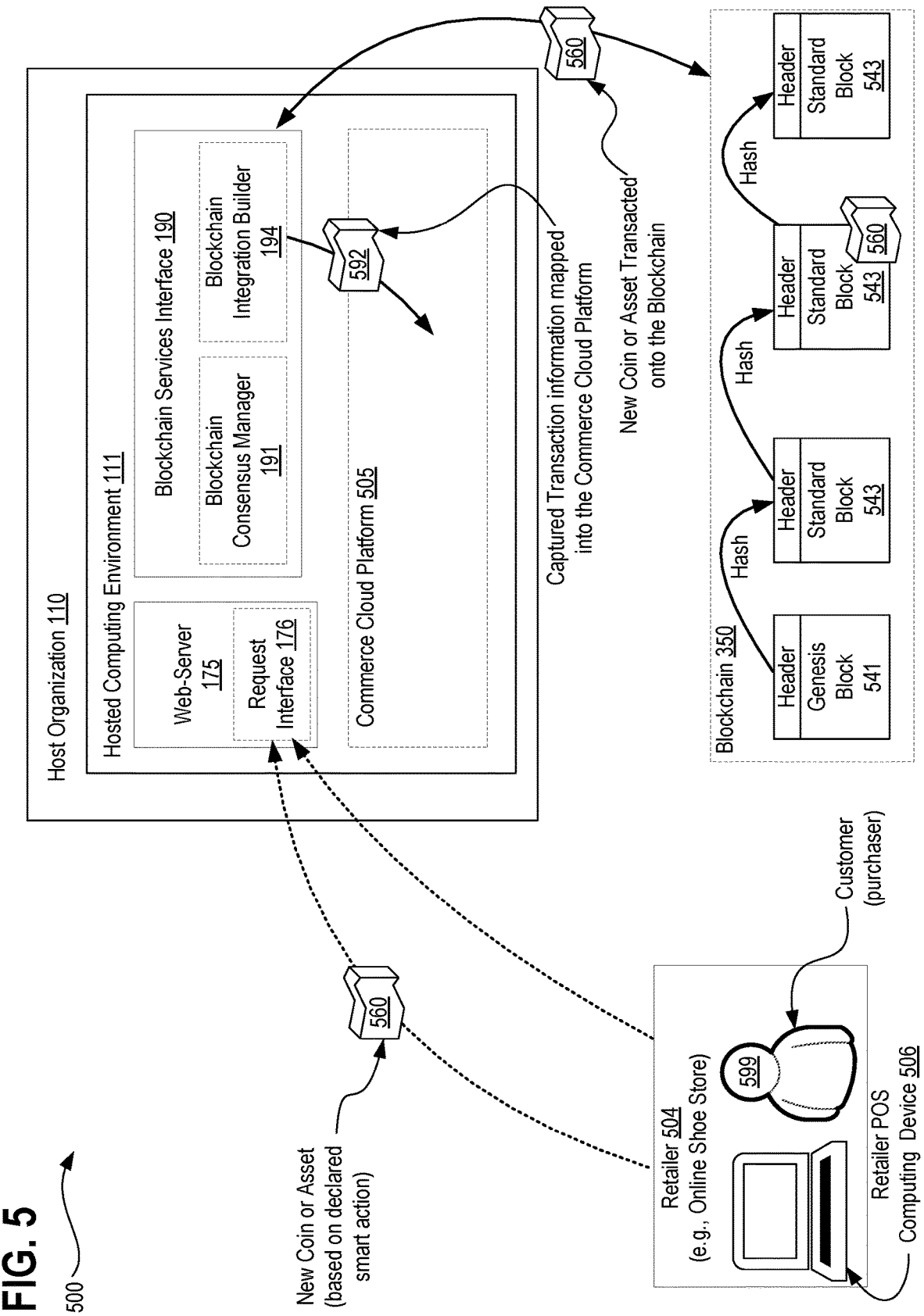
FIG. 5 depicts another exemplary architecture, with additional detail of a permissioned blockchain which enables a commerce cloud platform to receive captured transaction information, in accordance with described embodiments.

FIG. 5 depicts another exemplary architecture 500, with additional detail of a permissioned blockchain 540 which enables a commerce cloud platform 505 to receive captured transaction information 592, in accordance with described embodiments.

As depicted here, there is again a host organization 110 having a hosted computing environment 111 operating therein with a web-server 175 and request interface 176.

Also shown here is a commerce cloud platform 505 which is interacting with a permissioned ledger bridge 510 including functionality for querying the permissioned blockchain 540 accessible via the permissioned ledger bridge 510 of the blockchain services interface 190. The two directional arrow indicates that the blockchain services interface may transact new coins or assets 560 onto the blockchain 350 utilizing a declared smart action as well as query for and retrieve embedded transaction information from assets and coins stored on the blockchain via the declared smart action based on information embedded within any asset or coin created utilizing the declared smart action.

As shown here, coins and assets 560 created utilizing the declared smart action are communicated from the retailer 504 to the request interface 176 of the host organization 110. Once the new asset or coin is at the host organization 110, two functions occur, without respect to any required order. Specifically, the new asset or coin 560 is transacted onto the blockchain 350 and thus, it and its embedded captured transaction information is now visible on the blockchain to all participating nodes of the blockchain. Additionally, the host organization writes the captured transaction information 592 into the commerce cloud platform 505 based on the specifications indicated by the administrator having created the new declarative smart action for use with such transactions. Thus, when the customer 599 or purchaser conducts a transaction by swiping a credit card at the retailer POS computing device 506 or by completing an ecommerce transaction, the declarative smart action is triggered, thus creating the new asset or coin 560 which ultimately is transacted onto the blockchain 350 using the declared smart action and which is represented via its captured transaction information which is mapped into the commerce cloud platform 505.

Further depicted within the permissioned blockchain 540 are the recognizable series of blocks forming the blockchain onto which the new asset or coin is transacted. The blockchain 350 is formed from the genesis block 541 and then a series of standard blocks 543, each having a header connected to a prior hash. There are not currently any fork blocks or side chain blocks for this permissioned blockchain, although such mechanisms remain permissible. Depicted at the third block from the left within the blockchain 350 the new asset or coin 560 is observable having been transacted onto the blockchain 350.

As noted above, there may be various participants utilizing the blockchain 350, thus creating a blockchain wallet function which and a network amongst the various participants, each of which may now exchange blockchain value with one another and retrieve the captured transaction information embedded within any new asset or coins transacted onto the blockchain 350 using the declared smart action. Such participants may include not just the customer 599, but additionally banking industry participants, such as Visa, MasterCard, American Express, Chase, Bank of America and JP Morgan, and others, which facilitate blockchain value with conventional monetary instruments, such as a country's currency (e.g., such as U.S. Dollars, Euros, etc.).

According to one embodiment, the host organization implements a blockchain wallet, via which, tenant organizations may transfer blockchain value, such as coins, tokens, etc., from customers as payment or to customers as refunds or monetary incentives. With such a blockchain wallet, the host organization thus provides a network of customers, retailers, and tenant organizations, all of which may interact with one another by transferring value within the network formed via the blockchain wallet. With such an embodiment, all transfers correspond to transactions on the blockchain 350, regardless of the blockchain wallet participants associated with any given transaction.

Further still, because the blockchain wallet forms a network of customer participants and merchants, retailers, tenant organizations, etc., it is further possible for a different merchant to improve their own interactions with a known customer based on information captured pursuant to a prior transaction for that customer and embedded into the declarative new asset or coin created using the declared smart action. For example, Joe the customer may have purchased the wrong sized shoes from Adidas online, thus resulting in the above-described return and transfer of value. Notably, the captured transaction information is not only embedded within the new asset or coin and transacted onto the blockchain using the declared smart action, but according to such an embodiment, the captured transaction information is additionally mapped into the Commerce Cloud platform by the host organization and stored by the host organization.

Therefore, if Joe the customer were to now visit a FootLocker store, that previously stored captured transaction information may be retrieved from the commerce cloud platform 505 provided by the host organization 110. Because other merchants are enabled to view the captured transaction data from the transaction with customer Joe, it is therefore possible for those merchants to understand why that customer has the blockchain value and the circumstances through which such value was transferred to Joe. Moreover, if FootLocker or another merchant obtains the customer ID, for instance, from the customer Joe directly or from a rewards card, etc., then those merchants may now validate that their customer is the same customer now corresponding to the captured transaction information stored within the blockchain and stored within the host organization 110 which is then retrieved by a subsequent merchant.

According to certain embodiments, customers which utilize cash are requested to provide information via which they may be linked to a known customer ID. In alternative embodiments, a customer may utilize cash but wish to remain anonymous, in which case a new customer ID is generated and the mandatory data is nevertheless entered as captured transaction information, however, a placeholder may need to be utilized for those fields which are unknown, such as the customer's ID if that is a required data element for the transaction. Thus, the new asset or coin is still created and transacted onto the blockchain 350 utilizing the smart action and its captured transaction information mapped into the host organization, albeit with some placeholder data entered in lieu of having certain unknown information from the anonymous customer.

The blockchain may constitute a permissioned blockchain. Permissioned blockchains differ from public blockchains and differ also from private blockchains. Depending on the particular blockchain protocol and the implementation decisions for the blockchain, a blockchain may be built and accessed in multiple ways. For instance, Bitcoin provides a popular cryptocurrency blockchain which allows anyone to participate in the network (as a participating node) and with the uninhibited functional capacity of a full node, or a contributing miner. Permissioned blockchains utilize an access control layer which simply does not exist for the Bitcoin blockchain protocol implementation, which thus permits any system to take on a read-only role, or to introduce and make legitimate and permissible changes to the blockchain, such as adding a new block or maintaining a full copy of the entire blockchain.

Additionally, there are certain blockchains that need special permissions to read, access, and write information on them. The intrinsic configuration of such blockchains controls the participants' transactions and defines their roles in which each participant may access and contribute to the blockchain. The configuration may also include maintaining the identity of each blockchain participant on the network. Such blockchains are therefore called permissioned blockchains. For example, the blockchain protocol for the permissioned blockchain may specify roles for a select number of participants who may act as transaction validators on the permissioned blockchain network.

Permissioned blockchains sometimes used by industry-level enterprises and businesses, for which security, identity and role definition are important. For instance, a manufacturer producing a product may use a permissioned blockchain that also takes care of supply chain management. However, the transactions that occur on such a blockchain may also involve logistics partners, financing banks, and other vendors involved in the supply and financing process. These external parties, though part of the permissioned blockchain network 540, need not know the price at which the manufacturer supplies the products to various clients, with such information being controlled via an access control layer as restricted data or perhaps certain participants are prohibited from accessing restricted functions of a permissioned blockchain network pursuant to their role, such as adding a transaction to the permissioned blockchain or voting in a consensus mechanism for the permissioned blockchain. Use of permissioned blockchains allows such role-limited implementations.

Such blockchains, which allow equal and open rights to all participants, are referred to as open, public, or un-permissioned blockchains, readily identifiable by the lack of an access control layer. The particular type of blockchain utilized for transacting the new asset or coin created via the declared smart action may be specified by the host organization or may be selectable by an admin for a tenant organization utilizing the functionality.

Because the commerce cloud platform 505 has access to the blockchain 350 via the blockchain services interface 190, the commerce cloud platform 505 may query the blockchain 350 from the host organization. Such a query may retrieve transaction data for transactions which were not facilitated by the host organization 110, and which therefore do not have their captured transaction data already mapped into the commerce cloud platform 505.

According to another embodiment, a merchant or retailer may identify customers by alternative means which do not include the use of the customer's ID. For instance, a merchant or retailer 504, be it an online ecommerce entity or a brick and mortar retailer, may identify a customer based on a previously established association between the customer's credit card with an asset or coin previously transacted onto the blockchain 350 using the declared smart action (e.g., custom function). Once that customer is identified, the merchant or retailer 504 may provide the identified customer with more personalized service, such as recognizing prior purchases, or recognizing the prior erroneous shoe size shipment as described by the preceding example.

Figure 7:
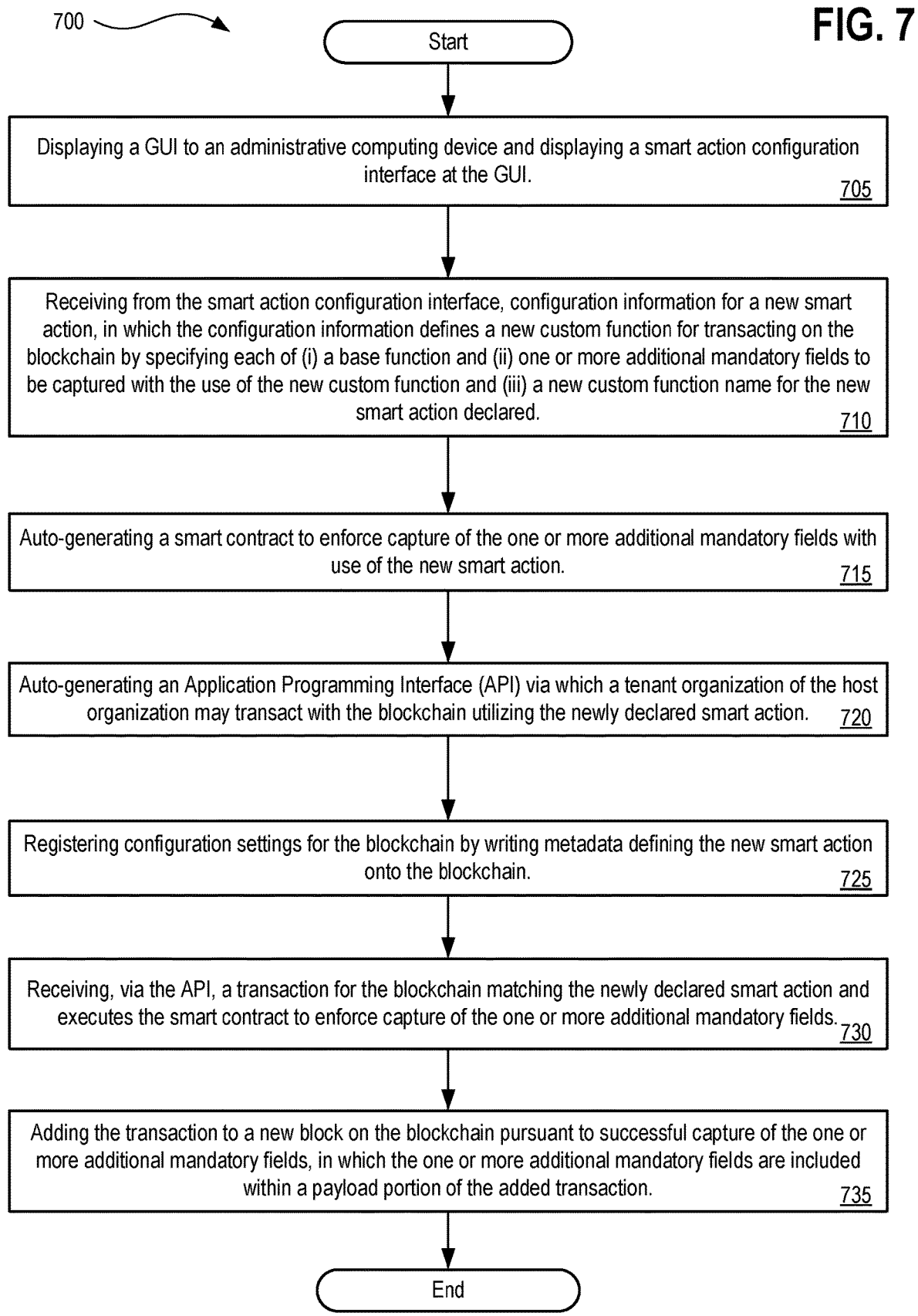

FIGS. 6 and 7 depict flow diagrams illustrating methods 600 and 700 for implementing declarative smart actions for coins and assets transacted onto a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Methods 600 and 700 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1150, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 600 depicted at FIG. 6, at block 605, processing logic operates a blockchain interface to a blockchain on behalf of a plurality of tenants of the host organization, in which each one of the plurality of tenants operate as a participating node with access to the blockchain.

At block 610, processing logic defines a blockchain protocol for the blockchain, the blockchain protocol defining a group of base functions for the blockchain, in which the group of base functions accessible to any participating node of the blockchain.

At block 615, processing logic declares a new custom function by specifying each of (i) a base function and (ii) one or more additional mandatory fields to be captured with the use of the new custom function and (iii) a new custom function name for the new custom function declared.

At block 620, processing logic associates a smart contract with the new custom function to enforce capture of the one or more additional mandatory fields with use of the new custom function.

block 625, processing logic writes metadata onto the blockchain defining the new custom function.

At block 630, processing logic receives a transaction for the blockchain matching the new custom function based on the new custom function name and executes the smart contract to call the base function and to validate the one or more additional mandatory fields are provided with the received transaction.

At block 635, processing logic adds the transaction to a new block on the blockchain via the base function specified by the new custom function pursuant to successful validation by the smart contract, in which the one or more additional mandatory fields are included within a payload portion of the added transaction.

With reference to method 700 depicted at FIG. 7, at block 705, processing logic displays a GUI to an administrative computing device and displaying a smart action configuration interface at the GUI.

At block 710, processing logic receives from the smart action configuration interface, configuration information for a new smart action, in which the configuration information defines a new custom function for transacting on the blockchain by specifying each of (i) a base function and (ii) one or more additional mandatory fields to be captured with the use of the new custom function and (iii) a new custom function name for the new smart action declared.

At block 715, processing logic auto-generates a smart contract to enforce capture of the one or more additional mandatory fields with use of the new smart action.

At block 720, processing logic auto-generates an Application Programming Interface (API) via which a tenant organization of the host organization may transact with the blockchain utilizing the newly declared smart action.

At block 725, processing logic registers configuration settings for the blockchain by writing metadata defining the new smart action onto the blockchain.

At block 730, processing logic receives, via the API, a transaction for the blockchain matching the newly declared smart action and executes the smart contract to enforce capture of the one or more additional mandatory fields.

At block 735, processing logic adds the transaction to a new block on the blockchain pursuant to successful capture of the one or more additional mandatory fields, in which the one or more additional mandatory fields are included within a payload portion of the added transaction.

According to another embodiment of methods 600 and 700, declaring the new custom function includes declaring a smart action for coins or assets transacted onto the blockchain using a Distributed Ledger Technology (DLT) as defined by the blockchain protocol for the blockchain.

For example, the new custom function may also be referred to as a "smart action" or a "declarative smart action" via which administrators for the tenant organizations may declare domain specific smart actions for use within their respective tenant organization. In other embodiments, administrators for a tenant organization or administrators for the host organization may declare non-domain-specific smart actions which are accessible for use by multiple tenant organizations for transacting coins and assets onto the blockchain.

According to another embodiment of methods 600 and 700, the base function specified by the new custom function declared is a CREATE asset command function; and in which adding the transaction to the new block on the blockchain includes executing the CREATE asset command function to add a new asset to the blockchain having embedded within the payload portion of the new asset the one or more additional mandatory fields.

For example, the CREATE asset command function may be a native function for the blockchain pursuant to the defined blockchain protocol. However, the newly declared smart action (via the custom function) may be utilized to customize a new smart action which utilizes the underlying base function, such as the CREATE asset but then adds additional functionality on top of that base function, such as requiring additional mandatory data fields to be captured or executing a specific smart contract to enforce the data capture requirements.

According to another embodiment of methods 600 and 700, the base function specified by the new custom function declared is either a CREATE coin command function or a CREATE token command function; in which adding the transaction to the new block on the blockchain includes executing the CREATE coin command function or the CREATE token command function to add a new coin or token to the blockchain having embedded within the payload portion of the new asset the one or more additional mandatory fields; and transferring monetary value into the newly added coin or token based on the received transaction, in which the one or more additional mandatory fields record into the blockchain an audit trail for the transfer of the monetary value.

For example, unlike conventional blockchain implementations which are highly restrictive and do not permit modification of the underlying base functions, through practice of the disclosed embodiments, tenant organization administrators may create customized functionality via which to transact with the blockchain, despite the blockchain's protocol being defined by the host organization or a third party.

According to another embodiment of methods 600 and 700, the base function specified by the new custom function declared is an UPDATE asset command function; in which adding the transaction to the new block on the blockchain includes executing the UPDATE asset command function to modify an existing asset recorded by the blockchain by modifying the payload portion of the existing asset to alter any of: (i) data within the one or more additional mandatory fields declared by the new custom function or (ii) data within any mandatory field associated with the base function specified by the new custom function declared or (iii) data within any optional fields declared by the new custom function.

For example, modifying the payload portion of the existing asset may include adding data to the payload portion, altering data within the payload portion, or deleting from the payload portion of the existing asset on the blockchain. Additionally, adding the transaction to update an existing asset requires the updated asset be subjected to the consensus protocol for the blockchain by the participating nodes of the blockchain before the added transaction to update the asset will be accepted as part of the primary chain of the blockchain.

According to another embodiment of methods 600 and 700, the base function specified by the new custom function declared includes one of: a CREATE asset command function for a new custom function name called "SELL TICKET" and in which the one or more additional mandatory fields declared require at least "venue" and "seat" fields to be captured; a CREATE coin command function for a new custom function name called "REFUND" and in which the one or more additional mandatory fields declared require at least "U.S. dollar amount" and "original payment means" fields to be captured; an UPDATE asset command function for a new custom function name called "RENAME" or "RE-LABEL" and in which the one or more additional mandatory fields of an existing asset on the blockchain are modified pursuant to use of the new custom function being called.

In such a way, users and administrators may create smart actions with intuitive names which meet their business requirements for transacting with the blockchain. Such transactions may be, for instance, selling tickets to a venue, issuing credit or reward points for merchandise sold, issuing monetary refunds for merchandise, making a restaurant reservation, or updating a customer's policy, such as a homeowners, car, or life insurance policy, and so forth.

According to another embodiment of methods 600 and 700, the added transaction is subjected to a consensus protocol by the participating nodes of the blockchain prior to the added transaction being accepted as part of a primary chain of the blockchain by the participating nodes of the blockchain.

For example, transacting on the blockchain retains consensus schemes required for that blockchain so as to ensure transaction validity.

According to another embodiment of methods 600 and 700, the base function specifies at least a mandatory action and one or more mandatory fields to be captured with use of the base function distinct from the one or more additional mandatory fields specified with declaration of the new custom function; and in which adding the transaction to the new block of the blockchain via the base function further includes executing the mandatory action and including the one or more mandatory fields with the one or more additional mandatory fields within the payload portion of the added transaction.

For example, the base function performs a mandatory action which will be adopted by the declared smart action. Additionally, the base function will include one or more mandatory fields to be collected which are then supplemented, or in certain cases, supplanted, by the one or more additional mandatory data fields specified with the declaration of the smart action. In such a way, the newly declared custom function may be declared and customized to the needs of the particular tenant organization while leveraging the existing functionality already supported as a base function by the blockchain.

According to another embodiment of methods 600 and 700, writing the metadata onto to the blockchain includes writing a transaction information object onto the blockchain ready for use with transacting coins or assets onto the blockchain; and in which the metadata is embedded within the transaction information object written onto the blockchain.

According to another embodiment of methods 600 and 700, writing the transaction information object onto the blockchain includes transacting a new asset onto the blockchain via a CREATE asset command function for the blockchain and embedding the transaction information object and the metadata embodied therein within a payload portion of a new block for the blockchain.

For example, via the newly declared smart action, the metadata is registered within the blockchain itself and stored as configuration settings within the blockchain. For example, the protocol payload block may be updated to store the metadata which defines the newly declared smart action's custom function, including the smart contract execution which is to be triggered and the name for the new smart action and the one or more additional mandatory fields to be captured and enforced via use of the smart action's custom function.

According to another embodiment of methods 600 and 700, writing the metadata onto the blockchain defining the new custom function includes storing the metadata within the blockchain, in which the metadata defines each of (i) the base function and (ii) the one or more additional mandatory fields to be captured with the use of the new custom function and (iii) the new custom function name.

According to another embodiment of methods 600 and 700, the metadata is accessible only to one of the plurality of tenants of the host organization having declared the new custom function on the blockchain; and in which the new custom function is domain specific to the one of the plurality of tenants of the host organization having declared the new custom function on the blockchain permitting exclusive use of the new custom function by the one of the plurality of tenants and by no other tenant of the host organization.

According to another embodiment of methods 600 and 700, the metadata is accessible all of the plurality of tenants operating as one of the participating nodes with access to the blockchain regardless of which one of the plurality of tenants declared the new custom function on the blockchain; and in which the new custom function is callable via any of the plurality of tenants operating as one of the participating nodes with access to the blockchain for transacting coins or assets onto the blockchain.

For example, it is possible to declare smart actions which are domain-specific to a particular tenant organization that created the smart action. However, there may be instances in which an administrator for the host organization wishes to create a non-domain-specific smart action which is then made accessible to any tenant organization operating as a participating node within the blockchain or in certain instances, a tenant organization may wish to declare a smart action which is accessible to other tenant organizations.

According to another embodiment of methods 600 and 700, modification of the new custom function is under the exclusive control of the one of the plurality of tenants having declared the new custom function on the blockchain; in which a new consensus is required to write new metadata onto the blockchain defining any modification to the new custom function by the one of the plurality of tenants having declared the new custom function on the blockchain when the new custom function is accessible to any of the plurality of tenants operating as one of the participating nodes with access to the blockchain; and in which no consensus is required to write the new metadata onto the blockchain defining any modification to the new custom function by the one of the plurality of tenants having declared the new custom function on the blockchain when the new custom function is accessible for exclusive use by only the one of the plurality of tenants having declared the new custom function on the blockchain.

For example, where the declared smart action is accessible to other tenant organizations, then modifications are subjected to consensus controls, however, if the declared smart action is domain specific and limited to the exclusive use by the tenant organization having declared the smart action, then it is not necessary to enforce consensus of such modifications, though optionally, the blockchain protocol may require the consensus operation regardless.

According to another embodiment of methods 600 and 700, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

For example, certain blockchains are implemented by the host organization itself, in which the host organization defines the blockchain protocol and facilitates access to the blockchain on behalf of its tenant organizations who then operate as participating nodes on the host org provided blockchain, optionally with non-tenant orgs also permitted as participating nodes at the discretion of the host organization. However, there are also existing blockchain implementations which are not defined by or implemented by the host organization and thus, operate external from the host organization with such blockchain protocols having been defined by a third party or an outside consortium or standards body. In such an event, the host organization may nevertheless facilitate access to the blockchain by operating as a participating node itself on the blockchain, via which the host organization may then have access to the functions of the blockchain. In such an event, permissions and access rights may be granted by the tenant orgs to the host organization to act on their behalf as a proxy, or the host organization may implement virtual participating nodes on the blockchain within which each tenant org may operate as a participating node, thus providing a 1:1 correspondence between the tenant orgs and the virtual nodes implemented by the host organization or the host organization may execute the associated smart contract and perform validation of received transactions for the blockchain, but then permit the tenant organization's own participating node to self-authenticate with and then actually transact with the blockchain, for instance, via the host organization provided API. In such a way, tenant orgs may add transactions to the blockchain (subject to consensus) regardless of which the blockchain is implemented by the host organization or a third party.

According to another embodiment of methods 600 and 700, receiving the transaction for the blockchain matching the new custom function based on the new custom function name includes receiving the transaction calling the new custom function by its declared new custom function name and providing the one or more additional mandatory fields with the call to the new custom function; in which the smart contract validates the specified new custom function name and validates the base function specified and enforces the capturing of the one or more additional mandatory fields; and in which pursuant to successful validation by the smart contract, the transaction is added onto a new block of the blockchain with the one or more additional mandatory fields written into a payload portion of the new block with the added transaction.

According to another embodiment of methods 600 and 700, writing the metadata onto the blockchain defining the new custom function includes writing a transaction information object onto the blockchain defining within the metadata, for the new custom function declared, at least: (i) the base function specified by the new custom function declared; (ii) the one or more additional mandatory fields to be captured with the use of the new custom function declared; (iii) the new custom function name for the new custom function declared; and (iv) the smart contract associated with the new custom function which is to enforce capture of the one or more additional mandatory fields with use of the new custom function.

According to another embodiment of methods 600 and 700, declaring the new custom function includes further specifying: one or more additional optional fields to be captured with the use of the new custom function; and a defined mapping of the one or more mandatory fields and the one or more additional optional fields into the host organization.

For example, because the host organization is facilitating access to the blockchain via the blockchain services interface, the tenant organizations benefit from access to both data and functions of the blockchain as well as data and functions provided by the host organization itself. This permits greater flexibility on behalf of the tenant organization to perform a variety of CRM related functions as well as general application and data processing as the tenant organization sees fit. To facilitate such benefits, the tenant organization may further configure a defined mapping with their newly declared smart action via which the host organization will persist the captured data fields of an asset or coin being transacted onto the blockchain within the database system of the host organization. For instance, such data may be persisted onto a commerce cloud platform, or persisted into a CRM associated with the tenant organization or persistently stored within any other location within the host organization to which the tenant organization has permission to access. Therefore, additional processing may be performed by the tenant organization on the host-organization side without necessarily having to retrieve the data from the blockchain, though doing so is feasible. Moreover, certain applications of the tenant organization may benefit from improved performance by accessing such data from within the host organization without necessarily having to retrieve the information from a linked blockchain to which the tenant organization has access.

According to another embodiment of methods 600 and 700, declaring the new custom function includes further specifying a defined mapping of the one or more additional mandatory fields into the host organization; in which pursuant to successful validation of the by the smart contract, the host organization adds the transaction onto the blockchain and additionally writes data captured via the one or more additional mandatory fields into persistent storage within the host organization; and in which the one or more additional mandatory fields written into persistent storage within the host organization are stored separately from payload data of the transaction added onto the blockchain having the one or more additional mandatory fields embedded therein to create duplicative copies of the one or more additional mandatory fields accessible from both the host organization's persistent storage and the blockchain.

According to another embodiment of methods 600 and 700, associating the smart contract with the new custom function includes one of: associating a custom smart contract with the new custom function based on the custom smart contract being specified with declaration of the new custom function, in which the custom smart contract overrides any default smart contract associated with the base function; and associating the default smart contract with the new custom function based on the base function specified when the custom smart contract is not specified with declaration of the new custom function; and in which adding the transaction to the blockchain requires successful validation via one of the default smart contract or the custom smart contract.

According to another embodiment of methods 600 and 700, associating the smart contract with the new custom function includes: associating a default smart contract with the new custom function based on the base function specified; further associating a custom smart contract with the new custom function based on the custom smart contract being specified with declaration of the new custom function, in which the default smart contract and the custom smart contract execute sequentially; and in which adding the transaction to the blockchain requires successful validation of both the default smart contract and the custom smart contract.

According to another embodiment, methods 600 and 700 further include: displaying a Graphical User Interface (GUI) to a user device communicably interfaced with the host organization, the user device authenticated as belonging to one of the plurality of tenant organizations; in which the GUI displays the one or more additional mandatory fields to be captured for the transaction; communicably interfacing with a Customer Relationship Management (CRM) of the respective tenant organization operating within the host organization; auto-populating at least one of the one or more mandatory fields to be captured by retrieving corresponding data from the CRM of the tenant organization; and in which receiving the transaction includes receiving the transaction from the GUI displayed to the user device.

For example, because the tenant organization may be authenticated by the host organization, its CRM data may also be linked and accessible. Thus, certain mandatory fields associated with the base function of the new custom function or optional fields or any of the one or more mandatory fields may be knowable based on other information completed within the GUI, and thus, those additional fields may be auto-completed or auto-populated within the GUI and then submitted with the transaction. Consider for example a customer coming to a brick and mortar store or an on-line ecommerce store seeking to make a return transaction for previously purchased merchandise. The transaction ID is known via the ecommerce system based on the customer logging in, or the transaction ID may be knowable at a brick and mortar store by scanning the receipt's bar code/QR code, or by looking up the transaction via the customer's ID, or the customer's name, or the customer's credit card information. Once the transaction ID is known, the record may be located within the tenant organization's linked CRM system, and other fields may thus be retrieved and auto-populated within the GUI, such as the customer's name, the purchase amount, item description for returned merchandise, etc. Similarly, a smart action may seek to utilize a custom RENAME or RE-LABEL custom function to update a previously issued event ticket. By scanning or capturing the ticket number, other information associated with that ticket may then be retrieved from the tenant organization's CRM system so as to populate other data fields at the GUI. The user device may then accept input at the GUI to, for example, modify the issued ticket based on the displayed fields at the GUI being changed or updated, responsive to which the RENAME or RE-LABEL smart action will then trigger a custom function previously declared by the tenant organization to transact an UPDATE asset command term to the blockchain so as to effectuate the modified fields at the GUI into the existing asset on the blockchain. Other uses for the GUI include providing customer identity lookup for a known customer ID or unknown customer matching functions for an unknown customer having no known customer ID, and thus permitting matching from the GUI via alternative means, such as name, credit card number, transaction ID, etc.

According to another embodiment, methods 600 and 700 further include: displaying a Graphical User Interface (GUI) to an admin computing device communicably interfaced with the host organization, the admin computing device authenticated as belonging to one of the plurality of tenant organizations; in which the GUI displays a declarative smart action configuration interface via which the admin computing device may configure the new custom function; and in which declaring the new custom function includes receiving declaration of the new custom function from the GUI with each of (i) the base function and (ii) the one or more additional mandatory fields to be captured and (iii) the new custom function name for the new custom function declared having been specified via the GUI.

According to another embodiment, methods 600 and 700 further include: displaying a Graphical User Interface (GUI) to an admin computing device communicably interfaced with the host organization, the admin computing device authenticated as belonging to one of the plurality of tenant organizations; in which the GUI displays a plurality of selectable fields provided by a recommendation agent of the host organization; receiving input from the admin computing device indicating selection at the GUI of one or more of the plurality of selectable fields displayed to the GUI; and in which declaring the new custom function includes specifying the one or more additional mandatory fields to be captured using the one or more of the plurality of selectable fields selected at the GUI pursuant to the received input from the admin computing device.

For example, the recommendation agent may push suggested fields for inclusion with the newly declared smart action, and by selecting those selectable fields at the GUI, the admin may incorporate those recommended fields into the newly declared smart action. Similarly, the recommendation engine may recommend and push to the GUI, one or more functions or actions to be included for execution via the smart contract. For instance, the recommendation engine may display to the GUI, transaction type triggers, a data mapping configuration interface, blockchain queries, customer lookup functions, unknown customer matching functions, etc., each of which are selectable at the GUI for inclusion with the newly declared smart action.

According to another embodiment, methods 600 and 700 further include: auto-generating an Application Programming Interface (API) via which the participating node having declared the new custom function interacts with the new custom function to add the transaction to the blockchain.

For example, because the information for the smart action defined by the new custom function is stored within the blockchain (e.g., via the transaction information object written as metadata onto the blockchain), tenant organizations are enabled to define a new smart action based on an existing base function for the blockchain (e.g., such as CREATE asset, or CREATE coin, or CREATE token, or UPDATE asset, or UPDATE coin, or UPDATE token, etc.). The specified information for the newly declared smart action including any additional mandatory data fields and any custom smart contracts used for validation is then written into the blockchain and a new API is auto-generated via which the tenant org may then call the new smart action's custom function from other applications and code executing within the host organization's ecosphere of cloud based services. In such a way, once an admin for the tenant organization declares the smart action, that tenant organization's code and application may then seamlessly transact with the blockchain utilizing the newly declared smart action via the auto-generated API.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each one of the plurality of tenants operate as a participating node with access to the blockchain; in which a blockchain protocol for the blockchain defines a group of base functions for the blockchain, the group of base functions accessible to any participating node of the blockchain; declaring a new custom function by specifying each of (i) a base function and (ii) one or more additional mandatory fields to be captured with the use of the new custom function and (iii) a new custom function name for the new custom function declared; associating a smart contract with the new custom function to enforce capture of the one or more additional mandatory fields with use of the new custom function; writing metadata onto the blockchain defining the new custom function; receiving a transaction for the blockchain matching the new custom function based on the new custom function name and executing the smart contract to call the base function and to validate the one or more additional mandatory fields are provided with the received transaction; and adding the transaction to a new block on the blockchain via the base function specified by the new custom function pursuant to successful validation by the smart contract, in which the one or more additional mandatory fields are included within a payload portion of the added transaction.

Figure 8:
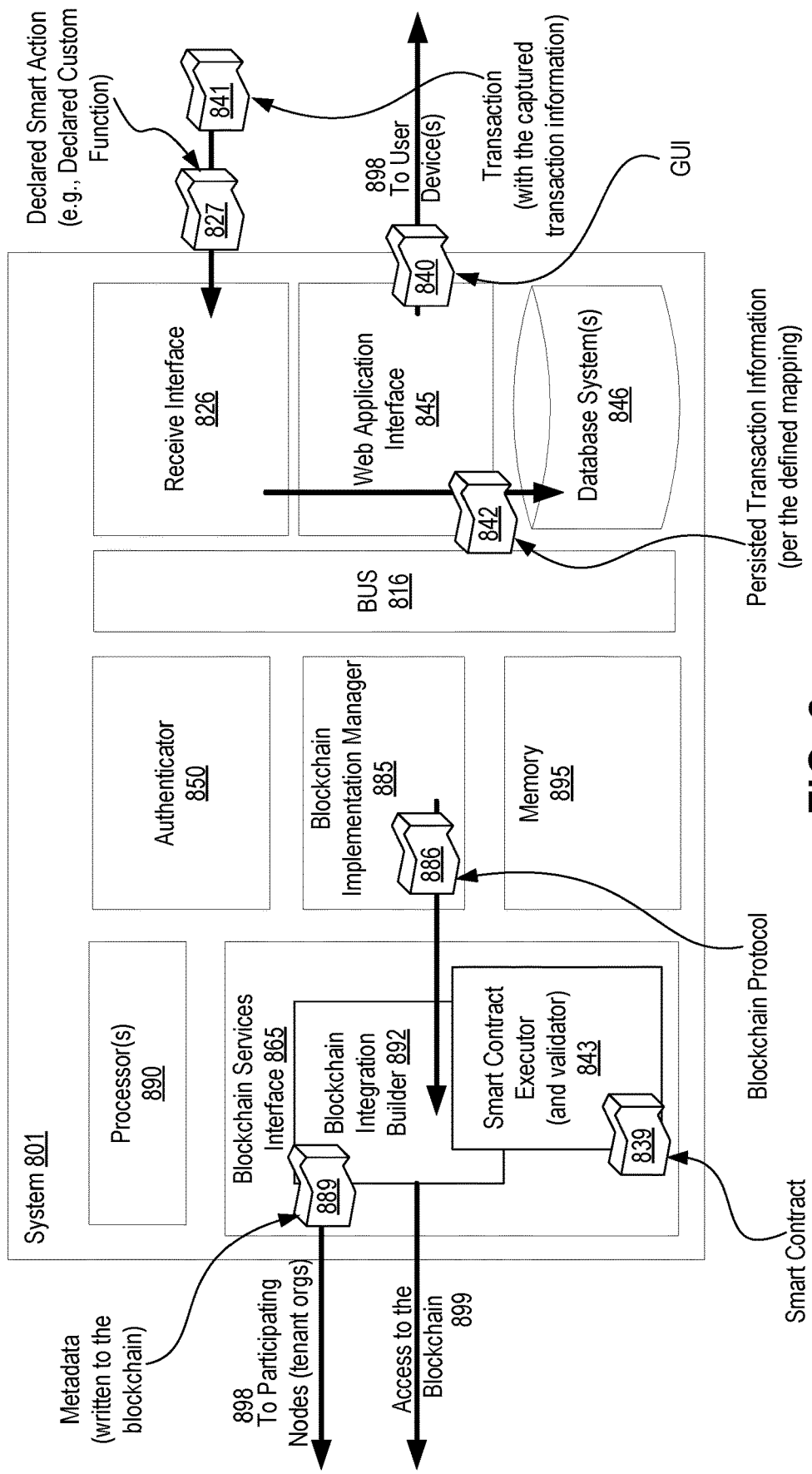
FIG. 8 shows a diagrammatic representation of a system within which embodiments may operate, be installed, integrated, or configured. In accordance with one embodiment, there is a system having at least a processor and a memory therein to execute implementing application code for the methodologies as described herein in accordance with the described embodiments.

FIG. 8 shows a diagrammatic representation of a system 801 within which embodiments may operate, be installed, integrated, or configured. In accordance with one embodiment, there is a system 801 having at least a processor 890 and a memory 895 therein to execute implementing application code for the methodologies as described herein. Such a system 801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 801, which may operate within a host organization, includes the processor 890 and the memory 895 to execute instructions at the system 801. According to such an embodiment, the processor 890 is to execute a blockchain services interface 865 on behalf of a plurality of tenants 898 of the host organization, in which each one of the plurality of tenants 898 operate as a participating node with access to the blockchain 899. A blockchain protocol 886 for the blockchain defines a group of base functions for the blockchain (e.g., as provided by the blockchain implementation manager 885), in which the group of base functions are accessible to any participating node 898 of the blockchain. There is further a receive interface 826 to receive a declaration of a new custom function 827, the declaration specifying each of (i) a base function and (ii) one or more additional mandatory fields to be captured with the use of the new custom function and (iii) a new custom function name for the new custom function declared; in which the processor 890 is to further execute a blockchain integration builder 892 to associate a smart contract 839 with the new custom function 827 to enforce capture of the one or more additional mandatory fields (e.g., captured transaction information 841) with use of the new custom function 827; in which the blockchain integration builder 892 further is to write metadata 889 onto the blockchain defining the new custom function 827; in which the receive interface 826 is to further receive a transaction 841 for the blockchain matching the new custom function 827 based on the new custom function name and executing the smart contract 839 to call the base function and to validate the one or more additional mandatory fields are provided with the received transaction 841. According to such a system 801, the blockchain services interface 865 is further to add the transaction 841 to a new block on the blockchain via the base function specified by the new custom function 827 pursuant to successful validation by the smart contract 839, in which the one or more additional mandatory fields are included within a payload portion of the added transaction.

According to such an embodiment of the system 801, the receive interface 826 may pass the captured transaction information of the transaction 841 to be stored within the database system(s) 846 as persisted transaction information 842.

According to such an embodiment of the system 801, a GUI 840 may be pushed to the user client devices 898 via which the user devices or admin computing devices may interact with the blockchain integration builder, for example, to declare a smart action or create a new custom function for transacting with the blockchain.

According to another embodiment of the system 801, the blockchain services interface 865 is to interact with and provide access to the blockchain 899.

According to another embodiment of the system 801, the receive interface 826 communicates with a user client device 898 remote from the system and communicatively links the user device with the system via a public Internet. According to such an embodiment, the system operates at a host organization as a cloud based service provider to the user device 898; in which the cloud based service provider hosts a receive interface 826 exposed to the user client device via the public Internet, and further in which the receive interface receives inputs from the user device as a request for services from the cloud based service provider.

Bus 816 interfaces the various components of the system 801 amongst each other, with any other peripheral(s) of the system 801, and with external components such as external network elements, other machines, client devices, cloud computing services, etc. Communications may further include communicating with external devices via a network interface over a LAN, WAN, or the public Internet.

Figure 9A:
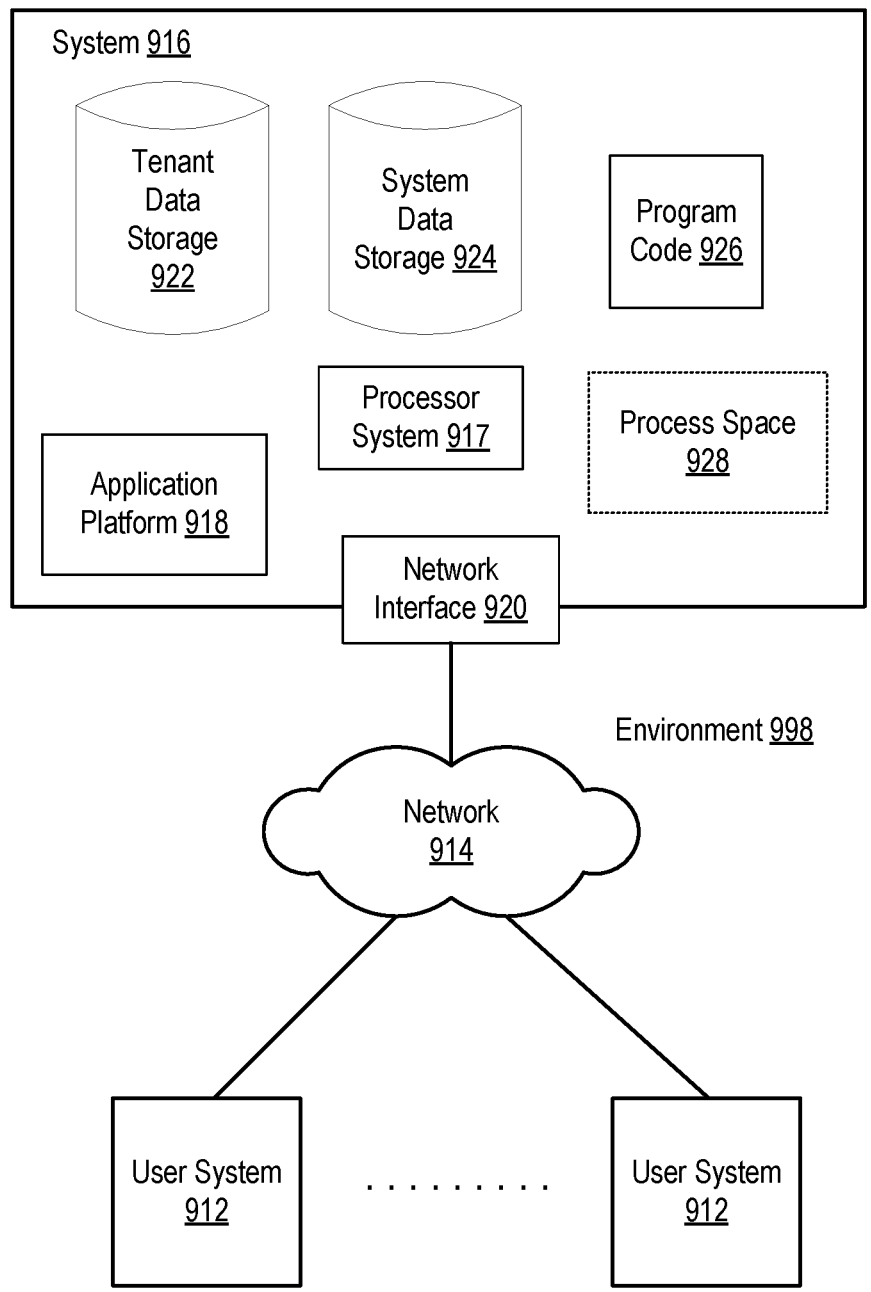
FIG. 9A illustrates a block diagram of an environment in which an on-demand database service may operate in accordance with the described embodiments.

FIG. 9A illustrates a block diagram of an environment 998 in which an on-demand database service may operate in accordance with the described embodiments. Environment 998 may include user systems 912, network 914, system 916, processor system 917, application platform 918, network interface 920, tenant data storage 922, system data storage 924, program code 926, and process space 928. In other embodiments, environment 998 may not have all of the components listed and/or may have other elements instead of, or in addition to, those listed above.

Environment 998 is an environment in which an on-demand database service exists. User system 912 may be any machine or system that is used by a user to access a database user system. For example, any of user systems 912 may be a handheld computing device, a mobile phone, a laptop computer, a work station, and/or a network of computing devices. As illustrated in FIG. 9A (and in more detail in FIG. 9B) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" is used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9A, implements a web-based Customer Relationship Management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9A, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9A include conventional, well-known elements that are explained only briefly here. For example, each user system 912 may include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device may be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9B:
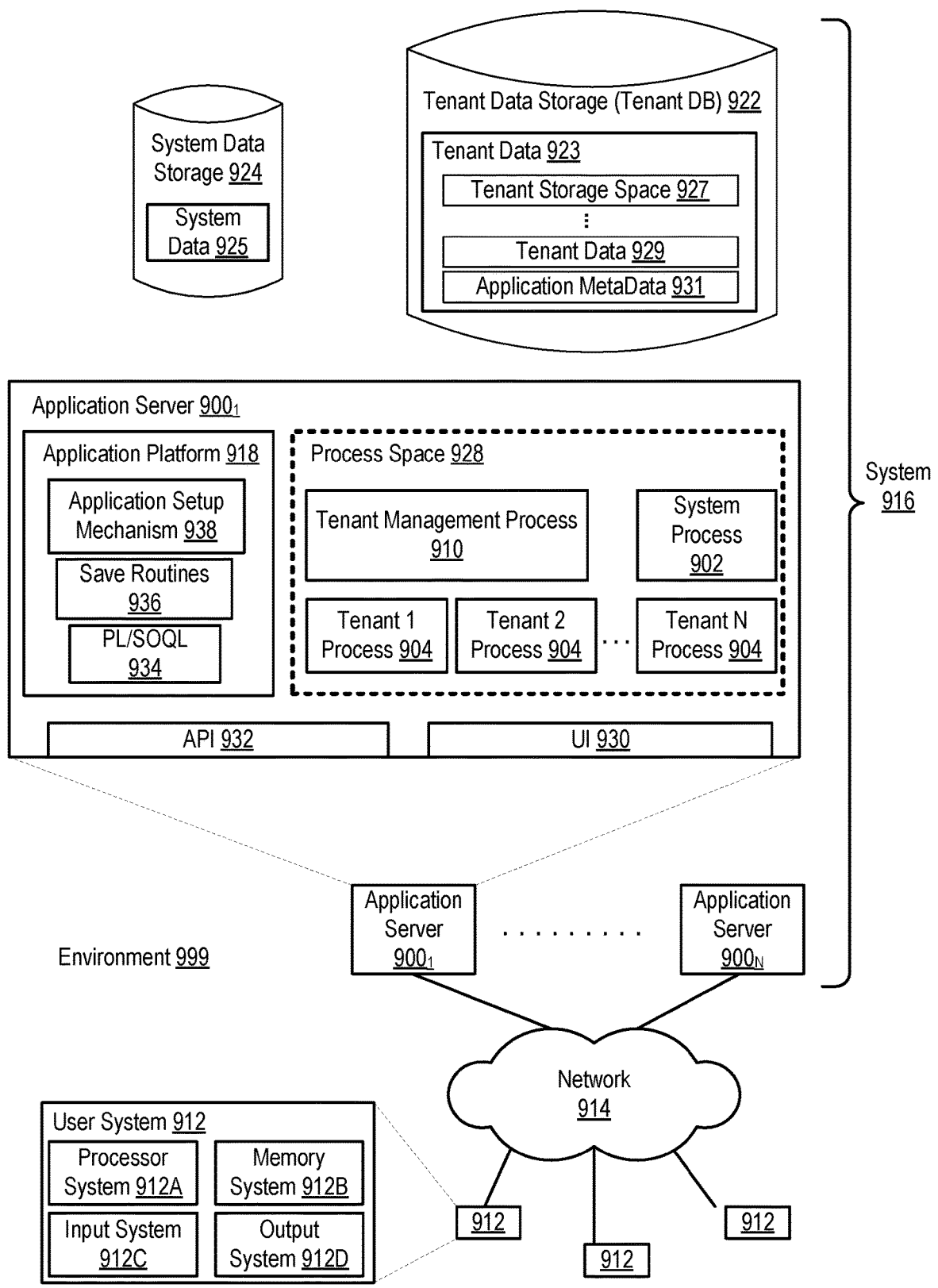
FIG. 9B illustrates another block diagram of an embodiment of elements of FIG. 9A and various possible interconnections between such elements in accordance with the described embodiments.

FIG. 9B illustrates another block diagram of an embodiment of elements of FIG. 9A and various possible interconnections between such elements in accordance with the described embodiments. FIG. 9B also illustrates environment 999. However, in FIG. 9B, the elements of system 916 and various interconnections in an embodiment are illustrated in further detail. More particularly, FIG. 9B shows that user system 912 may include a processor system 912A, memory system 912B, input system 912C, and output system 912D. FIG. 9B shows network 914 and system 916. FIG. 9B also shows that system 916 may include tenant data storage 922, having therein tenant data 923, which includes, for example, tenant storage space 927, tenant data 929, and application metadata 931. System data storage 924 is depicted as having therein system data 925. Further depicted within the expanded detail of application servers 900$_{1-N}$ are User Interface (UI) 930, Application Program Interface (API) 932, application platform 918 includes PL/SOQL 934, save routines 936, application setup mechanism 938, process space 928 includes system process space 902, tenant 1-N process spaces 904, and tenant management process space 910. In other embodiments, environment 999 may not have the same elements as those listed above and/or may have other elements instead of, or in addition to, those listed above.

User system 912, network 914, system 916, tenant data storage 922, and system data storage 924 were discussed above in FIG. 9A. As shown by FIG. 9B, system 916 may include a network interface 920 (of FIG. 9A) implemented as a set of HTTP application servers 900, an application platform 918, tenant data storage 922, and system data storage 924. Also shown is system process space 902, including individual tenant process spaces 904 and a tenant management process space 910. Each application server 900 may be configured to tenant data storage 922 and the tenant data 923 therein, and system data storage 924 and the system data 925 therein to serve requests of user systems 912. The tenant data 923 might be divided into individual tenant storage areas (e.g., tenant storage space 927), which may be either a physical arrangement and/or a logical arrangement of data. Within each tenant storage space 927, tenant data 929, and application metadata 931 might be similarly allocated for each user. For example, a copy of a user's most recently used (MRU) items might be stored to tenant data 929. Similarly, a copy of MRU items for an entire organization that is a tenant might be stored to tenant storage space 927. A UI 930 provides a user interface and an API 932 provides an application programmer interface into system 916 resident processes to users and/or developers at user systems 912. The tenant data and the system data may be stored in various databases, such as one or more Oracle™ databases.

Application platform 918 includes an application setup mechanism 938 that supports application developers' creation and management of applications, which may be saved as metadata into tenant data storage 922 by save routines 936 for execution by subscribers as one or more tenant process spaces 904 managed by tenant management process space 910 for example. Invocations to such applications may be coded using PL/SOQL 934 that provides a programming language style interface extension to API 932. Invocations to applications may be detected by one or more system processes, which manages retrieving application metadata 931 for the subscriber making the invocation and executing the metadata as an application in a virtual machine.

Each application server 900 may be communicably coupled to database systems, e.g., having access to system data 925 and tenant data 923, via a different network connection. For example, one application server 900$_1$ might be coupled via the network 914 (e.g., the Internet), another application server 900$_{1-N}$ might also be coupled via a direct network link, and another application server 900N might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 912 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user may hit three different application servers 900, and three requests from different users may hit the same application server 900. In this manner, system 916 is multi-tenant, in which system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 900 to request and update system-level and tenant-level data from system 916 that may require sending one or more queries to tenant data storage 922 and/or system data storage 924. System 916 (e.g., an application server 900 in system 916) automatically generates one or more SQL statements (e.g., one or more SQL queries) that are designed to access the desired information. System data storage 924 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
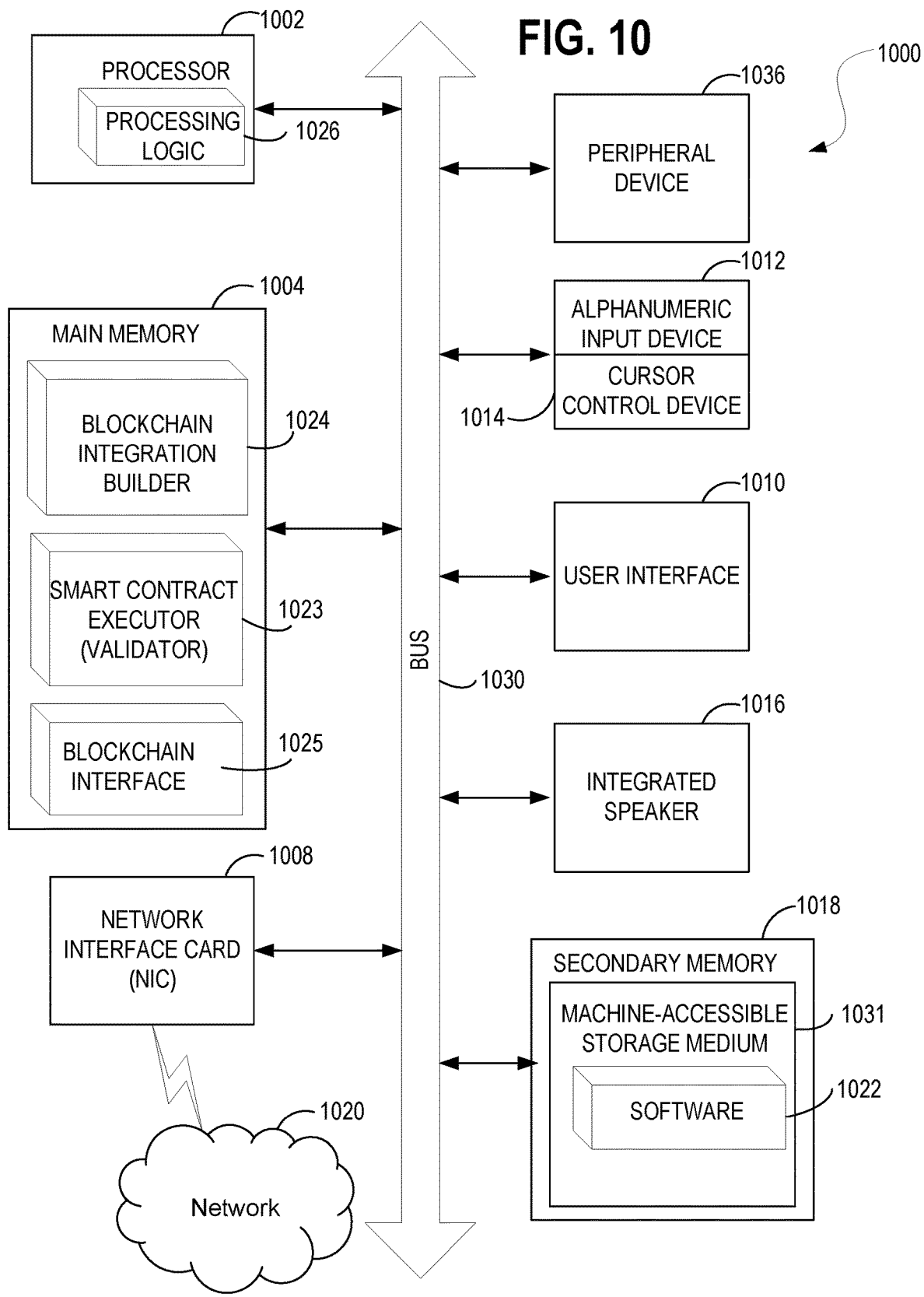
FIG. 10 illustrates a diagrammatic representation of a machine in the exemplary form of a computer system, in accordance with one embodiment.

FIG. 10 illustrates a diagrammatic representation of a machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes a blockchain integration builder 1024 and a smart contract executor (e.g., smart contract validator) 1023 and a blockchain interface 1025. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

Figure 11A:
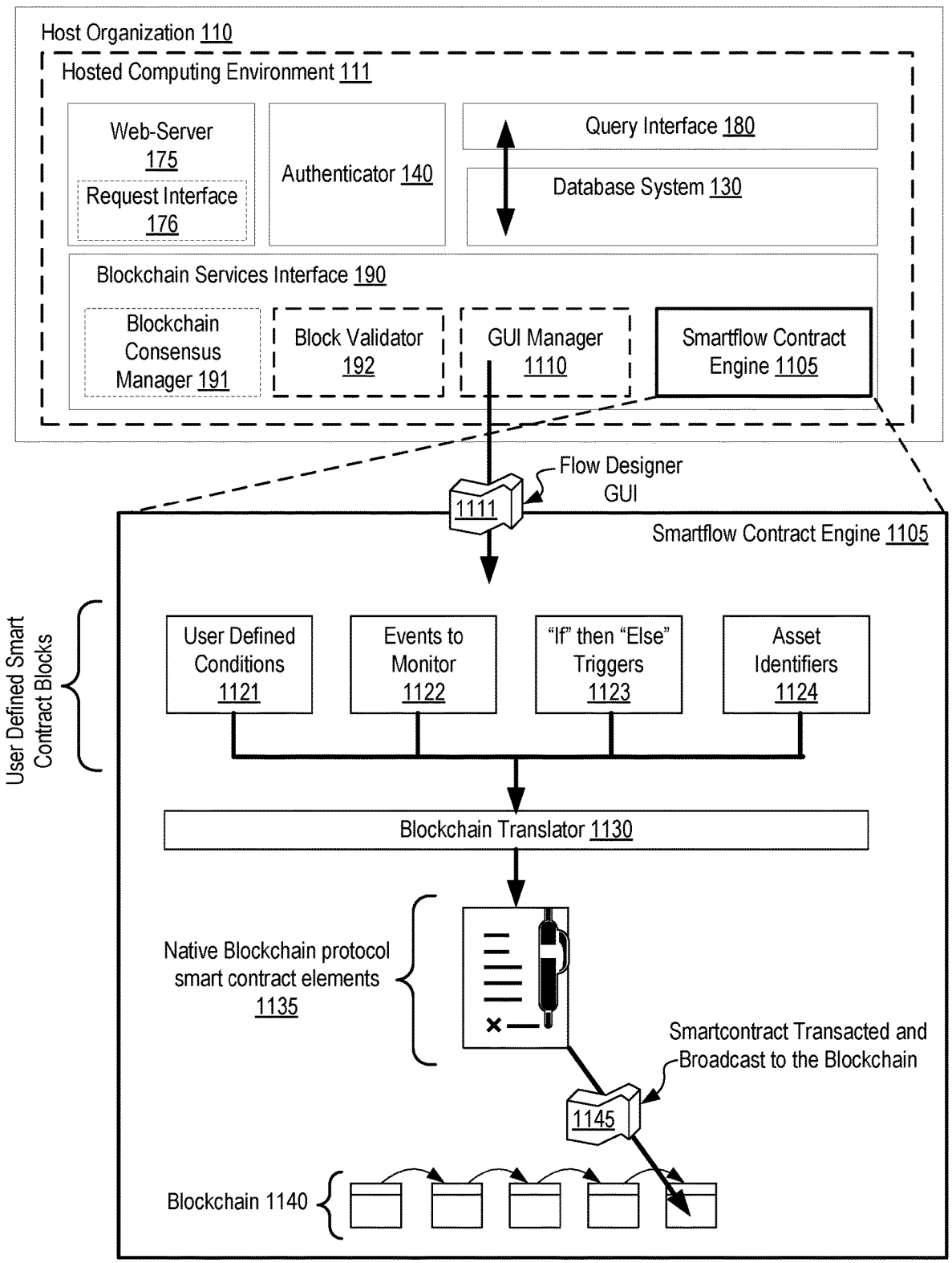
FIG. 11A depicts another exemplary architecture, with additional detail of a blockchain implemented smart contract created utilizing a smartflow contract engine, in accordance with described embodiments.

FIG. 11A depicts another exemplary architecture 1100, with additional detail of a blockchain implemented smart contract created utilizing a smartflow contract engine 1105, in accordance with described embodiments.

In particular, there is depicted here within the host organization the blockchain services interface 190 which now includes the smartflow contract engine 1105 and additionally includes the GUI manager 1110.

Because blockchain utilizes a distributed ledger, creation and execution of smart contracts may be technically complex, especially for novice users. Consequently, a smart flow visual designer allow implementation of smart contracts with greater ease. The resulting smart flow contract has mathematically verifiable auto-generated code, as created by the blockchain translator 1130 freeing customers and users from having to worry about the programming language used in any given blockchain protocol. Moreover, the smart flow contract engine implements visual designers that coordinate with the blockchain translator 1130 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 1110 presents a flow designer GUI 1111 interface to a user device via which users may interact with the host organization. The smartflow contract engine 1105 in coordination with the GUI manager interprets the various rules, conditions, and operations provided by the user, to generate a smartflow contract which is then translated or written into the target blockchain protocol.

Through the flow designer GUI 1111, a user may completely define utilizing visual flow elements how a particular process, event, agreement, contract, purchase, or some other transaction needs to occur, including dependencies, checks, required process inputs and outputs, triggers, etc.

Using the flow designer GUI 1111, the user simply drags and drops operational blocks and defines various conditions and "if then else" events, such as if this event occurs, then take this action. As depicted here, there are a variety of user defined smart contract blocks including user defined conditions 1121, events to monitor 1122, "if" then "else" triggers 1123, and asset identifiers 1124.

Once the user has completed defining the flow including all of its operational blocks, conditions, triggers and events, the smartflow contract engine takes each of the individual blocks and translates them into a native target blockchain protocol via the blockchain translator 1130, and then generates a transaction to write the translated smartflow contract 1145 into the blockchain 1140 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 1130 depicted here translates the user defined smart contract blocks into the native or required language and structure of the targeted blockchain 1140 onto which the resulting smart contract is to be written or transacted.

Once the smart contract is transacted and broadcast to the blockchain 1145 it is executed within the blockchain and its provisions, as set forth by the user defined smart contract blocks, are then carried out and enforced.

According to one embodiment, a salesforce.com visual flow designer is utilized to generate the user defined smart flow contract blocks which are then translated into a blockchain smart contract. According to other embodiments, different visual flow designers are utilized and the blockchain translator 1130 translates the user defined smart contract blocks into a blockchain smart contract.

The resulting native blockchain protocol smart contract elements 1135 may be embodied within a code, structure, or language as dictated by the blockchain 1140 onto which the smart contract is to be written. For instance, if the smart contract is to be written to Ethereum then the blockchain translator 1130 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language instead, which permits use of a distributed ledger blockchain and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 1105, even novice users may create compliant smart contracts by generating the smart contract elements with the flow designer and then leveraging the blockchain translator 1130 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 1105 through which the user may generate whatever flow he wishes. When done, the user, via the flow designer GUI 1111, instructs the blockchain services interface 190 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 110 remove the complexity from the process and present the user with a simple flow designer GUI 1111 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events within the host organization.

For example, consider that Wal-Mart and Nestle have an agreement that a shipment must be transported within a climate controlled trailer within a range of 35 to 39 degrees Fahrenheit at all times. Moreover, if the temperature exceeds 39 degrees at anytime, then the payment is nullified.

Within the host organization, a Customer Relationship Management (CRM) platform defines and manages the various relationships and interactions between customers, vendors, potential customers, suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment, which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 11B:
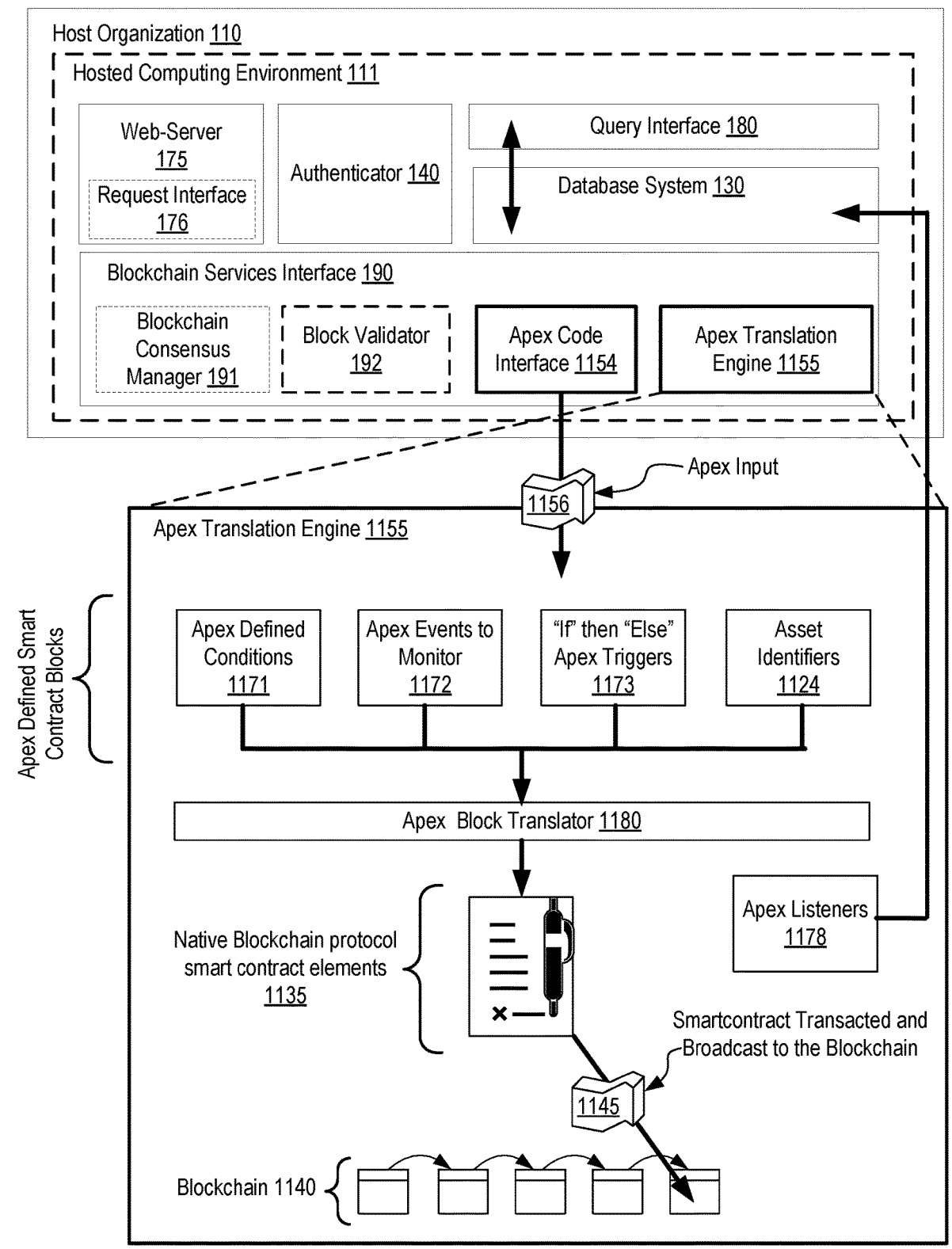
FIG. 11B depicts another exemplary architecture, with additional detail of a blockchain implemented smart contract created utilizing an Apex translation engine, in accordance with described embodiments.

FIG. 11B depicts another exemplary architecture 1101, with additional detail of a blockchain implemented smart contract created utilizing an Apex translation engine 1155, in accordance with described embodiments.

As depicted here, there is an Apex translation engine 1155 within the blockchain services interface 190.

Apex is a programming language provided by the Force.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of metadata. Therefore, the Apex translation engine 1155 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 1156 to the Apex translation engine 1155 via the depicted Apex code interface 1154, for example, by uploading a text file having the developer's Apex code embedded therein.

The Apex translation engine 1155 parses the Apex input 1156 to identify the Apex defined smart contract blocks and breaks them out in preparation for translation. As despite here, there are Apex defined conditions 1171, Apex events to monitor 1172, "if" then "else" Apex triggers 1173, and as before, asset identifiers 1124 which are not Apex specific.

The Apex defined smart contract blocks are then provided to the Apex block translator 1180 which converts them into the native blockchain protocol smart contract elements 1135 for the targeted blockchain protocol. Once translated, the process is as described above, in which the translated smart contract is transacted and broadcast 1145 to the blockchain 1140 for execution.

Unlike the visual flow GUI, because Apex is programmatic, users writing Apex code may write programs to execute on a smart contract and are not limited by the available functions within the visual flow GUI.

According to a particular embodiment, the Apex input 1156 is first translated into JavaScript and then subsequently translated into a specific blockchain API appropriate for the targeted blockchain protocol upon which the smart contract is to be executed.

According to another embodiment, listening events may be written using the Apex language and provided in the Apex input 1156, however, such listening events are to be executed by the host organization. Therefore, the Apex block translator 1180 separates out any identified Apex listeners 1178 and returns those to the host organization 110 where they may be implemented within the appropriate CRM system or other event monitoring system. In such a way, developers may write the Apex input 1156 as a single program and not have to separately create the smart contract and also the related listening events in separate systems.

Figure 12A:
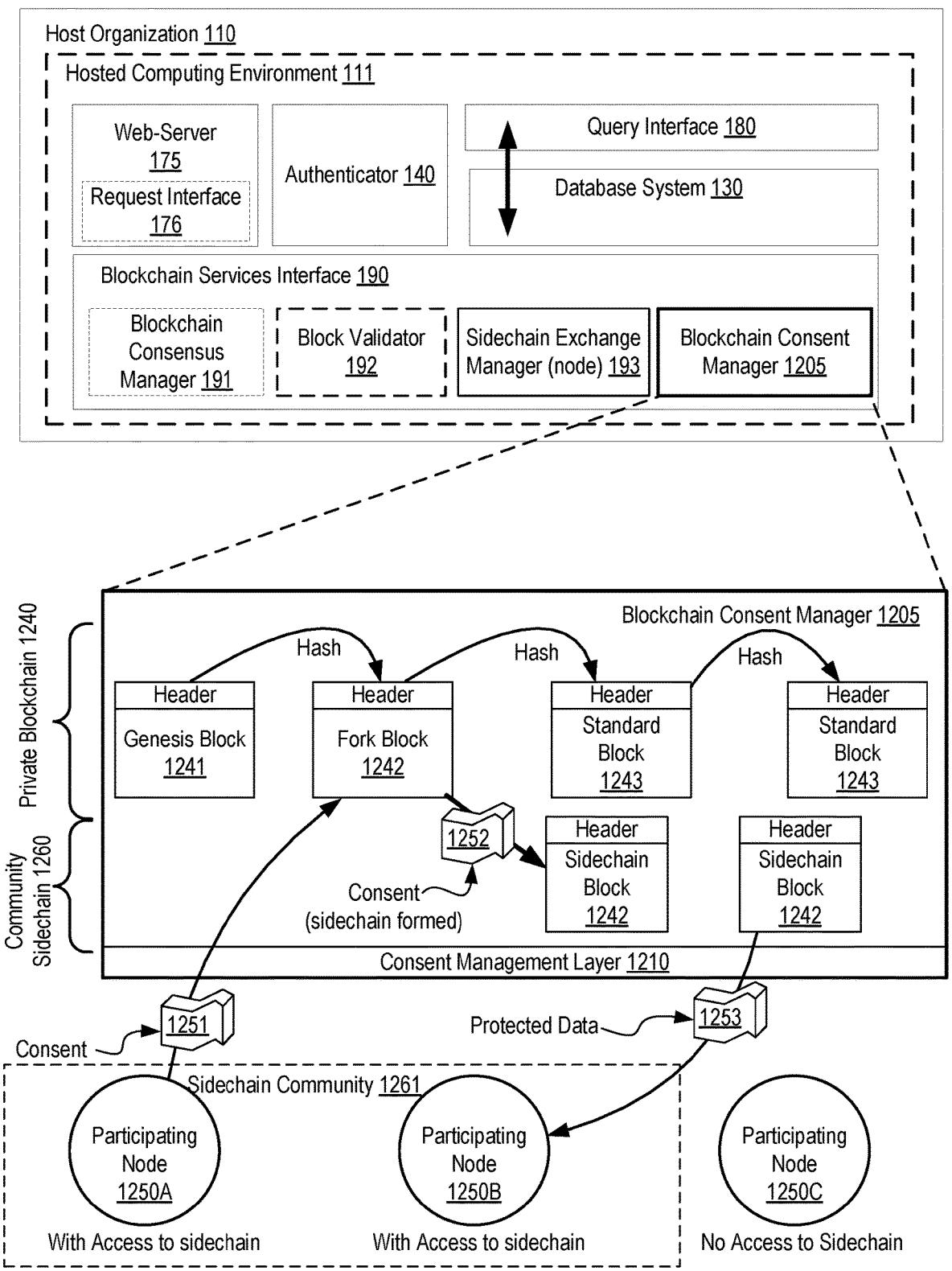
FIG. 12A depicts another exemplary architecture, with additional detail of a blockchain which implements community sidechains with consent management, in accordance with described embodiments.

FIG. 12A depicts another exemplary architecture 1200, with additional detail of a blockchain which implements community sidechains with consent management, in accordance with described embodiments.

As depicted here, there is again a host organization 110 having a hosted computing environment 111 operating therein with a web-server 175, request interface 176, authenticator 140, query interface 180, and database system 130. As before, there is also a blockchain services interface 190 via which the host organization 110 provides a variety of blockchain related services to customers, subscribers, and other organizations and tenants which utilize the cloud computing services provided by the host organization 110.

More particularly, there is now depicted within the blockchain services interface 190 a blockchain consent manager 1205 which implements community sidechain functionality with consent management to control access rights, readability, exchange permissions and disclosure capabilities of the payload data stored within the blockchain.

Conventionally, blockchain blocks are fully open and readable to any participating node for the blockchain protocol implementation. Such openness is by design as it permits any node to authenticate and validate that transactions are valid independently, without requiring permission from any authority. However, such openness is not always desirable. Therefore, the blockchain consent manager 1205 and the blockchain services interface 190 expose additional functionality for certain blockchain protocol implementations supported by the host organization which permit certain data to be subjected to additional access restrictions, while nevertheless utilizing and benefiting from the distributed ledger technologies embodied within the blockchain functionality.

According to a particular embodiment, the blockchain consent manager 1205 provides a community sidechain with consent management on a private blockchain. As depicted here, the blockchain consent manager 1205 provides a private blockchain 1240 (e.g., a community sidechain) which is comprised of an initial genesis block 1241 beginning the sidechain as a private blockchain 1240 followed by a sequence of standard blocks 1243 as the private blockchain continues to grow. The private blockchain 1240 is accessible to each of the participating nodes 1250A and 1250B and 1250C. In practice, there are likely to be many more participating nodes for the private blockchain 1240.

Community sidechains are useful where it is desirable to share data between two nodes of a blockchain, for instance, such as the ability to share medical information for a patient between a hospital and an insurance provider.

With conventional mechanisms, every participating node 1250A-C has full access to all data once that data is written into the blockchain. While useful in many situations, it is readily apparent that certain manufacturing information is not meant to be freely accessible to view due to privacy concerns. Notwithstanding the shortcomings, or design feature, of prior blockchain protocol implementations, which permit full visibility, the blockchain consent manager 1205 of the host organization 110 enables specific customers, organizations, users (e.g., manufacturers, artists, hospitals, doctor offices, insurance providers, etc.) to benefit from the use of blockchain functionality such as immutability and non-centralized record keeping, while also respect privacy considerations and comply with auditability and record keeping requirements. Financial organization have similar legal requirements to protect private information, yet may also benefit from the blockchain functionality as set forth herein to provide community sidechains with consent management capabilities via the blockchain consent manager 1205.

According to one embodiment, the blockchain consent manager 1205 implements a consent management layer 1210 through which participating nodes 1250A-C must traverse if they wish to view, read, or access certain information stored within the private blockchain 1240. According to such an embodiment, some of the data within the private blockchain 1240 is viewable to all participating nodes 1250A-C whereas other data is restricted.

Unlike the distinction between a private blockchain and a public blockchain, in which anyone can access the public blockchain and view any information within it, and anyone having access to the private blockchain can access any information within it, the private blockchain 1240 with consent management is different because even if a participating node has authority to access the private blockchain 1240, such access does not necessarily confer the "consent" by which to access protected or restricted information stored within the private blockchain 1240.

As depicted here, participating node 1250A has provided consent 1251 which is written into the private blockchain 1240. Consequently, a new sidechain community 1261 is formed by the blockchain consent manager 1205. Specifically, the blockchain consent manager 1205 creates a new community sidechain 1260 formed from sidechain blocks 1242. The community sidechain 1260 is formed from the point of the fork block 1242 which is viewed by the private blockchain 1240 as a standard block, but includes a reference linking the newly formed community sidechain 1260 with the private blockchain 1240. The main private blockchain 1240 then continues on after the creation of the community sidechain 1260 via additional standard blocks 1243 which follow the fork block 1242.

Upon the consent 1251 being received from participating node 1250A and being written into the private blockchain 1240, the blockchain consent manager 1205 seeds the new community sidechain 1252 with the consent, thus forming the new community sidechain 1260. According to certain embodiments, no payload data whatsoever is written into the sidechain blocks 1242 of the community sidechain. For example, the protected data 1253 is not written into the community sidechain 1260, but rather, remains within the private blockchain 1240 in protected form, but is accessible to the participating nodes of the sidechain community 1261 via a reference between the sidechain blocks 1242 accessible only to the participating nodes 1250A and 1250B of the sidechain community which permits retrieval of the protected data 1253 through the consent management layer. In other embodiments, protected data 1253 may be written into the payload of the sidechain blocks 1242, and through virtue of the participating nodes 1250A and 1250B residing within the sidechain community 1261, those participating nodes 1250A and 1250B will have access to the protected data 1253 without having to access the main chain (e.g., the primary blockchain 1240). As depicted here, the community sidechain 1260 is linked to the private blockchain 1240, and may therefore be considered a forked blockchain, whereas in other implementations, the community sidechain may be formed and permitted to operate independently from the private blockchain, so long as the blockchain consent manager 1205 remains in control to manage which participating nodes are permitted to form any newly created sidechain community 1261, and therefore, which participating nodes have access to the protected data 1253 and which participating nodes do not have access to the protected data 1253.

As is depicted here, participating nodes 1250A and 1250B have access to the sidechain as they form the entirety of the sidechain community 1261, and thus, data is sharable between the nodes of the sidechain community, whereas the participating node 1250C is not a member node of the sidechain community 1261, and therefore cannot access the protected data and cannot share data with the participating nodes 1250A and 1250B.

Figure 12B:
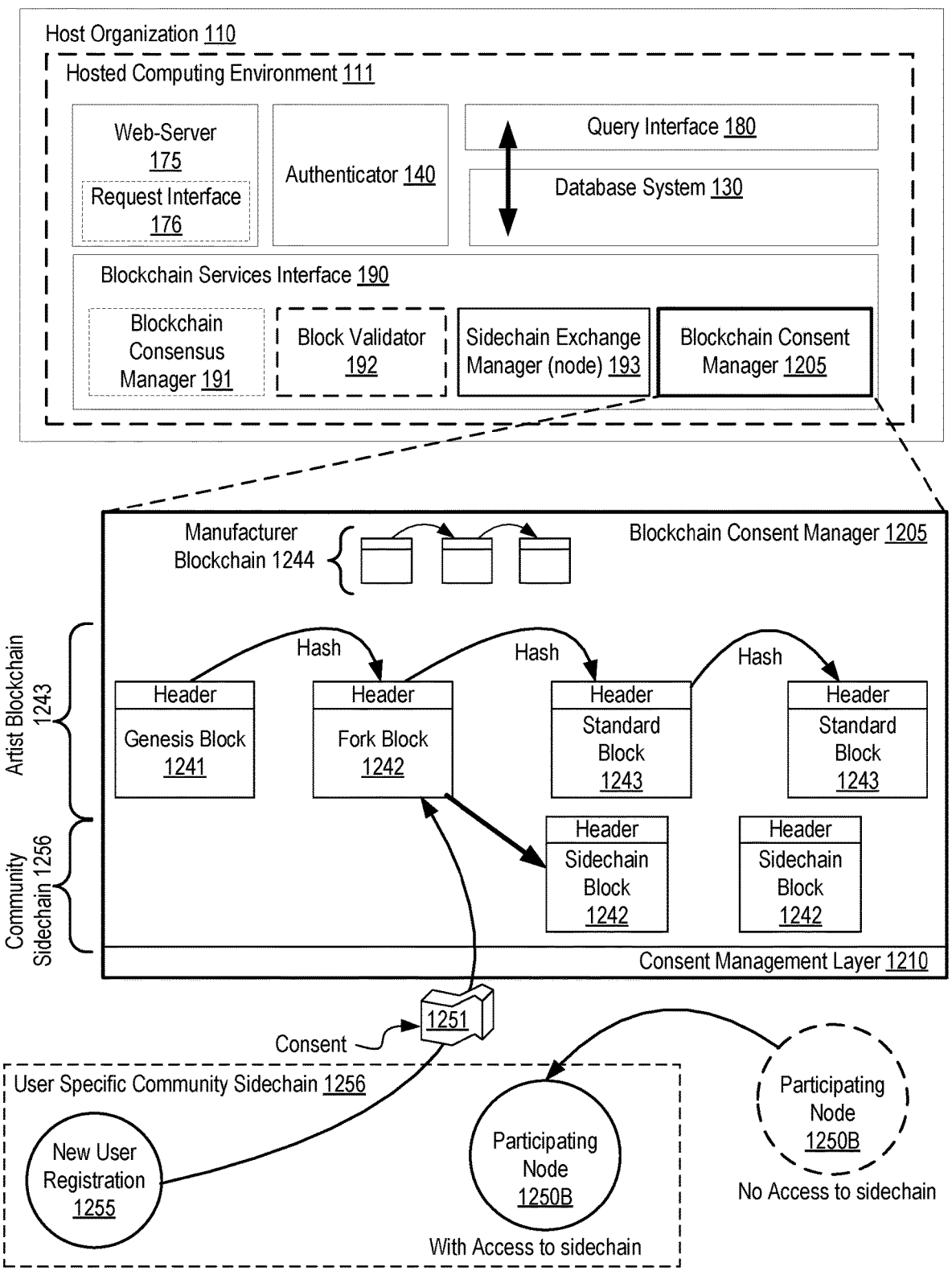
FIG. 12B depicts another exemplary architecture, with additional detail of a community sidechain with consent management, in accordance with described embodiments.

FIG. 12B depicts another exemplary architecture 1201, with additional detail of a community sidechain with consent management, in accordance with described embodiments.

Depicted here are further details regarding the introduction of new participating nodes into the private blockchains. As shown here, there now exists two distinct private blockchains which are managed by the blockchain services interface 190, specifically, the manufacturer blockchain 1244 and the artist blockchain 1243. According to described embodiments, there can be many different private blockchains, and they may be organized in a variety of ways. For instance, it is conceivable that different parties in the manufacturing industry may wish to share data amongst one another, and therefore, they may participate within the same private manufacturer blockchain 1244, and where data sharing is needed, consent may be granted, a sidechain formed with the participating nodes needing access to the data to be shared, thus forming a sidechain community, and then the data shared amongst those participants of the newly created sidechain community, just as was described above. Alternatively, a private blockchain or a permissioned blockchain may be utilized on behalf of only those participants which have access to the data on the blockchain which may be a manufacturer and its suppliers or potentially even a single manufacturer.

For instance, there may be other participants which have no need for access to the manufacturer's data, and therefore, those participating nodes are formed into a distinct private blockchain. For instance, depicted here is the artist blockchain 1243 having participants such as artists, painters, musicians, photographers, etc. While such actors likely have no need to access manufacturing information, they may benefit from the ability to securely share data related to their art production industry, such as purchase orders, materials, contracts, etc. These actors may wish to protect certain types of information, yet may nevertheless benefit from the use of blockchain functionality.

According to a particular embodiment, a new user registration (e.g., for instance the creation of a user profile with a website, etc.) within the main artist blockchain 1243 resulting in the creation of a new user specific community sidechain 1256. Initially, the new user registration is the only participating node for the user specific community sidechain 1256 as only that particular user by default will have access to private and protected data. However, the new user registration node 1255 may consent 1251 to another node, with the consent being written into the artist blockchain 1243 (e.g., being written into the fork block 1242 by way of example), thus resulting in the community sidechain 1256 having how having both the new user registration 1255 and also another participating node to whom consent was granted. As shown here, participating node 1250B previously was part of the artist blockchain 1243 with no access to the sidechain, however, upon the grant of consent for the new user registration node, the participating node 1250B is then joined into the user specific community sidechain 1256, through which access to private or protected data associated with the new user registration node 1255 may be shared. All nodes having consent to enter the user specific community sidechain 1256 will be given access to the private and protected information of the new user registration node 1255. If the same user requires different access to be given to different participating nodes, then the user may require a separate new user registration node to be created.

It is therefore in accordance with a particular embodiment that users may create user specific community sidechains within the primary blockchain (e.g., such as the artist blockchain 1243 or the manufacturer blockchain 1244, etc.) by creating a user profile with a participating website and such users may then grant consent to other nodes (e.g., via the same website) to permit sharing of their private or protected information with specified target nodes participating within the primary blockchain but without access to the user specific sidechain before being granted consent.

Although not specific to the concepts which are discussed in detail herein, a website, such as a photographer's website or a manufacturer's website, may operate as a node within the artist blockchain 1243 and also as a customer of the host organization. Through the website of the customer organization, new users may create user profiles and the blockchain services interface 190 of the host organization will then generate a new node within the artist blockchain 1243 or other relevant primary blockchain corresponding to the new user registration 1255. The blockchain services interface 190 will additionally generate the user specific community sidechain 1256 via which the user may grant consent to share information with other participating nodes for the particular blockchain, such as the artist blockchain in this example. For instance, according to one embodiment, when users login or create a profile with the website, they are authenticating with the host organization 110 upon which the website operates and resides. Because the user is then authenticated with the host organization 110, the same host organization 110 may then create the new node for the new user registration on any blockchain accessible to the host organization 110 through the blockchain services interface 190.

To be clear, information is not shared between two different private blockchains. Therefore, while technically feasible, it is not contemplated that information is shared between the manufacturer blockchain 1244 and the artist blockchain 1243. Rather, each operates as a separate private blockchain, each with its own participating nodes, users, and sidechains. The same human user may, however, create profiles with different websites resulting in that human user having a node within the manufacturer private blockchain and also a node within the artist private blockchain. The fact that both private blockchains are managed by the same host organization is irrelevant and is thus likely unknowable to the particular user in question.

It shall also be noted that a sidechain of the private blockchain is not a node, but rather, a permissible branch, or fork, from the main private blockchain. The sidechains depicted here remain immutably attached to, and associated with the primary blockchain and do not operate independently. However, if information is to be shared with another independently operated blockchain, such as another manufacturer private blockchain separate from the manufacturer blockchain 1244 managed by the host organization 110, then the user may grant consent to exchange protected data with other independently operated blockchain in the manner described previously (e.g., at FIG. 2B), assuming a defined exchange agreement exists between the two primary blockchains, in which case the manufacturer blockchain 1244 managed by the host organization is considered the parent blockchain (e.g., element 188 at FIG. 2B) and the separate independently operated blockchain is thus treated as the independently operated sidechain (e.g., element 189 at FIG. 2B).

According to a particular embodiment, when user consent is captured for a particular node within the user specific sidechain, the consent is captured at the sidechain and then written into the primary blockchain where it is permanently kept. In such an embodiment, the fact that consent has been granted is not protected information, however, the restricted data is protected and the consent is only applicable to a specified participating node of the primary blockchain until such time that consent is rescinded. According to certain embodiments, the consent granted may be time limited, and will therefore expire after a specified period of time. In such case, access to the protected information is checked against the time expiration via the blockchain consent manager 1205 as part of the blockchain protocol provided by the blockchain services interface 190.

FIG. 13 depicts a flow diagram illustrating a method 1300 for implementing certificates of authenticity of digital twins transacted onto a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 1300 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 1350, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1300 depicted at FIG. 13, at block 1305, processing logic operates a first blockchain interface to a private blockchain on behalf of a product manufacturer, wherein the product manufacturer has access permissions to the private blockchain.

At block 1310, processing logic operates a second blockchain interface to a public blockchain on behalf of a plurality of tenants of the host organization including the product manufacturer as one of the plurality of tenants, wherein each one of the plurality of tenants operate as a participating node with access to the public blockchain.

At block 1315, processing logic provides a plurality of templates for certificates of authenticity to the plurality of tenants.

At block 1320, processing logic generates a digital twin for a finished goods product by the product manufacturer, the digital twin having embedded therein a new certificate of authenticity generated using one of the plurality of templates, the new certificate of authenticity uniquely identifying the finished goods product by a product identifier specified with the new certificate of authenticity.

At block 1325, processing logic transacts the digital twin onto the private blockchain by adding an asset to the private blockchain to store the digital twin.

At block 1330, processing logic transfers ownership of the digital twin from the product manufacturer to a purchaser by transacting the digital twin having the certificate of authenticity embedded therein onto the public blockchain with a Globally Unique Identifier (GUID) uniquely identifying the digital twin on the public blockchain.

At block 1335, processing logic writes the GUID uniquely identifying the digital twin on the public blockchain into the asset on the private blockchain within which the digital twin is stored.

According to another embodiment of method 1300, transacting the digital twin having the certificate of authenticity embedded therein onto the public blockchain includes: adding a new public blockchain asset to the public blockchain identified by the GUID on the public blockchain; storing the digital twin having the certificate of authenticity embedded therein within the new asset; and registering within the public blockchain both the product manufacturer as the transferor of the digital twin and the purchaser as the transferee of the digital twin.

For example, so as to ensure a complete chain of ownership or a complete chain of title for the finished goods product, not only is the digital twin and its certificate of authenticity transacted onto the public blockchain, but additionally, the new ownership is registered, so that any person wishing to verify either ownership or authenticity of the finished goods product may readily do so via any interface to the public blockchain. As described here, sale of the finished goods product by the product manufacturer triggers such a transferor/transferee registration to the public blockchain, however, any third party seller other than the product manufacturer may similarly register a change in ownership to the public blockchain, thus permitting down-stream purchasers to be also protected from counterfeit goods or fraudulent transactions as at each sale/purchase transaction phase for the finished goods product, both the authenticity and current ownership is verifiable.

According to another embodiment of method 1300, the purchaser of the finished goods product becomes a first owner of both the finished goods product and the digital twin for the finished goods product pursuant to a sale by the product manufacturer; in which the first owner becomes a transferee of the asset on the public blockchain storing the digital twin within which the certificate of authenticity is embedded; in which a third party purchaser of the finished goods product becomes a second owner of both the finished goods product and the digital twin for the finished goods product pursuant to a second sale from the first owner to the second owner; and in which the second owner becomes a transferee of the asset on the public blockchain storing the digital twin within which the certificate of authenticity is embedded.

For example, consider previously owned items which are sold on platforms such as Amazon, eBay, or even brick-and-mortar outlets which deal in second-hand goods. Such outlets carry a highly increased risk of inauthentic, counterfeit, and fraudulent sales of goods since it cannot be known with certainty that the product manufacturer was the true source of such goods. However, through practice of the described embodiments, a second sale from a first owner to a second owner may be registered with the public blockchain so as to protect all parties, subsequent to which third, fourth, fifth sales and so on are likewise protected.

According to another embodiment of method 1300, transferring ownership of the digital twin from the product manufacturer to the purchaser includes transferring ownership of the digital twin to one of: a product wholesaler for the finished goods product; a product retailer for the finished goods product; an end user consumer for the finished goods product; a product broker for the finished goods product; a product dealer for the finished goods product; and an anonymous purchaser of the finished goods product.

According to another embodiment of method 1300, transacting the digital twin onto the private blockchain by adding the asset to the private blockchain includes: adding a new asset to the private blockchain via a CREATE asset command term for the private blockchain and writing the digital twin having the certificate of authenticity embedded therein into a payload portion of the new asset.

According to another embodiment of method 1300, the private blockchain includes a permissioned blockchain; in which the product manufacturer has full access permissions to data and functions of the permissioned blockchain; and in which one or more supply chain vendors for the finished goods product operate as restricted nodes on the permissioned blockchain with limited access permissions to data and functions of the permissioned blockchain.

For example, the product manufacturer may permit its supply chain vendors to have write-only access to the permissioned blockchain, via which the supply chain vendors may store component certificates of authenticity from the vendors or raw materials certificates of authenticity or serial numbers, product numbers, shipping details, source identifiers, and other relevant information within the permissioned blockchain, such that it is accessible, readable, and modifiable by the product manufacturer, but permits only write access by such vendors. Similarly, the product manufacturer may permit multiple vendors to store such information to the permissioned blockchain in which the product manufacturer may read and access information from all vendors, but for which each individual vendor is restricted to viewing only the information written to the permissioned blockchain by that particular vendor, thus prohibiting each vendor's view to information provided by other vendors or information written to the permissioned blockchain by the product manufacturer which is not intended for viewing by any vendor. For instance, the product manufacturer may keep a complete Bill of Materials (BOM) for every finished goods product, which is later embedded within the digital twin transacted onto the private blockchain operating as a permissioned blockchain or permissioned ledger. However, the manufacturer may restrict the per-product BOM from being made accessible to any vendor. Similarly, the per-product BOM may be kept on the permissioned ledger and not transacted to the public blockchain pursuant to a sale of the respective goods product, thus enabling such information to be kept for auditability purposes, yet not exposed publicly or even to the product manufacturer's vendors and suppliers.

According to another embodiment of method 1300, transacting the digital twin onto the private blockchain by adding an asset to the private blockchain to store the digital twin further includes one or more of: writing a StockKeeping Unit (SKU) number established by a merchant to the digital twin stored on the private blockchain; writing a product model number assigned by the product manufacturer to the digital twin stored on the private blockchain; writing a Bill of Materials (BOM) to the digital twin stored on the private blockchain; writing one or more supply chain identifiers for components or raw materials embedded within the finished goods product to the digital twin stored on the private blockchain.

For example, the SKU number provides an identification for a particular product which allows that finished goods product to be tracked by ecommerce and retailers for inventory purposes. Typically, a SKU is associated with any purchasable item offered by stores, catalogs, or online e-commerce sites. Very often different SKU numbers are utilized by different retailers and e-commerce sites for identical finished goods products, or for finished goods products having certain per-outlet variations. For example, Wal-Mart may use a different SKU than Target for the same child's toy. While the SKU is typically established by the merchant, the product manufacturer working in conjunction with the merchant may print such SKUs on packaging materials as well as record the SKU in their own systems. For example, the product manufacturer may record the SKU into the private blockchain or may permit merchants, vendors, or suppliers (such as the packaging supplier) to record the product SKU into a permissioned or private blockchain utilized by the product manufacturer. The SKU is distinct from the product model number assigned by a manufacturer, although the model number may form all or part of the SKU. In a similar manner, the product's model number as well as its Bill of Materials and/or the various supply chain components and raw materials which make up the product may similarly be written into the digital twin stored by the private blockchain.

According to another embodiment of method 1300, transacting the digital twin having the certificate of authenticity embedded therein onto the public blockchain with the GUID includes adding a new public blockchain asset to the public blockchain identified by the GUID on the public blockchain; and in which transacting the digital twin onto the public blockchain further includes: writing a product manufacturer's Bill of Materials (BOM) for the finished goods product into a payload of the new public blockchain asset; in which any participating node on the public blockchain has read access to each of (i) the GUID for the finished goods product, (ii) ownership history of the finished goods product, (iii) the certificate of authenticity for the finished goods product, and (iv) the product manufacturer's BOM for the finished goods product.

For example, depending on the needs and preferences of the product manufacturer, additional details may be written into the digital twin and stored with the certificate of authenticity or written directly into the certificate of authenticity of the digital twin. For instance, an automobile manufacturer may elect to write an entire product manufacturer's Bill of Materials for a vehicle into the digital twin and expose the information publicly via the public blockchain. Conversely, a smartphone manufacturer may elect to keep such information private, thus tracking and maintaining the BOM information within their records on the private blockchain, but not expose such details to the public via the public blockchain. In other situations, such as the sale of pharmaceuticals and medical equipment, the product manufacturer may be required by federal statute or other legal requirements to provide the Bill of Materials or to list all supply chain suppliers and vendors, and thus may elect to comply with such requirements via the disclosure of said information utilizing the public blockchain.

According to another embodiment of method 1300, generating a digital twin for a finished goods product further includes: writing one or more supply chain component identifiers into the certificate of authenticity identifying a corresponding one or more supply chain components or raw materials which are embedded within the finished goods product; and in which transacting the digital twin having the certificate of authenticity embedded therein onto the public blockchain includes exposing the one or more supply chain component identifiers publicly via the certificate of authenticity of the digital twin on the public blockchain.

According to another embodiment, method 1300 further includes: receiving supply chain component certificates of authenticity for one or more components or raw materials within the finished goods products; encoding the supply chain component certificates of authenticity into the certificate of authenticity uniquely identifying the finished goods product by the product identifier; and in which transacting the digital twin having the certificate of authenticity embedded therein onto the public blockchain includes exposing the certificate of authenticity for the finished goods product and the received supply chain component certificates of authenticity via the digital twin for the finished goods product transacted onto the public blockchain.

For example, depending on the needs and preferences of the product manufacturer as well as the particular finished goods product in question, it may be desired to include product identifiers for supply chain components and raw materials or include certificates of authenticity provided to the product manufacturer by supply chain vendors and suppliers with the product manufacturer's own certificate of authenticity, all of which are then exposed publicly when the digital twin and its embedded certificate of authenticity are transacted onto the public blockchain. In such a way, the product manufacturer will have a record of such details recorded within the private blockchain and there will also be made available to purchasers and other concerned parties, the same details (e.g., supply chain component identifiers and authenticity documents) via the public blockchain.

According to another embodiment, method 1300 further includes: receiving a digital signature for the new certificate of authenticity from the product manufacturer; applying the digital signature for the new certificate of authenticity forming a digitally signed certificate of authenticity attesting to the product manufacturer's certification of authenticity of the finished goods product identified by the product identifier specified with the new certificate of authenticity; and in which transacting the digital twin onto the private blockchain includes transacting the digital twin having the digitally signed certificate of authenticity embedded therein onto the private blockchain.

For example, the product manufacturer may digitally sign the certificate of authenticity via an API with the host organization, or by the host organization sending or transmitting the unsigned certificate of authenticity to the product manufacturer subsequent to which the host organization receives back the digitally signed certificate of authenticity. Alternatively, the product manufacturer may be presented with the certificate of authenticity via a GUI from the host organization, via which the product manufacturer digitally signs and thus attests to the product manufacturer's certification of authenticity via the GUI, resulting in the digitally signed certificate of authenticity. According to certain embodiments, digital signatures use a certificate-based digital ID issued by an accredited Certificate Authority (CA) or Trust Service Provider (TSP). Certificate Authorities bind the product manufacturer's identity to a PKI-based Digital Certificate which allows the product manufacturer to apply Digital Signatures to documents, such as the certificate of authenticity via cloud-based signing platforms. When the product manufacturer applies a Digital Signature to the certificate of authenticity, a cryptographic operation binds the product manufacturer digital certificate and the data being signed into one unique fingerprint. The uniqueness of the two components of the signature is what makes digital signatures a viable replacement to wet ink signatures. Thus, when the product manufacturer digitally signs a document, the identity of the product manufacturer (or other entity) is uniquely linked to them, thus permitting the digital signature to be immutably and cryptographically bound to the signed certificate of authenticity. Such capabilities help to combat counterfeit goods in the market place because, at any time, the product manufacturer's digital signature may be verified using underlying Public Key Infrastructure (PKI) technology and the digital twin's certificate of authenticity may be check and validated via the public blockchain.

According to another embodiment of method 1300, the product identifier uniquely identifies the finished goods product as exactly one physical item and links the digital twin stored to the private blockchain with the finished goods product via the product identifier having been assigned to the new certificate of authenticity embedded within the digital twin; and in which the globally unique identifier (GUID) uniquely identifies the digital twin for the finished goods product on the public blockchain; and in which writing the GUID uniquely identifying the digital twin on the public blockchain into the asset on the private blockchain immutably links the product identifier within the private blockchain with the GUID uniquely identifying the digital twin of the finished goods product on the public blockchain.

For example, while the product identifier is unique within the private blockchain, there is no guarantee that such a number will be unique within a public blockchain which is utilized and referenced by many entities, including other product manufacturers, retailers, wholesalers, service providers, brokers, etc. Therefore, Globally Unique ID or GUID is utilized to ensure that every individual finished goods product is uniquely identifiable within the public blockchain, regardless of what numbering, serial number scheme, or bar code scheme is utilized by the product manufacturer. Moreover, because the GUID is written back to the asset having the digital twin for the finished goods product on the private blockchain accessible to the product manufacturer, there is an auditable and traceable link between the information for the finished goods product stored on the private blockchain and the publicly accessible information stored on the public blockchain. Thus, in the event of an audit, recall, component details, or any other event requiring the more detailed information from the private blockchain, it is possible to trace such a finished goods product back into the private blockchain due to the link.

According to another embodiment of method 1300, the certificate of authenticity specific to the finished goods product as identified by the unique ID includes one of: the unique ID encoding a serial number for the finished goods product assigned by the product manufacturer; the unique ID encoding a barcode for the finished goods product assigned by the product manufacturer; the unique ID encoding a Vehicle Identification Number (VIN) number for the finished goods product assigned to an automobile by the product manufacturer; and the unique ID encoding a universally unique identifier (UUID) number generated by the host organization and assigned to the finished goods product concurrent with generation of the digital twin for the finished goods product.

According to another embodiment of method 1300, providing the plurality of certificate of authenticity templates includes: providing the plurality of certificate of authenticity templates to any of the plurality of tenant organizations via a commerce cloud platform provided by the host organization; in which the certificate of authenticity templates include one or more of: a certificate of authenticity template for an electronic device; a certificate of authenticity template for a computing device; a certificate of authenticity template for a smartphone or tablet; a certificate of authenticity template for a wearable garment; a certificate of authenticity template for a wearable computing device; a certificate of authenticity template for a fashion accessory; a certificate of authenticity template for an automobile; and a certificate of authenticity template for an artwork by an artist.

According to another embodiment of method 1300, providing the plurality of certificate of authenticity templates includes providing the plurality of certificate of authenticity templates to any of the plurality of tenant organizations via a commerce cloud platform provided by the host organization; in which the method further includes: executing an artificial intelligence engine at the commerce cloud platform; and issuing recommendations from the artificial intelligence engine to the product manufacturer for use of a certificate of authenticity template for the product manufacturer's product based at least in part on relationships between the product manufacturer and one or more suppliers to the product manufacturer.

According to another embodiment, method 1300 further includes: communicably interfacing with a Customer Relationship Management (CRM) of the product manufacturer operating as one of the plurality of tenants within the host organization; in which the relationships between the product manufacturer and the one or more suppliers to the product manufacturer are determined from the CRM system for the product manufacturer; in which issuing the recommendations to the product manufacturer for use of the certificate of authenticity template further includes auto-populating one or more fields of the recommended certificate of authenticity template recommended by the artificial intelligence engine by retrieving corresponding data from the CRM of the tenant organization; and in which the one or more fields auto-populated correspond to one of a component field, a supplier field, and a field identifying a supplier's certificate of authenticity for components or raw materials.

According to another embodiment of method 1300, providing the plurality of certificate of authenticity templates includes providing the plurality of certificate of authenticity templates to any of the plurality of tenant organizations via a commerce cloud platform provided by the host organization; in which the method further includes: receiving custom branding information from the product manufacturer; and generating the new certificate of authenticity using one of the plurality of templates; and applying the custom branding information from the product manufacturer to the generated certificate of authenticity.

For example, the product manufacturer may wish to include their own custom branding with the issued certificate of authenticity which is ultimately published onto the public blockchain as part of the product's digital twin. Such custom branding may include the product manufacturer's logo, trademark, color scheme, QR codes, language and trade copy provided by the product manufacturer, etc. In certain embodiments, the product manufacturer's custom branding may be retrieved from a CRM system for the product manufacturer or retrieved from the commerce cloud platform using the product manufacturer's tenant organization identity, etc.

According to another embodiment, method 1300 further includes: publishing a web-based interface from the host organization to a public Internet linking the web-based interface with the second blockchain interface to the public blockchain; receiving an anonymous query at the web-based interface requesting validation of ownership or authenticity or both of the digital twin published to the public blockchain; retrieving the digital twin and its certificate of authenticity from the public blockchain; and returning ownership confirmation or the certificate of authenticity or both to the requestor of the anonymous query responsive to the request.

For example, the host organization may service non-authenticated and anonymous requests via its web-based interface to certify or confirm ownership and authenticity information on behalf of its tenant organizations. While any entity may create a participating node on the public blockchain and transact with the blockchain themselves to verify such information, it may be helpful to provide such an interface to those parties who lack the technical skill set or motivation to implement their own interface to the public blockchain.

According to another embodiment of method 1300, the product manufacturer publishes a custom branded web-based interface to a public Internet linking the custom branded web-based interface with a blockchain services interface of the host organization via which to service queries directed at the public blockchain. According to such an embodiment, method 1300 further includes: receiving an anonymous query at the host organization having been redirected from the custom branded web-based interface published by the product manufacturer, the anonymous query requesting validation of ownership or authenticity or both of the digital twin published to the public blockchain; retrieving the digital twin and its certificate of authenticity from the public blockchain; and returning a response including ownership confirmation or the certificate of authenticity or both to the requestor of the anonymous query responsive to the request by routing the response through the custom branded web-based interface published by the product manufacturer.

For example, the product manufacturer may utilize the cloud based services of the host organization to service queries to the public blockchain requesting verification of ownership and authenticity, yet desire to brand the experience with custom branding details pertaining to the product manufacturer. Thus, the product manufacturer may provide a customer focuses and custom branded experience by receiving such queries and routing them through the host organization's cloud based services for query servicing. In alternative embodiments, the product manufacturer may be of sufficient size and have adequate computing infrastructure via which they implement their own query interface to the public blockchain by operating a participating node on the public blockchain, wholly separate from any interaction with the host organization, and then conduct queries to the public blockchain via their own interface. Notably, any entity can create an interface to the public blockchain and retrieve ownership and authenticity information from the blockchain, regardless of any relationship such an entity may or may not have with the host organization or the product manufacturer.

According to another embodiment of method 1300, writing the GUID uniquely identifying the digital twin on the public blockchain into the asset on the private blockchain within which the digital twin is stored includes: transacting with the private blockchain via an UPDATE asset command function; and in which writing the GUID into the asset on the private blockchain includes executing the UPDATE asset command function to modify the asset previously recorded to the private blockchain by modifying a payload portion of the existing asset to add and populate a GUID field of the asset with the GUID from the public blockchain.

According to another embodiment, method 1300 further includes: displaying a Graphical User Interface (GUI) to an admin computing device communicably interfaced with the host organization, the admin computing device authenticated as belonging to the product manufacturer as one of the plurality of tenant organizations; in which the GUI displays a template configuration interface for the certificate of authenticity via which the admin computing device may customize the template with custom branding for the product manufacturer and with additions, deletions, or alterations to one or more populatable fields of the template; in which the method further includes: receiving input from the admin computing device via the GUI to customize the template; and in which generating the new certificate of authenticity using one of the plurality of templates includes using the template as customized by the input from the admin computing device to generate the new certificate of authenticity.

According to another embodiment of method 1300, transacting the digital twin having the certificate of authenticity embedded therein onto the public blockchain includes adding a transaction to the public blockchain via a CREATE asset command function for the public blockchain; and in which the added transaction is subjected to a consensus protocol by the participating nodes of the public blockchain prior to the added transaction being accepted as part of a primary chain of the public blockchain by the participating nodes of the public blockchain.

For example, transacting on the public blockchain retains consensus schemes required for the public blockchain so as to ensure transaction validity.

According to another embodiment, method 1300 further includes: maintaining an index for a plurality of certificates of authenticity for the product manufacturer persistently stored as data records to the private blockchain; in which the index defines at least a location for each of the plurality of data records persistently stored to the private blockchain, the location defining one addressable block of the private blockchain from which to retrieve a respective data record persistently stored to the private blockchain.

According to another embodiment of method 1300, the index includes a Merkle Tree compatible index; and in which the index is persistently stored at the host organization or persistently stored to the private blockchain or persistently stored at both the host organization and the private blockchain.

For example, such an index may be utilized to improve retrieval speeds, with the index being maintained within one or both of the host organization and the private blockchain. While duplicative data is persistently stored, the retrieval time for fetching records indexed is greatly reduced due to the index defining a specific location of the data within the private blockchain, such as at which block such data is stored.

According to another embodiment of method 1300, the index defines for each of the plurality of data records persistently stored to the private blockchain, both (i) the location for each of the plurality of records persistently stored to the private blockchain and (ii) a copy of any contents of the plurality of record records persistently stored to the private blockchain; and in which maintaining the index includes writing the updated values for the data record to the index when the updated values for the data record are written to the private blockchain pursuant to successful validation of the updated values.

For example, according to one embodiment, such methodologies may further receive a second transaction requesting retrieval, from the private blockchain, of the updated data record previously written to the blockchain; retrieve the updated data record from the index without interacting with the private blockchain; and return the updated data record retrieved from the index responsive to the second transaction requesting the retrieval. Thus, in addition to indexing location information, contents of the records may also be retrieved, wholly negating the need to transact with the blockchain for a read-only retrieval request which has been previously been indexed. Where the contents of such stored records are indexed in this way retrieval speed will be increased dramatically over conventional blockchain retrieval transactions, especially when the index is persisted and maintained at the host organization, thus eliminating any interaction with the blockchain whatsoever for a read-only retrieval.

According to another embodiment of method 1300, nodes and leafs of the index are retrievable via full or partial addresses as defined by an addressing structure for the index; in which the method further includes maintaining the addressing structure for the index, in which the addressing structure includes at least: a first portion of the addressing structure defining an application namespace; a second portion of the addressing structure defining an entity type identifier; and a third portion of the addressing structure defining a name for an entity or a data record stored by the private blockchain and indexed by the index.

For example, any node or leaf or sub-tree below a node may be directly referenced and retrieved from the index without having to walk, traverse, or search the index when the address is known, thus further increasing retrieval speeds.

According to another embodiment of method 1300, referencing the index with a fully qualified address will return contents of leaf from the index, the contents of the leaf; and in which referencing the index with a partial address will return a sub-tree beneath a node of the index matching the partial address, in which the sub-tree includes multiple leafs of the index structured below the node of the index matching the partial address.

For example, contents of any leaf may be returned by a call to the index with the full addresses, specifying the application namespace, the entity type identifier and the name of the entity or record, however, use of a partial address may be extremely beneficial as it permits the return of all matching records within a sub-tree beneath a node. For example, if desired, an application which stores student records may return all metadata for the application by specifying a partial address with the application namespace and the entity type identifier, but lacking specification of any specific entity name. Similarly, all student records may be returned using a partial address specifying the application namespace code and specifying the entity type identifier for the student data records, but lacking specification of any specific entity name.

According to a particular embodiment, there is non-transitory computer readable storage media having instructions stored thereon that, when executed by a system of a host organization having at least a processor and a memory therein, the instructions cause the system to perform the following operations: operating a first blockchain interface to a private blockchain on behalf of a product manufacturer, in which the product manufacturer has access permissions to the private blockchain; operating a second blockchain interface to a public blockchain on behalf of a plurality of tenants of the host organization including the product manufacturer as one of the plurality of tenants, in which each one of the plurality of tenants operate as a participating node with access to the public blockchain; providing a plurality of templates for certificates of authenticity to the plurality of tenants; generating a digital twin for a finished goods product by the product manufacturer, the digital twin having embedded therein a new certificate of authenticity generated using one of the plurality of templates, the new certificate of authenticity uniquely identifying the finished goods product by a product identifier specified with the new certificate of authenticity; transacting the digital twin onto the private blockchain by adding an asset to the private blockchain to store the digital twin; transferring ownership of the digital twin from the product manufacturer to a purchaser by transacting the digital twin having the certificate of authenticity embedded therein onto the public blockchain with a Globally Unique Identifier (GUID) uniquely identifying the digital twin on the public blockchain; and writing the GUID uniquely identifying the digital twin on the public blockchain into the asset on the private blockchain within which the digital twin is stored.

Figure 14:
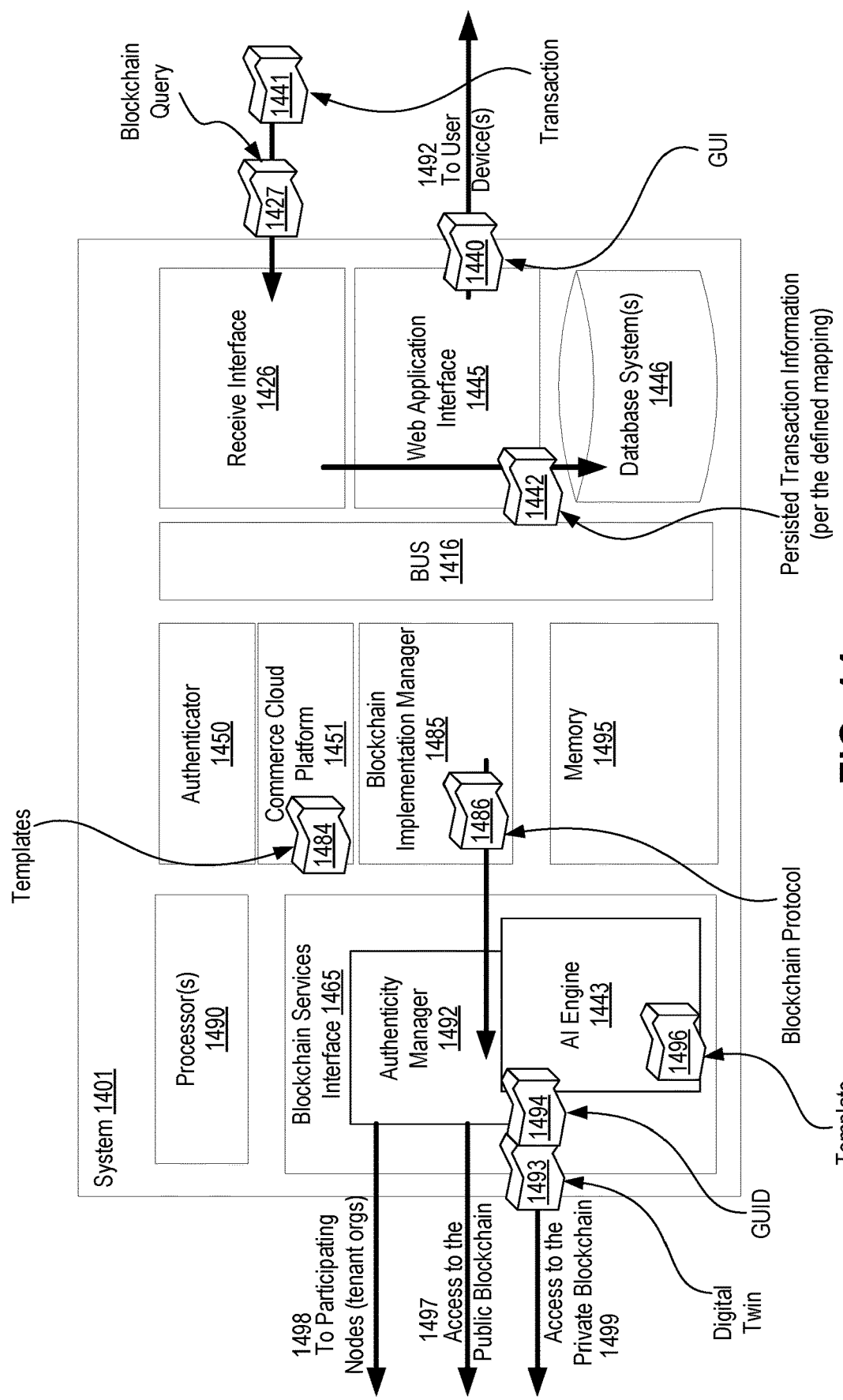
FIG. 14 shows a diagrammatic representation of a system within which embodiments may operate, be installed, integrated, or configured, in accordance with described embodiments.

FIG. 14 shows a diagrammatic representation of a system 1401 within which embodiments may operate, be installed, integrated, or configured. In accordance with one embodiment, there is a system 1401 having at least a processor 1490 and a memory 1495 therein to execute implementing application code for the methodologies as described herein. Such a system 1401 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 1401, which may operate within a host organization, includes the processor 1490 and the memory 1495 to execute instructions at the system 1401. According to such an embodiment, the processor 1490 is to execute a blockchain services interface 1465 to interface with a private blockchain on behalf of a product manufacturer, in which the product manufacturer has access permissions to the private blockchain 1499; in which the blockchain services interface further is to interface with a public blockchain 1497 on behalf of a plurality of tenants of the host organization including the product manufacturer as one of the plurality of tenants, in which each one of the plurality of tenants operate as a participating node 1498 with access to the public blockchain; a commerce cloud platform 1451 executable via the processor 1490 to provide a plurality of templates 1484 for certificates of authenticity to the plurality of tenants; an authenticity manager 1492 to generate a digital twin 1493 for a finished goods product by the product manufacturer, the digital twin having embedded therein a new certificate of authenticity generated by the authenticity manager using one of the plurality of templates 1484, the new certificate of authenticity uniquely identifying the finished goods product by a product identifier specified with the new certificate of authenticity; According to such a system 1401, the blockchain services interface 1465 further is to transact the digital twin 1493 onto the private blockchain 1499 by adding an asset to the private blockchain to store the digital twin; in which the blockchain services interface 1465 further is to transfer ownership of the digital twin from the product manufacturer to a purchaser by transacting the digital twin having the certificate of authenticity embedded therein onto the public blockchain with a Globally Unique Identifier (GUID) uniquely identifying the digital twin 1493 on the public blockchain; and in which the blockchain services interface 1465 further is to write the GUID uniquely identifying the digital twin 1493 on the public blockchain 1497 into the asset on the private blockchain 1499 within which the digital twin is stored.

According to such an embodiment of the system 1401, the receive interface 1426 may pass the incoming blockchain queries 1427 and transaction 1441 information to the blockchain services interface.

According to such an embodiment of the system 1401, a GUI 1440 may be pushed to the user devices 1492 via which the user devices or admin computing devices may interact with the blockchain services interface 1465 and the commerce cloud platform 1451 and the authenticity manager 1492 and the Artificial Intelligence (AI) engine 1443, for example, to brand templates, to configure templates, and for transacting with the private and public blockchains as permissions allow.

According to another embodiment of the system 1401, the blockchain services interface 1465 is to interact with and provide access to the private blockchain 1499 for the product manufacturer and to the public blockchain 1497 for any of the plurality of tenants.

According to another embodiment of the system 1401, the receive interface 1426 communicates with a user client device 1492 remote from the system and communicatively links the user device with the system via a public Internet. According to such an embodiment, the system operates at a host organization as a cloud based service provider to the user device 1492; in which the cloud based service provider hosts a receive interface 1426 exposed to the user client device via the public Internet, and further in which the receive interface receives inputs from the user device as a request for services from the cloud based service provider, such as anonymous requests for confirmation of ownership or proof of authenticity.

Bus 1416 interfaces the various components of the system 1401 amongst each other, with any other peripheral(s) of the system 1401, and with external components such as external network elements, other machines, client devices, cloud computing services, etc. Communications may further include communicating with external devices via a network interface over a LAN, WAN, or the public Internet.

Figure 15:
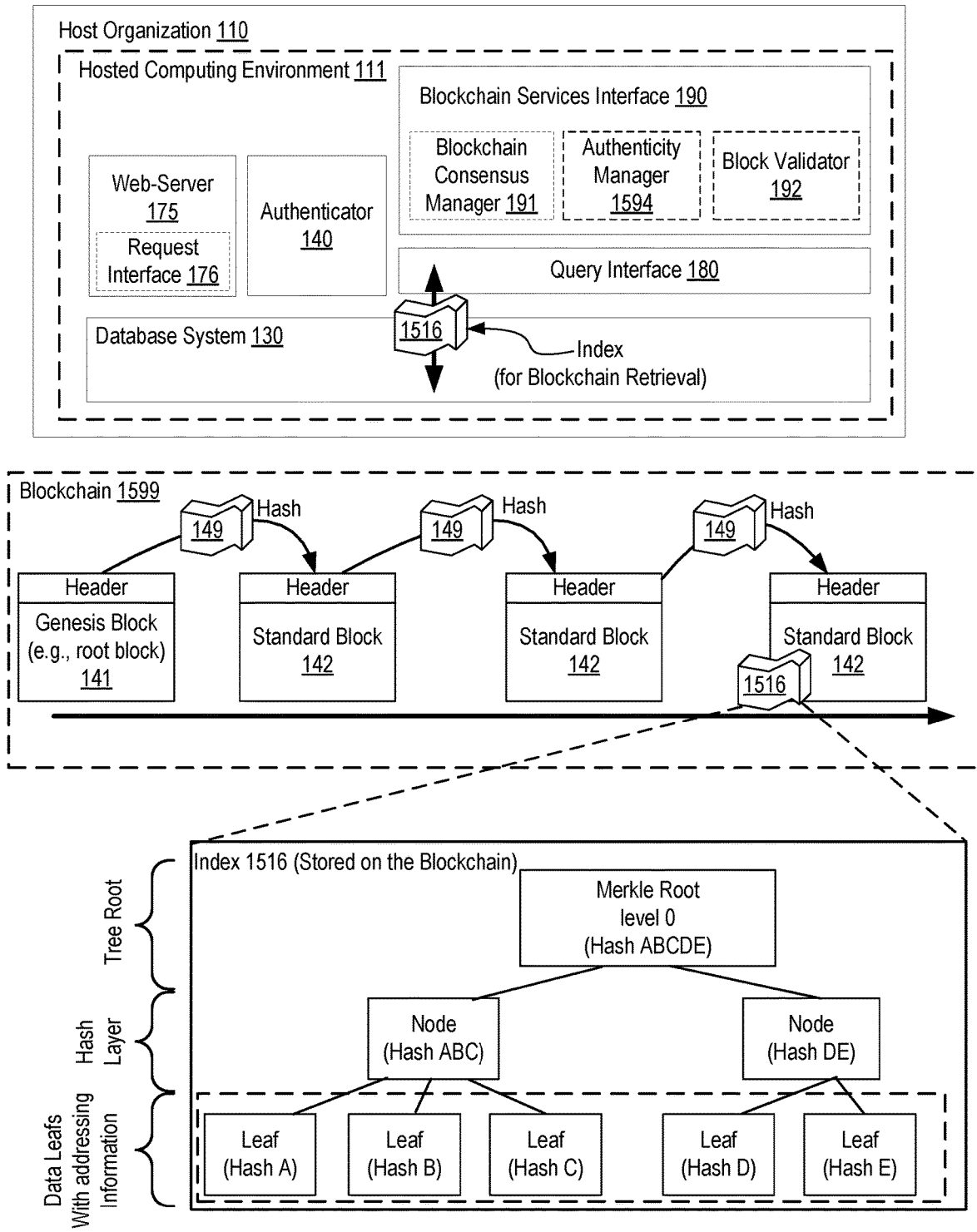
FIG. 15 depicts another exemplary architecture 1501 in accordance with described embodiments.

FIG. 15 depicts another exemplary architecture 1501 in accordance with described embodiments.

There is again the host organization 110 which includes the hosted computing environment 111 having a processor and memory (e.g., within the execution hardware, software, and logic 120 of the database system 130) which serve to operate the blockchain services interface 190 including the blockchain consensus manager 191. Additionally depicted is an authenticity manager 1594 implemented by the blockchain services interface 190. There is additionally depicted an index 1516 which provides addressing capabilities for data, metadata, and certificates of authenticity, digital twins, and various records which are written to, or transacted onto the private or public blockchains 1599.

As shown, the index 1516 is stored within the database system 130 of the host organization, however, the Merkle tree index 1516 may alternatively be written to and stored on the blockchain itself, thus enabling participating nodes with the blockchain which lack access to the query interface 180 of the host organization to nevertheless be able to retrieve the Merkle tree index 1516 (when stored on the blockchain) and then use an address retrieved from the Merkle tree index

1516 to directly reference an addressable block on the blockchain to retrieve the desired record, data, or metadata, without having to traverse the entire blockchain or search the blockchain for the needed record.

As depicted, there is another index 1516 depicted as being shown within the last standard block 142 of the blockchain 1599. Only one index 1516 is required, but the index 1516 may permissibly be stored in either location.

The Merkle tree index 1516 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 1599 via the blockchain services interface 190 in conjunction with the use of a Merkle tree index 1516 is much more efficient than previously known data storage schemes as it is not necessary to search through multiple blocks 141 and 142 of the blockchain to retrieve a data record. Rather, the index 1516 is first searched to retrieve an address for the desired block, which is very fast and efficient, and then using the retrieved address from the index 1516, the record is retrieved directly from the addressable block on the blockchain 1599.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But, such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

In such a way, data management for records and information stored within the blockchain 1599 is improved. Moreover, metadata may additionally be stored within the blockchain to provide additional information and context regarding stored records, with each of the data records and the metadata describing such data records being more easily retrievable through the use of the index 1599. Such metadata permits a business or other entity to transform the data record retrieved from the blockchain back into a useable format much easier than with conventional approaches which lose such context and metadata for any record written to the blockchain.

Figure 16A:
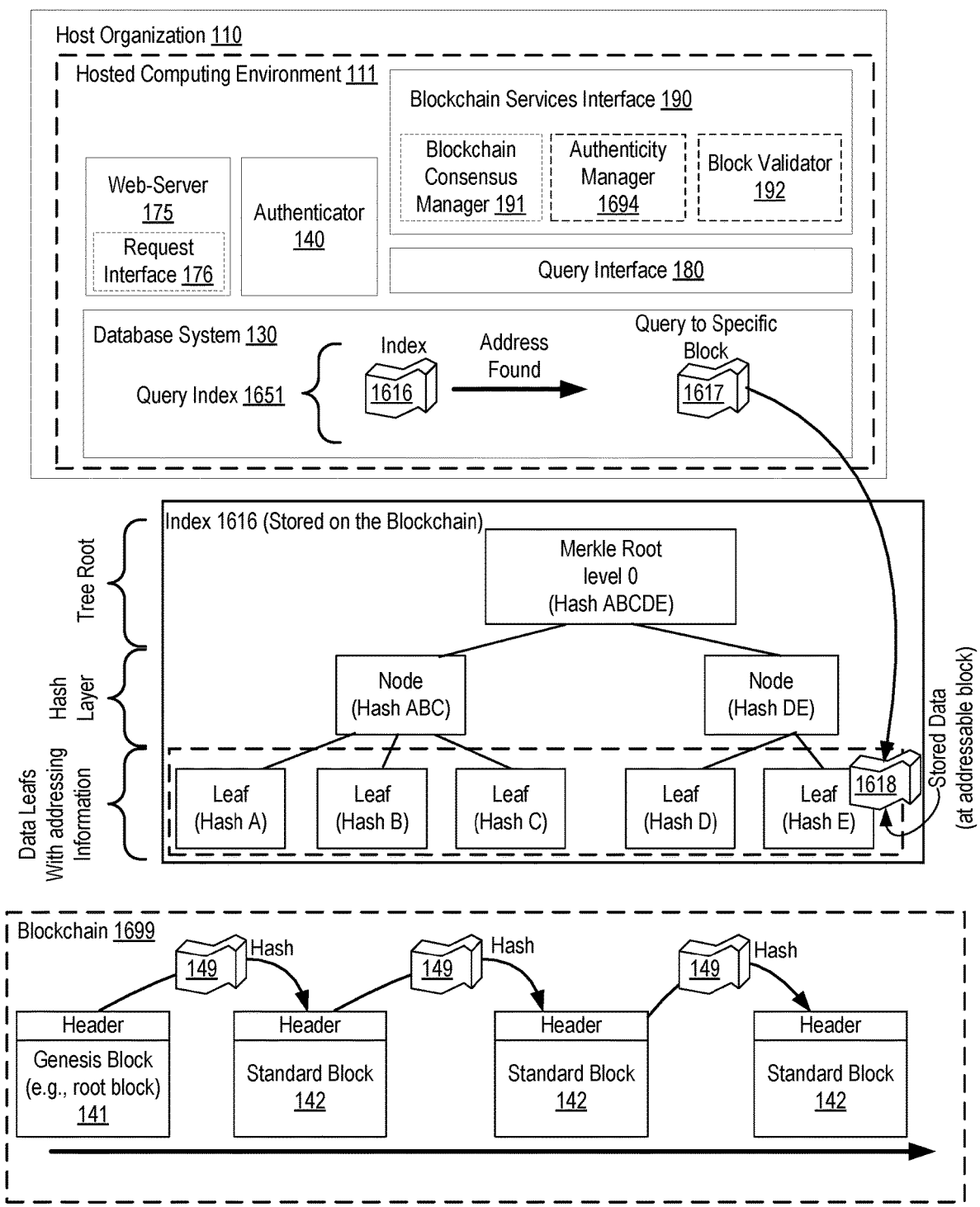
FIG. 16A depicts another exemplary architecture for retrieving stored records from addressable blocks using an indexing scheme, in accordance with described embodiments.

FIG. 16A depicts another exemplary architecture 1601 for retrieving stored records from addressable blocks using an indexing scheme, in accordance with described embodiments.

There is again depicted here, the host organization 110 having therein the hosted computing environment 111 with the blockchain services interface 190 which is now depicted as implementing the blockchain consensus manager 191, the block validator 192 and additionally the authenticity manager 1694. Additionally shown are the web-server 175, the request interface 176, authenticator 140, query interface 180, and the database system 130.

Further described is particular use of the Merkle tree index 1616 which permits retrieval of stored records from the blockchain by going to a particular block of the blockchain based on the Merkle tree index, thus permitting retrieval of a stored record in a more efficient manner. For instance, the Merkle tree index identifies an address for one of many addressable blocks on the blockchain, then retrieval of the stored record negates the need to traverse the blockchain looking for the stored record in question and instead permits the retrieval of the stored record directly from the block identified by the Merkle tree index.

Thus, as depicted here, processing performs a query 1651 to the index 1616 to identify an address for the desired data, subsequent to which a query to a specific block 1617 is performed to retrieve the stored data at the addressable block based on the address without having to traverse the blockchain or traverse the tree to find the data.

According to certain embodiments, the index 1616 is stored within the blockchain 1699 as an entity, for instance, the index may be stored as an asset on the blockchain. Additionally, by storing the stored records within a Merkle tree index 1616 which itself is stored onto the blockchain, it is possible to retrieve any data from the index 1616 by going to a particular block with an index. Thus, if the index is known, it is not necessary to query 1651 the index 1616 for the address, but instead, go directly to a node for a known address within the index and receiving back anything at that node. If the address points to a leaf within the index 1616 then the data stored within the leaf is returned based on a direct query to that address within the index 1616. If the address points to a node having a sub-tree beneath it, such as additional nodes or simply multiple leafs, then the entire sub-tree is returned. For instance, if the address ABC is used, then the entire node having hash ABC is returned, including the three leafs beneath that node, including the leaf having hash A, the leaf having hash B, and the leaf having hash C.

If the index 1616 stores addressing information for specific blocks within the blockchain, then based on the returned addressing information, the specific block of the blockchain may be checked to retrieve the stored record to be retrieved. Alternatively, if the addressing is stored within the index 1616 along with the latest information of the stored record, then going to the index 1616 using an address will return both the addressing information for a block on the blockchain where the stored record is located as well as returning the latest information of that stored record, thus negating the need to query the blockchain further.

Figure 16B:
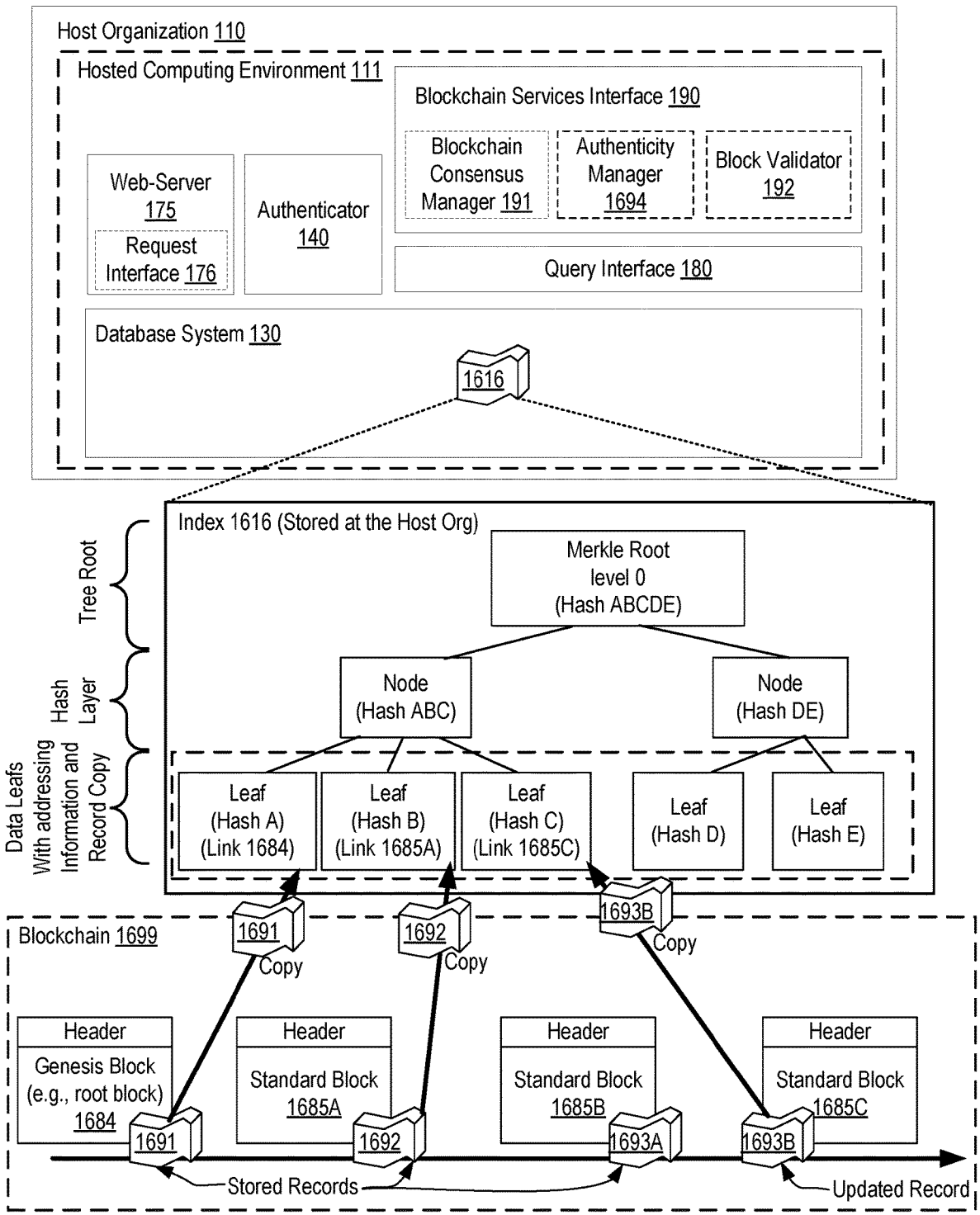
FIG. 16B depicts another exemplary architecture for building an index from records in the blockchain and maintaining the index, in accordance with described embodiments.

FIG. 16B depicts another exemplary architecture 1602 for building an index from records in the blockchain and maintaining the index, in accordance with described embodiments.

According to a particular embodiment, it is desirable to enable extremely fast access to the data records stored within the blockchain through the use of the index 1616. As noted above, the index 1616 may store only an address of an addressable block on the blockchain within which the underlying stored record is kept, thus permitting retrieval of the record from the blockchain using the address retrieved from the index 1616. Alternatively, both the latest information, that is to say, the up to date and current version of a particular record stored by the blockchain may be stored within the index along with the addressable block of the blockchain where the underlying stored record is kept by the blockchain. To be clear, this results in duplicative records being persisted. A latest and current version of a record is kept within the blockchain, considered as the authoritative record, however, for the sake of improving query speeds, a second copy of the same record is kept within the index 1616 along with the address on the blockchain of where the authoritative version of that record is maintained.

According to such an embodiment, an index 1616 may therefore be built or generated by the host organization by referring to the underlying stored records within the blockchain.

As shown here, within the blockchain 1699 there are multiple stored records at different addressable blocks of the blockchain. Stored record 1691 is located at the root block 1684. Stored record 1692 located at block 1685A, stored record 1693A located at 1685B, and finally an updated record 1693B is stored at block 1685C, with the updated record depreciating previously store record 1693A as no longer current.

Any of these stored records may be retrieved from the blockchain by walking or traversing the blockchain searching for the relevant record, locating the relevant record, and then retrieving the stored record from the located block.

Building the index 1616 improves the retrieval efficiency of this process by providing at least the address for the block within the blockchain where the stored record is kept. As described above, an index 1616 with such addressing information may be checked, returning the addressable block of the blockchain for the stored record, and then the stored record may be retrieved from the blockchain without having to traverse or walk multiple blocks of the blockchain. For example, the index 1616 may be checked for the location of updated record 1693B, with the index returning the location of addressable blockchain block 1685C, and then block 1685C may be queried directly to retrieve the latest and most current version of the authoritative stored record which is updated record 1693B at standard block 1685C.

Alternatively, both the contents or the data of updated record 1693B and the location of addressable blockchain block 1685C identifying where the most current version of the authoritative updated record 1693B is kept may be persisted within the index 1616, thus wholly negating the need to retrieve anything from the blockchain. While this results in an additional copy of the updated record 1693B being stored within the index 1616, the speed with which the data of the updated record 1693B may be retrieved is vastly improved. This is especially true where the index 1616 itself is stored within the host organization rather than being written to the blockchain. In such an embodiment, the index 1616 is checked within the host organization 110 and both the location of the stored record is returned as well as the contents or the data of the stored record, with such data corresponding to the copy of the data from the stored record in the blockchain being returned from the index 1616 stored at the host organization. Thus, the application receiving such information is subsequently checked to validate the information stored within the blockchain by retrieving the stored record from the blockchain using the location for the stored record within the blockchain as returned by the index 1616 or the application may simply utilize the copy of the data returned from the index 1616 itself, depending on the data consistency requirements and concerns of that particular application.

Thus, as may be observed here, the data leafs of the index 1616 now include not just addressing information providing the location of the block in question within the blockchain, but additionally persist a copy of the stored record within the blockchain, thus providing duplicative locations from which to retrieve such data. One copy of the stored records is retrievable from the blockchain itself, but a copy of the stored record in the blockchain is also retrievable from the index 1616.

As depicted here, the leaf hash A now has a link to location 1684, thus providing the location or addressing information for root block 1684 on the blockchain 1699 where stored record 1691 is persisted. However, leaf hash A additionally now has a copy of stored record 1691 which is persisted within the index 1616 itself, thus permitting retrieval of the data or contents from stored record 1699 directly from the index 1616 stored on the host organization without necessarily having to retrieve the stored record from the blockchain, despite the blockchain having the authoritative copy of the stored record 1691. By identifying the records to be indexed (e.g., all student records for example) and then searching for and retrieving those records from the blockchain and recording the location of those records within the index 1616 along with a copy of the stored records retrieved, such an index 1616 may be built and utilized for very fast retrieval of the record contents. Further depicted is leaf hash B having a link to the blockchain block location 1685A along with a copy of stored record 1692 located within the index 1616 and because stored records 1693A was updated and thus deprecated by updated record 1693B, the leaf hash C is built with a link to blockchain block location 1685C along with a copy of the updated record 1693B from the blockchain to be persisted within the index 1616 stored at the host organization 110 (e.g., within the database system 130 of the host organization 110). In alternative embodiments where the index 1616 is saved within the blockchain, retrieval efficiency is still improved as only the index 1616 needs to be retrieved, which will have within it the duplicative copies of the stored records as described above.

The index 1616 may then be searched much more quickly than searching the blockchain or in the event the hash or address is known for a leaf or node within the index 1616, then the address may be utilized to go directly to the leaf or node within the index 1616 from which all contents may thus be retrieved. For instance, if the address or hash points to a leaf, then the location information for the addressable block within the blockchain will be returned along with the persisted duplicate copy of the stored record at that blockchain location. If the address or hash points to a node with sub-nodes or multiple leafs beneath it, then the entire sub-tree will be returned, thus providing the contents of multiple records within the respective leafs (end-points) of the sub-tree returned.

Figure 16C:
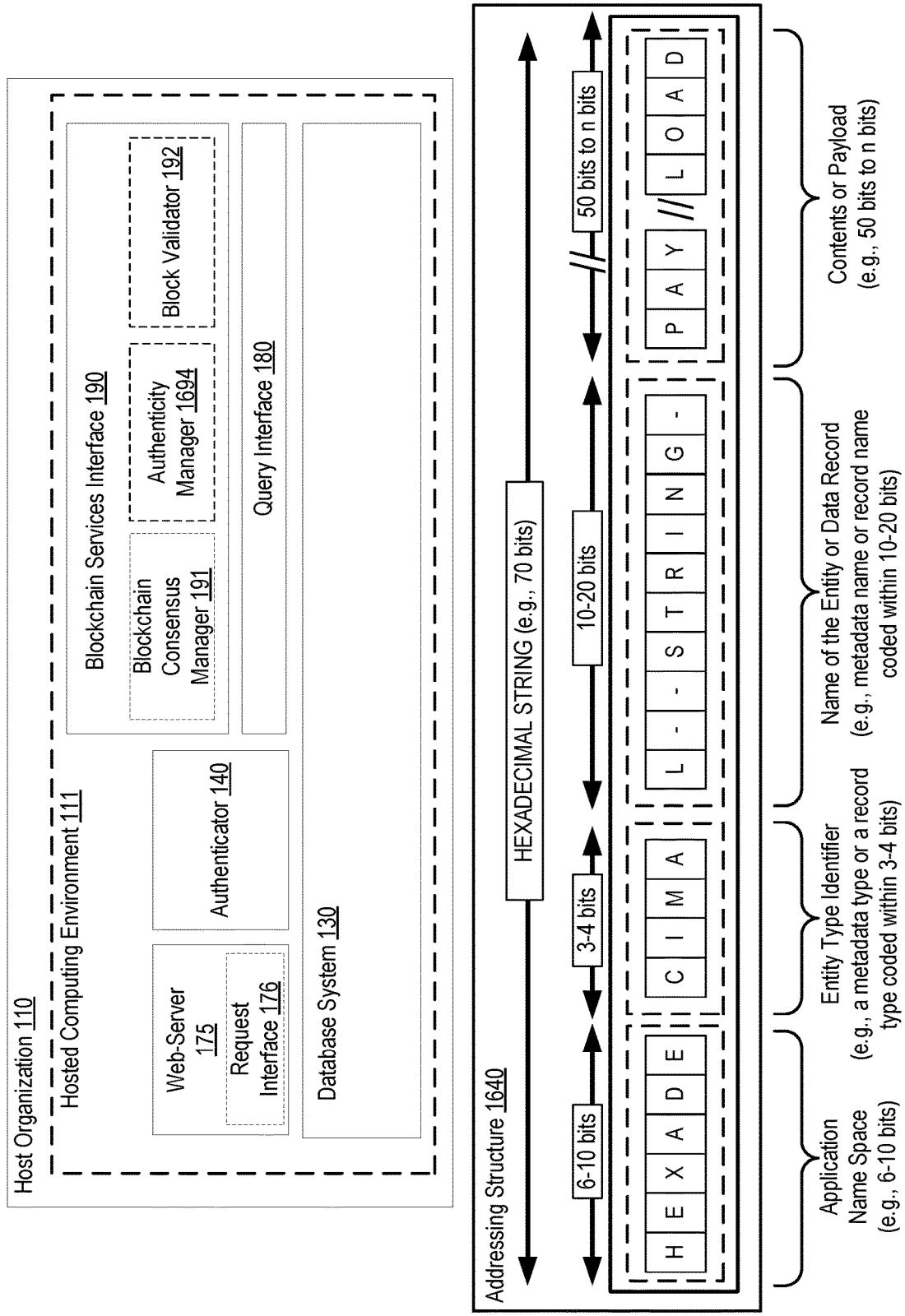
FIG. 16C depicts another exemplary architecture for utilizing an addressing structure to form an address for retrieving information from the index, in accordance with described embodiments.

FIG. 16C depicts another exemplary architecture 1603 for utilizing an addressing structure to form an address for retrieving information from the index, in accordance with described embodiments.

Structuring of the addresses within the Merkle tree index permits very fast access to the specific node or leaf within which the location information for the stored records within the blocks on the blockchain is provided as well as, according to certain embodiments, a copy of the stored record.

Without the structured address, it is necessary to begin at the root of the Merkle tree index 1616 and then step through each level until the desired node or leaf is found. While this traversal of an index 1616 is faster than walking or traversing the blocks of the blockchain, even faster access is realized by referring directly to a single leaf or a node (and thus it's sub-nodes or leafs) via a structured address as depicted via the addressing structure 1640 shown here.

Specifically depicted here is an addressing structure 1640 for the indexing scheme utilizing the Merkle tree index 1616 which is broken into four primary components which make up a hexadecimal string. The first portion provides an application namespace of an exemplary 6-10 bits (though the size may differ) in which a specific application may be coded. For instance, the student records discussed above may be defined by and utilized in conjunction with a student record look-up API or interface coded as "SLDB" (e.g., Student Lookup DataBase) which converts to hex "534c4442." This application namespace field is then followed by an entity type identifier of an exemplary 3-4 bits (though the size may differ) to identify the type or kind of information stored, such as a stored record or a metadata entity or a related entity stored as metadata, etc. For example, the information may be the contents of a student record which may be coded as SR which converts to hex "5352" or the information may be metadata defining a student record which may be coded as MD which converts to hex "4d44" or the information may be a related entity. Certain related entities are stored as metadata with the same type identifier (e.g., MD/4d44) or alternatively may be stored as metadata with a unique entity type identifier, such as being coded RE for related entity which converts to hex "5245."

Next, within the addressing structure 1640 is the name of the entity or data record of an exemplary 10-20 bits (though the size may differ) to specify what is being stored (not the contents, but the name of the stored information). Thus, metadata defining a student record may be coded as SRAMD (e.g., for Student Record Application MetaData) which converts to hex "5352414d4420" or the stored information may be the student record itself, thus being named STUDREC (e.g., for Student Record) which converts to hex "5354554452454320" or perhaps the stored information is a related entity within which there is stored a student's transcript named TRNSCRPT which converts to hex "54524e534352505420" or the stored information may be a stored a student's medical records named MEDREC which converts to hex "4d454452454320." Any extra space for the respective portions of the addressing structure may be padded with leading zeros depending on the application's use and means of parsing such data.

Lastly, there is a contents or payload portion of the addressing structure having therein the actual information to be stored, such as the contents of a stored record (e.g., the values making up a student's record), or metadata defining a record (e.g., the metadata by which to define, validate, structure, mask, or type the actual stored contents. Similarly, there may be stored within the payload or contents portion of the addressing structure 1640, metadata identifying a related entity via a linked UUID which corresponds to a UUID field within a stored record (e.g. a student record may include a related entity field with a UUID for a student's transcript, thus linking the student's record with the student's separately stored transcript within a related entity metadata stored asset on the blockchain).

Within the payload or contents portion of the addressing structure 1640, the application developer utilizing the indexing scheme has nearly unlimited flexibility of what may be stored, up to the size limits imposed, such as a 70 bit total limit for an extremely small, efficient, albeit restrictive addressing structure 1640 up to n bits (e.g., hundreds or thousands depending on the use case) within which significantly more information may be stored.

Because the information is stored as a hexadecimal string, the information may easily be protobuffed, serialized, encrypted, and decrypted as well as every efficiently transmitted across networks and utilized by heterogeneous applications without regard to any specialized formats.

Figure 16D:
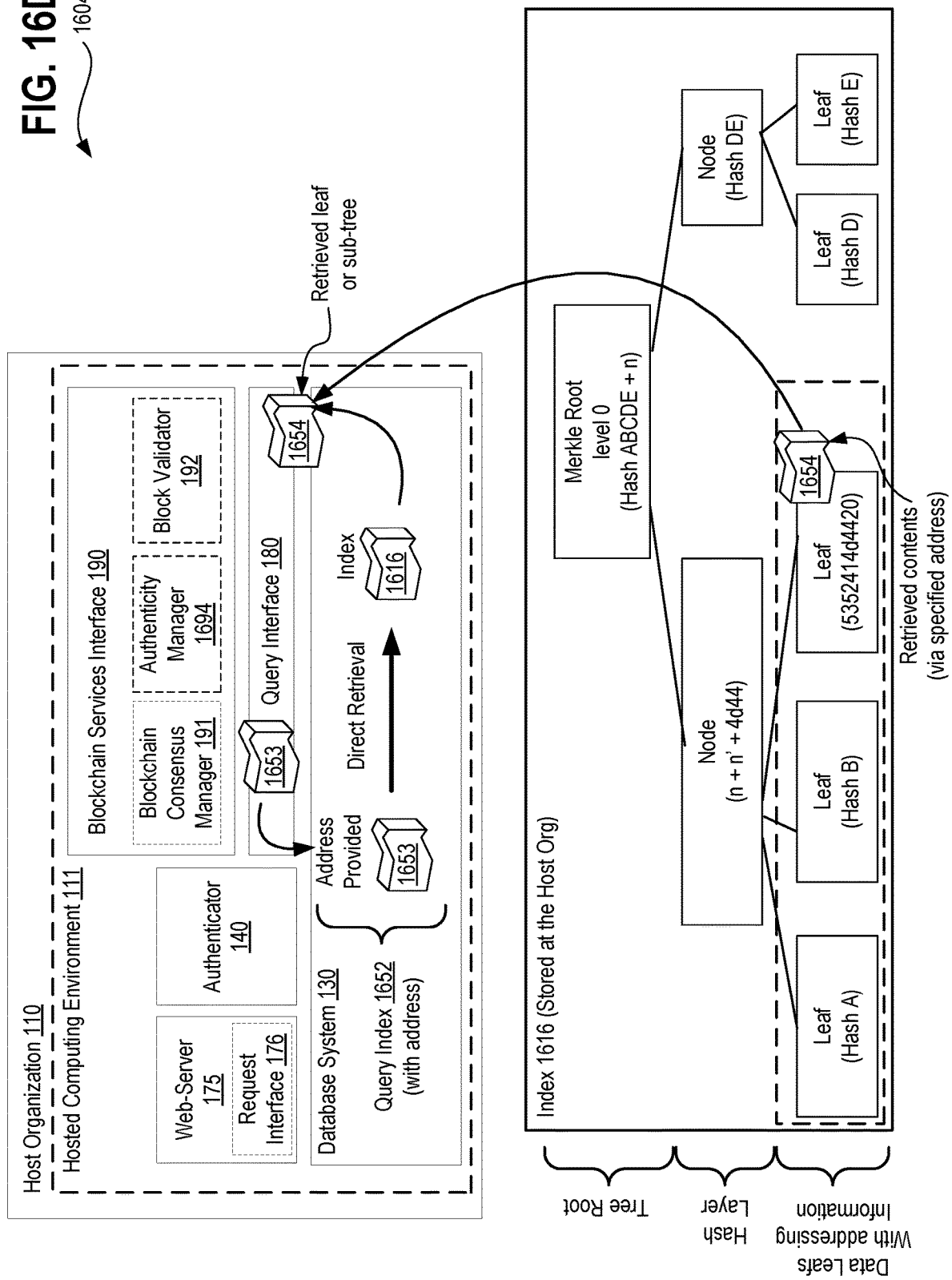
FIG. 16D depicts another exemplary architecture for utilizing an address to retrieve information from the index, in accordance with described embodiments.

FIG. 16D depicts another exemplary architecture 1604 for utilizing an address to retrieve information from the index, in accordance with described embodiments.

As depicted here, the query interface 180 provides an address 1653 via which to perform a query 1652 against the index using the address, thus permitting direct retrieval from the index 1616 of either a leaf or a sub-tree of the index 1616 depending on what retrieved data is queried for via the address.

Consider a query 1652 against the index 1616 address using the indexing scheme and address structure from the example above.

For example, the application namespace for a student record look-up API or interface is coded as "SLDB" (e.g., Student Lookup DataBase) which converts to hex "534c4442" followed by the type or kind of information stored coded as MD (for metadata) which converts to hex "4d44" followed by metadata defining a student record coded as SRAMD which converts to hex "5352414d4420."

This results in an address of 534c4442+4d44+5352414d4420 or 534c44424d445352414d4420. It is not necessary to define the address for the contents or payload since this is the data being retrieved, however, such data may be written to the index using the above address concatenated with the hexadecimal representation of the contents or payload.

Nevertheless, querying against the index 1616 using the address 534c4442+4d44+5352414d4420 provides a fully qualified address down to a leaf in the Merkle tree index having therein the payload or contents to be retrieved, which in this case is the metadata for an application called "SLDB" (e.g., Student Lookup DataBase) which defines the coding of student records for that application.

Similarly, if a student record is to be retrieved, then querying the index 1616 using the address 534c4442 (for the Student Lookup DataBase)+5352 (for SR or a Student Record)+5354554452454320 provides a fully qualified address down to a leaf in the Merkle tree index having therein the student record payload or contents to be retrieved, which in this case is the student record information for the application called "SLDB" (e.g., Student Lookup DataBase) which is defined by the metadata retrieved above. If the student's UUID or student ID is utilized as a leading portion of the stored student record payload, then the address may be further qualified to retrieve a specific record's contents only for that particular student.

Another benefit of such an indexing scheme is the ability to query for information using a non-fully-qualified address or a partial address. For example, continuing with the above example, the developer may trigger the index to return all the metadata for their specific application by submitting a partial address to the index 1616 for direct retrieval by specifying their address and the entity type identifier for their metadata. Thus, such a partial address forms the hex string for the application namespace portion corresponding to the "SLDB" (e.g., Student Lookup DataBase) which converts to hex "534c4442" followed by the type or kind of information stored coded as MD (for metadata) which converts to hex "4d44," thus resulting in 534c4442+4d44 or simply 534c44424d44.

Querying the index 1616 for direct retrieval using this partial address will cause the index to return all metadata for the "SLDB" (e.g., Student Lookup DataBase) application, regardless of what such metadata is named or how many leafs or sub-trees are consumed to store such data. More particularly, querying the index 1616 using the partial address will return an entire sub-tree below the node of the Merkle tree index hashed with the hex string 534c4442+ 4d44. Similarly, all student records may be retrieved (via an entire sub-tree being returned) by specifying a partial address for direct retrieval, such as specifying to the query of the index 1616 the address 534c4442 (for the Student Lookup DataBase)+5352 (for SR or a Student Record) without any specifically named student records.

In the event the contents or payload information in the index includes both the location information for the stored record within the blockchain as well as the contents of the stored record copied from the blockchain into the index 1616, then it is not necessary to retrieve anything further from the blockchain. If only the location information of the contents within a specified block of the blockchain is provided (thus resulting in a much smaller storage volume and faster retrieval due to a smaller index) then the blockchain services interface 190 will subsequently utilize the location information to fetch the contents of the stored record directly from the specified block on the blockchain without having to traverse or walk multiple blocks of the blockchain in search of the specified stored record.

Figure 16E:
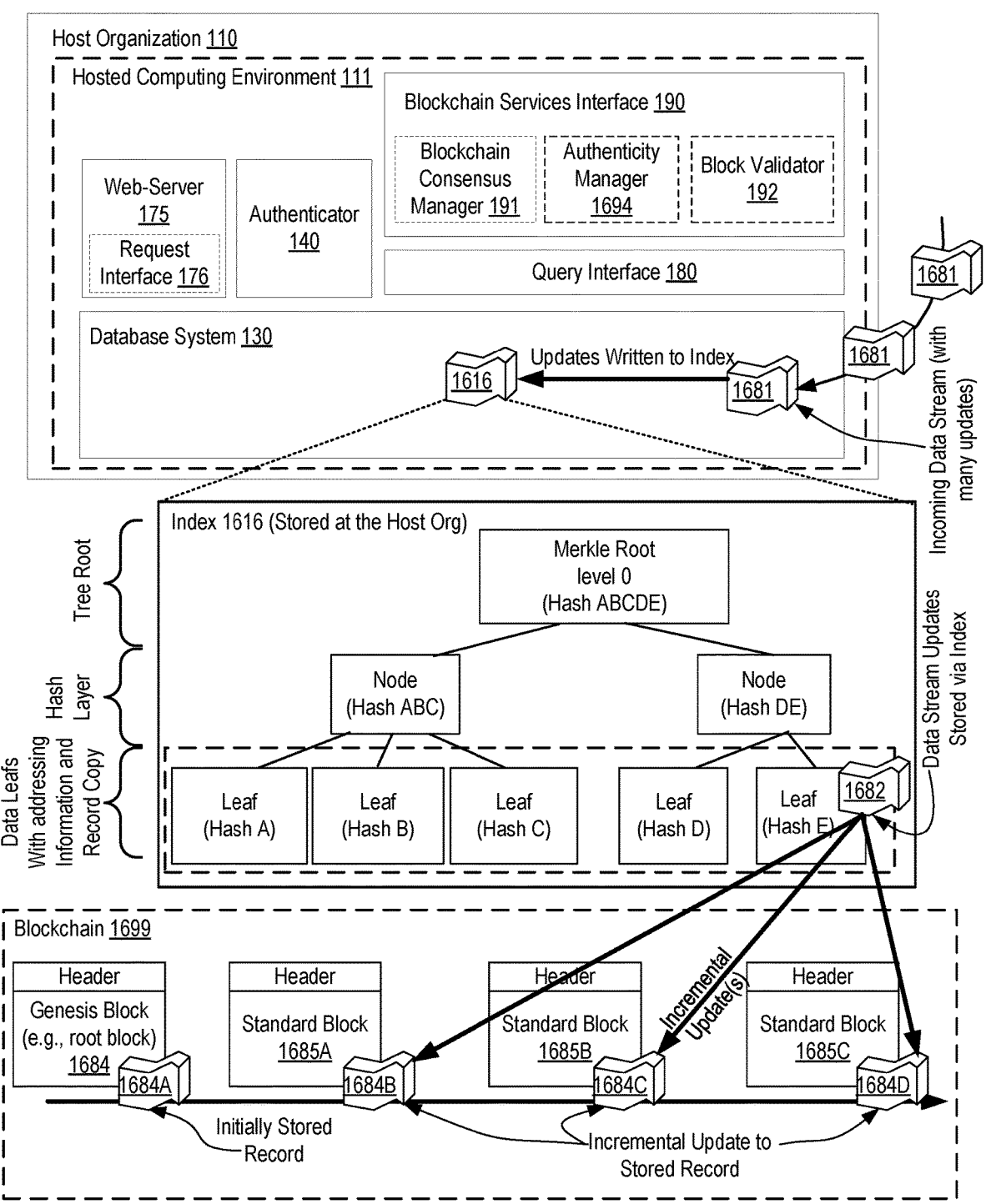
FIG. 16E depicts another exemplary architecture for incrementally updating a blockchain asset for stored records using an index to store current updates, in accordance with described embodiments.

FIG. 16E depicts another exemplary architecture 1605 for incrementally updating a blockchain asset for stored records using an index to store current updates, in accordance with described embodiments.

In certain situations, it is desirable to store information within the blockchain, however, the volume and frequency of information updates for the stored records render use of the blockchain impractical given that blockchain storage is very poorly suited for information storage with many updates at a high frequency.

As shown here, an incoming data stream 1681 with many updates is received at the host organization and the updates are written into the index 1616 resulting in the data stream updates being stored via the index as shown at element 1682. Periodically, incremental updates are then written into the blockchain by, for example, transacting with the blockchain to add a new asset having the stored record(s) with the incremental updates taken from the index 1616 and pushed into the blockchain as stored records. For example, stored record 1684A is initially stored on the blockchain 1699 with an initial batch of data from the data stream. Next, more data stream updates are written first to the index 1616 at the host organization and after a period of time, the incremental updates are then again written to the blockchain, resulting in repetitive incremental updates shown here as incremental update 1684B, then incremental update 1684C, and then incremental update 1684D, and so on.

Consider for example the storage of an information stream from a high volume manufacturing process with many updates for many finished goods products coming off of the manufacturing line necessitating continuous and high frequency reporting of various manufacturing metrics, including the creation, signing, and transacting of Bill of Materials (BOM) information and certificates of authenticity with the blockchain 1699 (private or public). If the collection of such data scales too high, then the blockchain may be overwhelmed due to the frequency of data storage requests.

However, storing the information within the index 1616, especially when the index is stored within the host organization, overcomes this problem as the database system 130 of the host organization easily accommodates a high frequency of database updates and interactions.

Therefore, in the event it is nevertheless desired to make such data available on the blockchain and to be stored upon the blockchain, then the frequency problem may be overcome by first writing the many updates (e.g., from high volume manufacturing data or other such updates) directly into the index 1616 within the host organization 110 and then periodically writing incremental updates to the blockchain for persistent storage of the data within the blockchain. For example, high volume manufacturing data streams may be collected by the host organization 110 into the index and then once every 10 minutes, every hour, every 24 hours (or some other period) the incremental update to the high volume manufacturing data stream (measured from the last update to the blockchain to the currently available data) is then pushed, flushed, added, or transacted onto the blockchain. Thus, the latest block of the blockchain then persistently stores the latest portion of the high volume manufacturing data stream and thus is accessible directly from the blockchain or alternatively available from the index 1616 at the host organization.

In certain embodiments, the index purges or flushes the incremental data by storing the incremental update to the blockchain and then the index removes the stored contents or payload portion from the index 1616 and retains only the block location information on the blockchain via which to locate the underlying stored records. Stated differently, once the incremental information is written to the blockchain, the index 1616 may be cleaned up such that it retains where to locate the stored records having the incremental information on a specific block of the blockchain, but the index 1616 itself no longer retains the contents of such stored records as they are available within the blockchain and because such data, which grows very quickly, may slow the index in an undesirable manner.

Pushing the whole change (e.g., all of the high volume manufacturing data stream ever collected) to the blockchain in its entirety is problematic as all data prior to the incremental update is replicated over and over again within the blockchain. Thus, pushing only the incremental changes or updates to the blockchain provides efficient use of the blockchain for purposes of storage and efficient use of the index 1616 by which to buffer the incoming data stream or incoming high frequency updates as well as via which index 1616 permits fast identification of location information indicating where the incremental information is stored (e.g., within which block on the blockchain).

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute at a host organization, wherein the system comprises: a memory to store instructions; a set of one or more processors; a non-transitory machine-readable storage medium that provides instructions that, when executed by the set of one or more processors, the instructions stored in the memory are configurable to cause the system to perform operations comprising:
   executing a declarative smart action configuration interface which facilitates the creation of a new smart action via the configured smart action interface to perform drag and drop actions to introduce metadata and configuration elements to the configured smart action, wherein the smart actions facilitate transfer of ownership of a manufactured product;
   executing a first blockchain interface to a private blockchain on behalf of a product manufacturer, executing a second blockchain interface to a public blockchain.

2. The system of claim 1:
   wherein the product manufacturer has access permissions to the private blockchain and has access permissions to the public blockchain; and
   wherein the purchaser has access permissions to the public blockchain and has no access permissions to the private blockchain.

3. The system of claim 1:
   wherein each of the product manufacturer and the purchaser operate as nodes on the public blockchain with access to the public blockchain through either the host organization's second blockchain interface to the public blockchain or directly; and
   wherein the product manufacturer operates as node on the private blockchain with access to the private blockchain through the host organization's first blockchain interface to the private blockchain.

4. The system of claim 1, further comprising:
   providing a plurality of templates for generating certificates of authenticity to the plurality of tenants; and
   wherein the new certificate of authenticity generated by the product manufacturer is generated utilizing one of the plurality of templates.

5. The system of claim 1, further comprising:
   executing instructions at the host organization for registering ownership of the finished goods product for the purchaser on the public blockchain by registering ownership of the digital twin corresponding to the finished goods product to the purchaser; and
   wherein any node having access to the public blockchain has visibility to ownership registration of the digital twin corresponding to the finished goods product as belonging to the purchaser.

6. The system of claim 1, wherein the certificate of authenticity of the digital twin exposing the plurality of supply-chain components forming the finished goods product at the time of manufacture by the product manufacturer comprises a listing of supply-chain component identifiers integrated into the finished goods product at the time of manufacture by the product manufacturer.

7. The system of claim 1, wherein transacting the digital twin having the certificate of authenticity embedded therein onto the public blockchain comprises:
   adding a new public blockchain asset to the public blockchain identified by the GUID on the public blockchain;
   storing the digital twin having the certificate of authenticity embedded therein within the new asset; and
   registering within the public blockchain both the product manufacturer as the transferor of the digital twin and the purchaser as the transferee of the digital twin.

8. The system of claim 1:
   wherein the purchaser of the finished goods product becomes a first owner of both the finished goods product and the first owner of the digital twin for the finished goods product pursuant to a sale by the product manufacturer;
   wherein the first owner becomes a transferee of the asset on the public blockchain storing the digital twin within which the certificate of authenticity is embedded;
   wherein a third party purchaser of the finished goods product becomes a second owner of both the finished goods product and the digital twin for the finished goods product pursuant to a second sale from the first owner to the second owner; and
   wherein the second owner becomes a transferee of the asset on the public blockchain storing the digital twin within which the certificate of authenticity is embedded.

9. The system of claim 1:
   wherein transferring ownership of the digital twin from the product manufacturer to the purchaser comprises transferring ownership of the digital twin to one of:
   a product wholesaler for the finished goods product;
   a product retailer for the finished goods product;
   an end user consumer for the finished goods product;
   a product broker for the finished goods product;
   a product dealer for the finished goods product; and
   an anonymous purchaser of the finished goods product.

10. The system of claim 1, wherein transacting the digital twin onto the private blockchain by adding the asset to the private blockchain comprises:
    adding a new asset to the private blockchain via a CREATE asset command term for the private blockchain and writing the digital twin having the certificate of authenticity embedded therein into a payload portion of the new asset.

11. The system of claim 1:
    wherein the private blockchain comprises a permissioned blockchain;
    wherein the product manufacturer has full access permissions to data and functions of the permissioned blockchain; and
    wherein one or more supply-chain vendors for the finished goods product operate as restricted nodes on the permissioned blockchain with limited access permissions to data and functions of the permissioned blockchain.

12. The system of claim 1:
    wherein transacting the digital twin onto the private blockchain by adding an asset to the private blockchain to store the digital twin further comprises one or more of:
    writing a StockKeeping Unit (SKU) number established by a merchant to the digital twin stored on the private blockchain;
    writing a product model number assigned by the product manufacturer to the digital twin stored on the private blockchain;
    writing a Bill of Materials (BOM) to the digital twin stored on the private blockchain; and writing one or more supply-chain identifiers for components or raw materials embedded within the finished goods product to the digital twin stored on the private blockchain.

13. The system of claim 1:
wherein transacting the digital twin having the certificate of authenticity embedded therein onto the public blockchain with the GUID comprises adding a new public blockchain asset to the public blockchain identified by the GUID on the public blockchain; and
wherein transacting the digital twin onto the public blockchain further comprises:
writing a product manufacturer's Bill of Materials (BOM) for the finished goods product into a payload of the new public blockchain asset;
wherein any participating node on the public blockchain has read access to each of (i) the GUID for the finished goods product, (ii) ownership history of the finished goods product, (iii) the certificate of authenticity for the finished goods product, and (iv) the product manufacturer's BOM for the finished goods product.

14. The system of claim 1, wherein generating the digital twin for the finished goods product by the product manufacturer further comprises:
executing instructions at the host organization for writing one or more supply-chain component identifiers into the certificate of authenticity identifying a corresponding one or more supply-chain components or raw materials which are embedded within the finished goods product; and
wherein transacting the digital twin having the certificate of authenticity embedded therein onto the public blockchain comprises exposing the one or more supply-chain component identifiers publicly via the certificate of authenticity of the digital twin on the public blockchain.

15. The system of claim 1, further comprising:
receiving supply-chain component certificates of authenticity for one or more components or raw materials within the finished goods products;
encoding the supply-chain component certificates of authenticity into the certificate of authenticity uniquely identifying the finished goods product by the product identifier; and
wherein transacting the digital twin having the certificate of authenticity embedded therein onto the public blockchain comprises exposing the certificate of authenticity for the finished goods product and the received supply-chain supply chain component certificates of authenticity via the digital twin for the finished goods product transacted onto the public blockchain.

16. The system of claim 1, further comprising:
receiving a digital signature for the new certificate of authenticity from the product manufacturer;
applying the digital signature for the new certificate of authenticity forming a digitally signed certificate of authenticity attesting to the product manufacturer's certification of authenticity of the finished goods product identified by the product identifier specified with the new certificate of authenticity; and
wherein transacting the digital twin onto the private blockchain comprises transacting the digital twin having the digitally signed certificate of authenticity embedded therein onto the private blockchain.

17. The system of claim 1:
wherein the product identifier uniquely identifies the finished goods product as exactly one physical item and links the digital twin stored to the private blockchain with the finished goods product via the product identifier having been assigned to the new certificate of authenticity embedded within the digital twin; and
wherein the globally unique identifier (GUID) uniquely identifies the digital twin for the finished goods product on the public blockchain; and
wherein writing the GUID uniquely identifying the digital twin on the public blockchain into the asset on the private blockchain immutably links the product identifier within the private blockchain with the GUID uniquely identifying the digital twin of the finished goods product on the public blockchain.

18. The system of claim 1, wherein the certificate of authenticity specific to the finished goods product as identified by the unique ID comprises one of:
the unique ID encoding a serial number for the finished goods product assigned by the product manufacturer;
the unique ID encoding a barcode for the finished goods product assigned by the product manufacturer;
the unique ID encoding a Vehicle Identification Number (VIN) number for the finished goods product assigned to an automobile by the product manufacturer; and the unique ID encoding a universally unique identifier (UUID) number generated by the host organization and assigned to the finished goods product concurrent with generation of the digital twin for the finished goods product.

19. The system of claim 1, further comprising:
providing a plurality of templates for generating certificates of authenticity to the plurality of tenants by to any of the plurality of tenant organizations via a commerce cloud platform provided by the host organization;
wherein the certificate of authenticity templates include one or more of:
a certificate of authenticity template for an electronic device;
a certificate of authenticity template for a computing device;
a certificate of authenticity template for a smartphone or tablet;
a certificate of authenticity template for a wearable garment;
a certificate of authenticity template for a wearable computing device;
a certificate of authenticity template for a fashion accessory;
a certificate of authenticity template for an automobile;
a certificate of authenticity template for an artwork by an artist; and
wherein the new certificate of authenticity generated by the product manufacturer is generated utilizing one of the plurality of templates.

20. The system of claim 1:
wherein providing the plurality of certificate of authenticity templates comprises providing the plurality of certificate of authenticity templates to any of the plurality of tenant organizations via a commerce cloud platform provided by the host organization;
wherein the instructions stored in the memory of the system are further configurable to cause the system to:
(i) execute an artificial intelligence engine at the commerce cloud platform; and
(ii) execute instructions at the host organization for issuing recommendations from the artificial intelligence engine to the product manufacturer for use of a certificate of authenticity template for the product manufacturer's product based at least in part on relationships between the product manufacturer and one or more suppliers to the product manufacturer.

21. The system of claim 20, wherein the instructions stored in the memory of the system are further configurable to cause the system to:
communicably interface with a Customer Relationship Management (CRM) of the product manufacturer operating as one of the plurality of tenants within the host organization;
wherein the relationships between the product manufacturer and the one or more suppliers to the product manufacturer are determined from the CRM system for the product manufacturer;
wherein issuing the recommendations to the product manufacturer for use of the certificate of authenticity template further comprises executing instructions for auto-populating one or more fields of the recommended certificate of authenticity template recommended by the artificial intelligence engine by retrieving corresponding data from the CRM of the tenant organization; and
wherein the one or more fields auto-populated correspond to one of a component field, a supplier field, and a field identifying a supplier's certificate of authenticity for components or raw materials.

22. The system of claim 1:
wherein providing the plurality of certificate of authenticity templates comprises providing the plurality of certificate of authenticity templates to any of the plurality of tenant organizations via a commerce cloud platform provided by the host organization;
wherein the method further comprises:
receiving custom branding information from the product manufacturer; and
generating the new certificate of authenticity using one of the plurality of templates; and
applying the custom branding information from the product manufacturer to the generated certificate of authenticity.

23. The system of claim 1, wherein the instructions stored in the memory of the system are further configurable to cause the system to:
publish a web-based interface from the host organization to a public Internet linking the web-based interface with the second blockchain interface to the public blockchain;
receive an anonymous query at the web-based interface requesting validation of ownership or authenticity or both of the digital twin published to the public blockchain;
retrieve the digital twin and its certificate of authenticity from the public blockchain; and
return ownership confirmation or the certificate of authenticity or both to the requestor of the anonymous query responsive to the request.

24. The system of claim 1:
wherein the product manufacturer publishes a custom branded web-based interface to a public Internet linking the custom branded web-based interface with a blockchain services interface of the host organization via which to service queries directed at the public blockchain;
wherein the instructions stored in the memory of the system are further configurable to cause the system to:
receive an anonymous query at the host organization having been redirected from the custom branded web-based interface published by the product manufacturer, the anonymous query requesting validation of ownership or authenticity or both of the digital twin published to the public blockchain;
retrieve the digital twin and its certificate of authenticity from the public blockchain; and
return a response including ownership confirmation or the certificate of authenticity or both to the requestor of the anonymous query responsive to the request by routing the response through the custom branded web-based interface published by the product manufacturer.

25. The system of claim 1:
wherein writing the GUID uniquely identifying the digital twin on the public blockchain into the asset on the private blockchain within which the digital twin is stored comprises:
executing instructions at the host organization for transacting with the private blockchain via an UPDATE asset command function; and
wherein writing the GUID into the asset on the private blockchain comprises executing the UPDATE asset command function to modify the asset previously recorded to the private blockchain by modifying a payload portion of the existing asset to add and populate a GUID field of the asset with the GUID from the public blockchain.

26. The system of claim 1, wherein the instructions stored in the memory of the system are further configurable to cause the system to:
display a Graphical User Interface (GUI) to an admin computing device communicably interfaced with the host organization, the admin computing device authenticated as belonging to the product manufacturer as one of the plurality of tenant organizations, wherein the GUI displays a template configuration interface for the certificate of authenticity via which the admin computing device may customize the template with custom branding for the product manufacturer and with additions, deletions, or alterations to one or more populatable fields of the template;
receive input from the admin computing device via the GUI to customize the template; and
wherein generating the new certificate of authenticity using one of the plurality of templates comprises executing instructions at the host organization for using the template as customized by the input from the admin computing device to generate the new certificate of authenticity.

27. The system of claim 1:
wherein transacting the digital twin having the certificate of authenticity embedded therein onto the public blockchain comprises adding a transaction to the public blockchain via a CREATE asset command function for the public blockchain; and
wherein the added transaction is subjected to a consensus protocol by the participating nodes of the public blockchain prior to the added transaction being accepted as part of a primary chain of the public blockchain by the participating nodes of the public blockchain.

28. The system of claim 1:
wherein the index comprises a Merkle Tree compatible index; and
wherein the index is persistently stored at the host organization or persistently stored to the private blockchain or persistently stored at both the host organization and the private blockchain.

29. The system of claim 1, wherein the instructions stored in the memory of the system are further configurable to cause the system to:

maintain an index for a plurality of certificates of authenticity for the product manufacturer persistently stored as data records to the private blockchain;

wherein the index defines at least a location for each of the plurality of data records persistently stored to the private blockchain, the location defining one addressable block of the private blockchain from which to retrieve a respective data record persistently stored to the private blockchain;

wherein the index defines for each of the plurality of data records persistently stored to the private blockchain, both (i) the location for each of the plurality of records persistently stored to the private blockchain and (ii) a copy of any contents of the plurality of record records persistently stored to the private blockchain; and wherein maintaining the index includes writing the updated values for the data record to the index when the updated values for the data record are written to the private blockchain pursuant to successful validation of the updated values.

30. The system of claim 1:

wherein nodes and leafs of the index are retrievable via full or partial addresses as defined by an addressing structure for the index;

wherein the method further comprises maintaining the addressing structure for the index, wherein the addressing structure includes at least:

a first portion of the addressing structure defining an application namespace;

a second portion of the addressing structure defining an entity type identifier;

a third portion of the addressing structure defining a name for an entity or a data record stored by the private and indexed by the index;

wherein referencing the index with a fully qualified address will return contents of leaf from the index, the contents of the leaf; and wherein referencing the index with a partial address will return a sub-tree beneath a node of the index matching the partial address, in which the sub-tree includes multiple leafs of the index structured below the node of the index matching the partial address.

\* \* \* \* \*